US012138815B2

United States Patent
Ye et al.

(10) Patent No.: US 12,138,815 B2
(45) Date of Patent: Nov. 12, 2024

(54) METHOD AND COMPUTING SYSTEM FOR PERFORMING MOTION PLANNING BASED ON IMAGE INFORMATION GENERATED BY A CAMERA

(71) Applicant: MUJIN, INC., Tokyo (JP)

(72) Inventors: Xutao Ye, Tokyo (JP); Puttichai Lertkultanon, Tokyo (JP); Rosen Nikolaev Diankov, Tokyo (JP)

(73) Assignee: MUJIN, INC., Tokyo (JP)

( * ) Notice: Subject to any disclaimer, the term of this patent is extended or adjusted under 35 U.S.C. 154(b) by 0 days.

(21) Appl. No.: 18/331,650

(22) Filed: Jun. 8, 2023

(65) Prior Publication Data

US 2024/0017417 A1 Jan. 18, 2024

Related U.S. Application Data

(63) Continuation of application No. 17/385,349, filed on Jul. 26, 2021, now Pat. No. 11,717,971, which is a
(Continued)

(51) Int. Cl.
*G05B 15/00* (2006.01)
*B25J 9/16* (2006.01)
(Continued)

(52) U.S. Cl.
CPC ............ *B25J 9/1697* (2013.01); *B25J 9/1612* (2013.01); *B25J 9/1653* (2013.01); *B25J 9/1664* (2013.01);
(Continued)

(58) Field of Classification Search
CPC ....... B25J 9/1697; B25J 9/1612; B25J 9/1653; B25J 9/1664; B25J 9/1669; B25J 9/1671;
(Continued)

(56) References Cited

U.S. PATENT DOCUMENTS 9,327,406 B1 5/2016 Hinterstoisser et al.
9,498,887 B1 * 11/2016 Zevenbergen ....... B25J 15/0052
(Continued)

FOREIGN PATENT DOCUMENTS

CN 104811683 A 7/2015
CN 110116406 A 8/2019
(Continued)

OTHER PUBLICATIONS

Office Action issued in corresponding Japanese Patent Application No. 2020-569197 dated Nov. 26, 2021.

*Primary Examiner* — Yolanda R Cumbess
(74) *Attorney, Agent, or Firm* — MEDLER FERRO WOODHOUSE & MILLS PLLC

(57) ABSTRACT

A system and method for motion planning is presented. The system is configured, when an object is or has been in a camera field of view of a camera, to receive first image information that is generated when the camera has a first camera pose. The system is further configured to determine, based on the first image information, a first estimate of the object structure, and to identify, based on the first estimate of the object structure or based on the first image information, an object corner. The system is further configured to cause an end effector apparatus to move the camera to a second camera pose, and to receive second image information for representing the object's structure. The system is configured to determine a second estimate of the object's structure based on the second image information, and to generate a motion plan based on at least the second estimate.

20 Claims, 35 Drawing Sheets

Related U.S. Application Data continuation of application No. 17/084,272, filed on Oct. 29, 2020, now Pat. No. 11,103,998.

(60) Provisional application No. 62/946,973, filed on Dec. 12, 2019.

(51) Int. Cl.

| | |
|---|---|
| *B25J 13/08* | (2006.01) |
| *B25J 15/00* | (2006.01) |
| *B25J 19/02* | (2006.01) |
| *B65G 59/02* | (2006.01) |
| *G05B 19/00* | (2006.01) |
| *G05B 19/4155* | (2006.01) |
| *G06F 18/2413* | (2023.01) |
| *G06T 7/60* | (2017.01) |
| *G06T 7/73* | (2017.01) |
| *G06V 10/764* | (2022.01) |
| *G06V 20/10* | (2022.01) |
| *H04N 23/54* | (2023.01) |
| *H04N 23/695* | (2023.01) |

(52) U.S. Cl.
CPC ............ *B25J 9/1669* (2013.01); *B25J 9/1671* (2013.01); *B25J 13/08* (2013.01); *B25J 15/0061* (2013.01); *B25J 19/023* (2013.01); *B65G 59/02* (2013.01); *G05B 19/4155* (2013.01); *G06F 18/2413* (2023.01); *G06T 7/60* (2013.01); *G06T 7/74* (2017.01); *G06V 10/764* (2022.01); *G06V 20/10* (2022.01); *H04N 23/54* (2023.01); *H04N 23/695* (2023.01); *G05B 2219/40269* (2013.01); *G06T 2207/10028* (2013.01); *G06T 2207/20164* (2013.01); *G06T 2207/30244* (2013.01)

(58) Field of Classification Search
CPC ...... B25J 13/08; B25J 15/0061; B25J 19/023; B25J 9/1602; B65G 59/02; G05B 19/4155; G05B 2219/40269; G05B 2219/39509; G05B 2219/39527; G05B 2219/39542; G05B 2219/40014; G05B 2219/40584; G06F 18/2413; G06T 7/60; G06T 7/74; G06T 2207/10028; G06T 2207/20164; G06T 2207/30244; G06T 7/50; G06T 7/73; G06T 2207/30108; G06V 10/764; G06V 20/10; H04N 23/54; H04N 23/695; H04N 23/60
USPC ........................................ 700/213, 250, 259
See application file for complete search history.

(56) References Cited

U.S. PATENT DOCUMENTS

| | | |
|---|---|---|
| 9,597,803 B2 | 3/2017 | Mimura et al. |
| 9,797,682 B2 | 10/2017 | Houde-Walter et al. |
| 10,053,305 B2 | 8/2018 | Eto et al. |
| 10,584,996 B2 | 3/2020 | Key |
| 2006/0258938 A1 | 11/2006 | Hoffman et al. |
| 2016/0016311 A1* | 1/2016 | Konolige ............... B25J 9/1664 901/30 |
| 2016/0063309 A1 | 3/2016 | Konolige et al. |
| 2019/0073760 A1 | 3/2019 | Wang et al. |
| 2019/0099891 A1 | 4/2019 | Tomioka et al. |
| 2019/0323829 A1 | 10/2019 | Suenaga et al. |
| 2020/0094401 A1 | 3/2020 | Cheng |
| 2020/0148489 A1 | 5/2020 | Diankov et al. |

FOREIGN PATENT DOCUMENTS

| | | |
|---|---|---|
| CN | 110292558 A | 10/2019 |
| CN | 110490922 A | 11/2019 |
| CN | 110555872 A | 12/2019 |
| JP | H09-167234 A | 6/1997 |
| JP | 2010012567 A | 1/2010 |
| JP | 2013-255972 A | 12/2013 |
| JP | 2014-034075 A | 2/2014 |
| JP | 2016-222377 A | 12/2016 |
| JP | 2019-063984 A | 4/2019 |
| JP | 2019-151421 A | 9/2019 |
| JP | 2019185239 A | 10/2019 |
| KR | 10-2011-0095700 A | 8/2011 |
| KR | 20170031252 A | 3/2017 |
| WO | 2019097004 A1 | 5/2019 |

\* cited by examiner

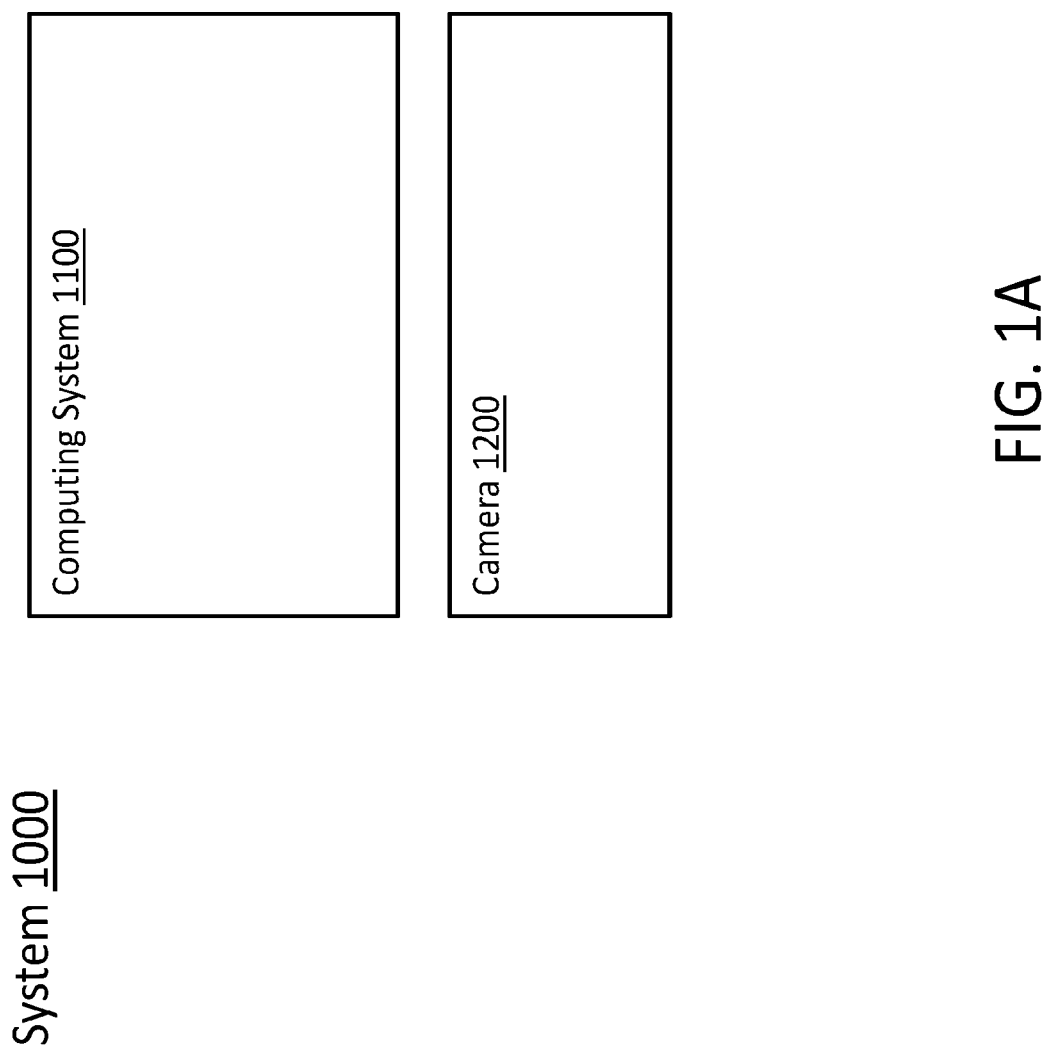

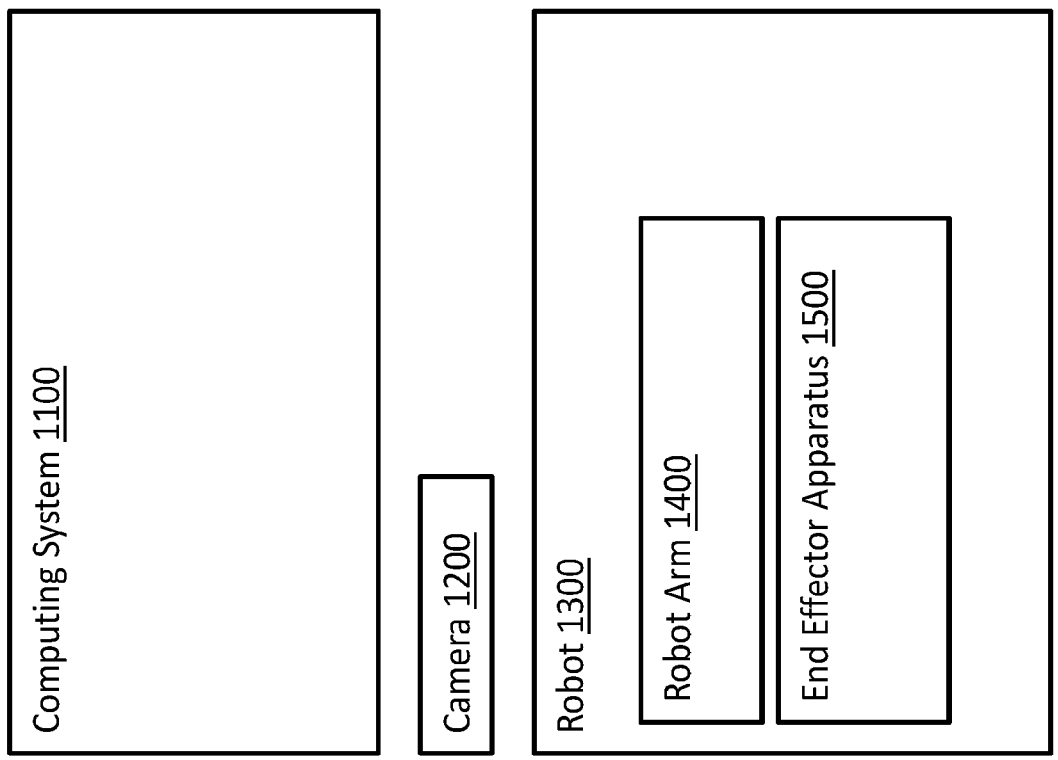

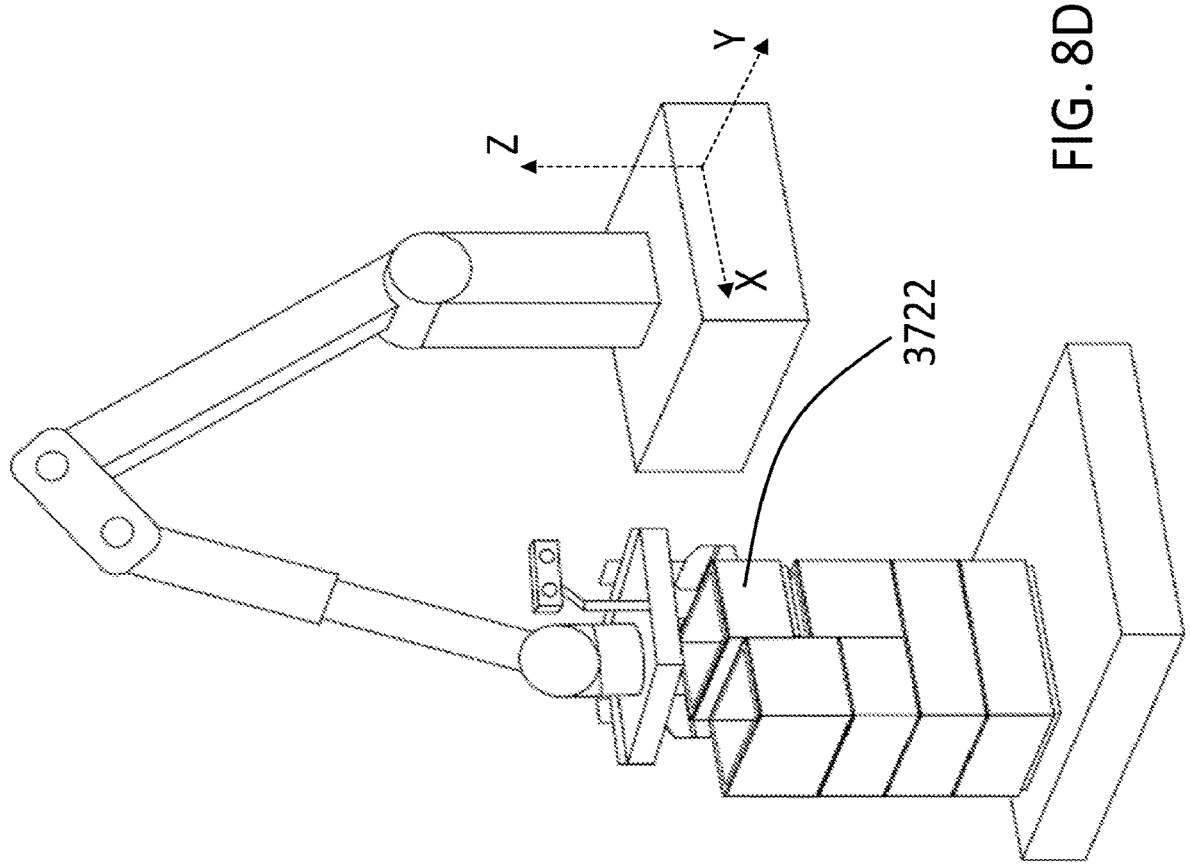

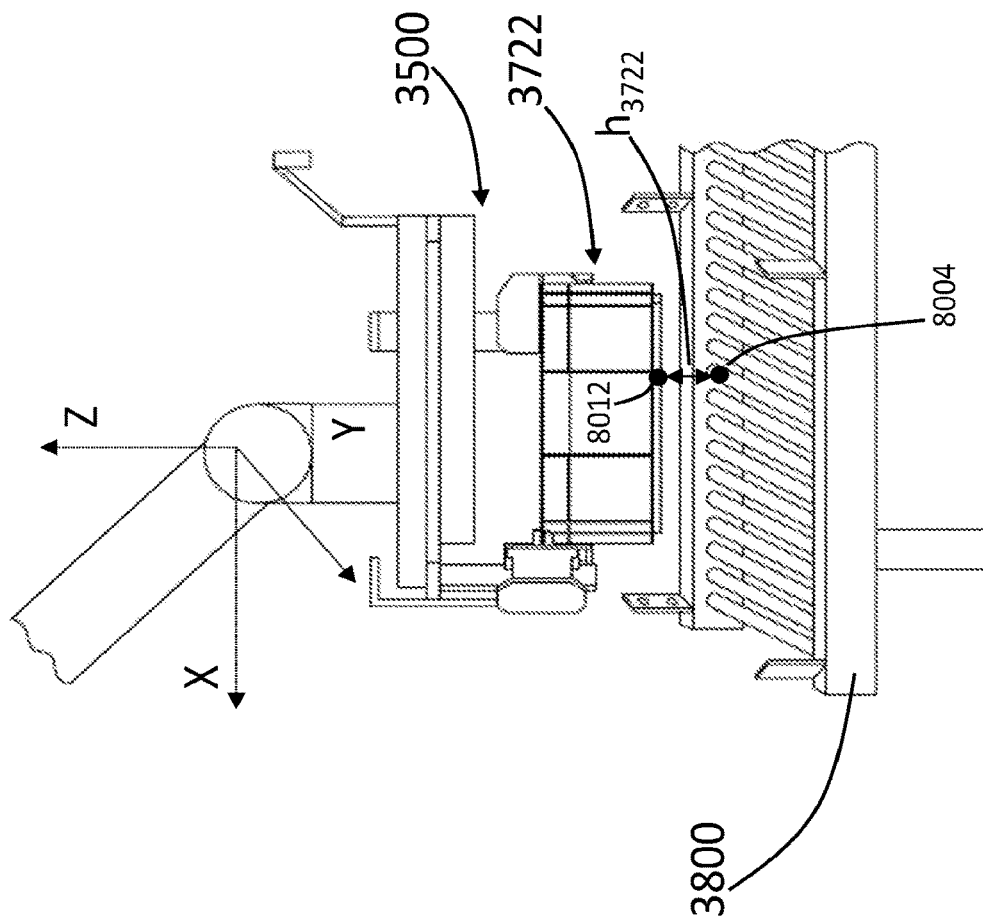

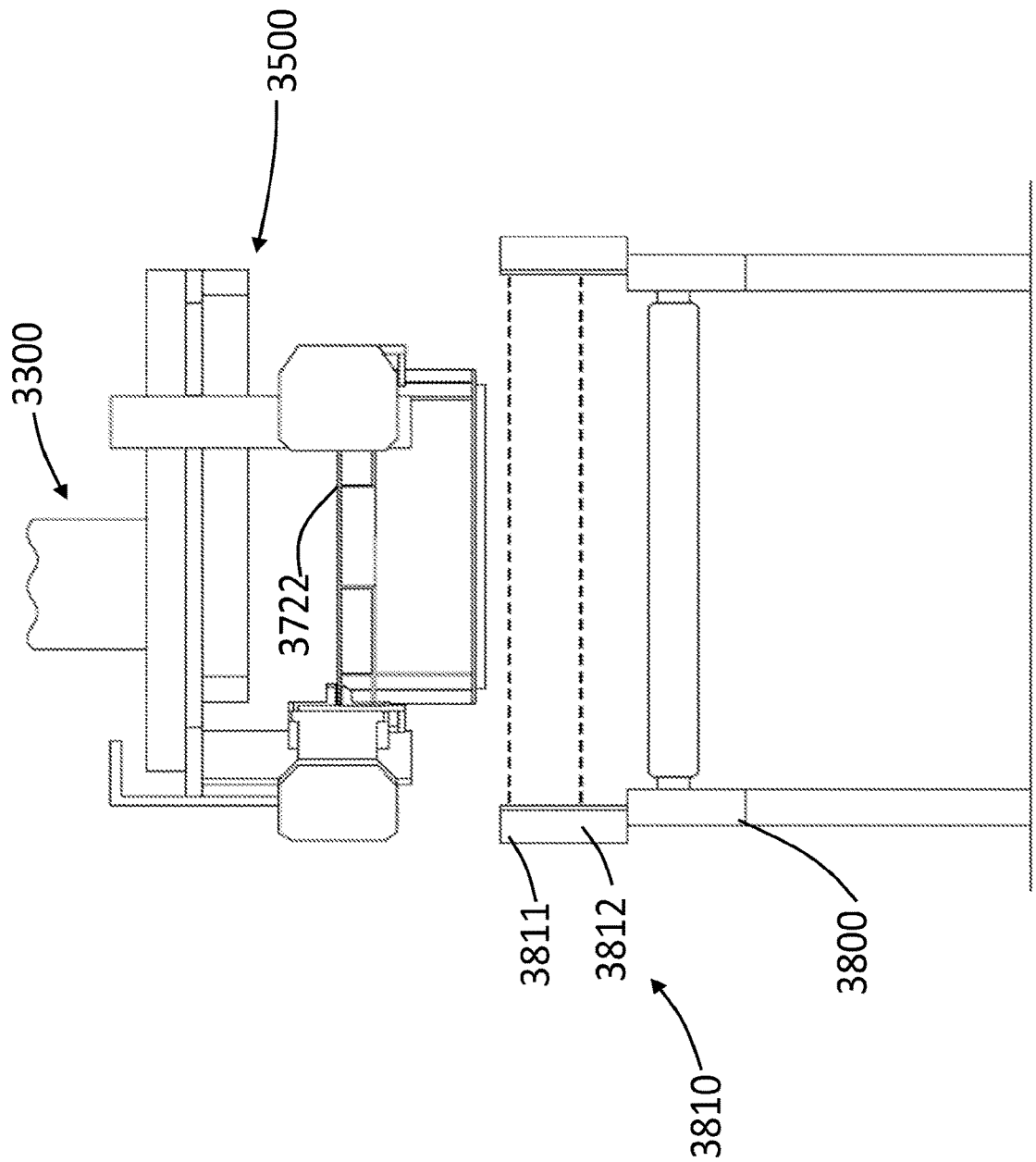

METHOD AND COMPUTING SYSTEM FOR PERFORMING MOTION PLANNING BASED ON IMAGE INFORMATION GENERATED BY A CAMERA

CROSS-REFERENCE TO RELATED APPLICATION(S)

The present application is a continuation of U.S. application Ser. No. 17/385,349, entitled "METHOD AND COMPUTING SYSTEM FOR PERFORMING MOTION PLANNING BASED ON IMAGE INFORMATION GENERATED BY A CAMERA" and filed Jul. 26, 2021, which is a continuation of U.S. application Ser. No. 17/084,272, entitled "METHOD AND COMPUTING SYSTEM FOR PERFORMING MOTION PLANNING BASED ON IMAGE INFORMATION GENERATED BY A CAMERA" and filed Oct. 29, 2020, now U.S. Pat. No. 11,103,998, which claims the benefit of U.S. Provisional Application No. 62/946,973, entitled "ROBOTIC SYSTEM WITH GRIPPING MECHANISM," and filed Dec. 12, 2019, the entire contents of which are incorporated by reference herein.

FIELD OF THE INVENTION

The present disclosure is related to a method and computing system for performing motion planning based on image information generated by a camera.

BACKGROUND OF THE INVENTION

As automation becomes more common, robots are being used in more environments, such as in warehousing and retail environments. For instance, robots may be used to interact with merchandise or other objects in a warehouse. The movement of the robot may be fixed, or may be based on an input, such as information generated by a sensor in the warehouse.

SUMMARY

One aspect of the present disclosure relates to a computing system, method, and non-transitory computer-readable medium for facilitating motion planning and/or for estimating a structure of an object. In an embodiment, the method may be performed by the computing system, such as by executing instructions on the non-transitory computer-readable medium. The computing system includes a communication interface and at least one processing circuit. The communication interface is configured to communicate with: (i) a robot having an end effector apparatus, and (ii) a camera mounted on the end effector apparatus and having a camera field of view. The at least one processing circuit is configured, when an object is or has been in the camera field of view, to: receive first image information for representing at least a first outer surface of an object structure associated with the object, wherein the first image information is generated by the camera when the camera has a first camera pose in which the camera is pointed at the first outer surface such that the camera field of view encompasses the first outer surface; determine, based on the first image information, a first estimate of the object structure; identify, based on the first estimate of the object structure or based on the first image information, a corner of the object structure; determine a second camera pose which, when adopted by the camera, causes the camera to be pointed at the corner of the object structure such that the camera field of view encompasses the corner and at least a portion of a second outer surface of the object structure; output one or more camera placement movement commands which, when executed by the robot, causes the end effector apparatus to move the camera to the second camera pose; receive second image information for representing the object structure, wherein the second image information is generated by the camera while the camera has the second camera pose; determine a second estimate of the object structure based on the second image information; generate a motion plan based on at least the second estimate of the object structure, wherein the motion plan is for causing robot interaction between the robot and the object; and output one or more object interaction movement commands for causing the robot interaction, wherein the one or more object interaction movement command are generated based on the motion plan.

BRIEF DESCRIPTION OF THE FIGURES

FIGS. 1A through 1D illustrate a system for processing image information consistent with embodiments hereof.

FIGS. 8A-8I illustrate an end effector apparatus at various points of a motion plan, according to an embodiment hereof.

DETAILED DESCRIPTION OF THE FIGURES

Figure 1B:
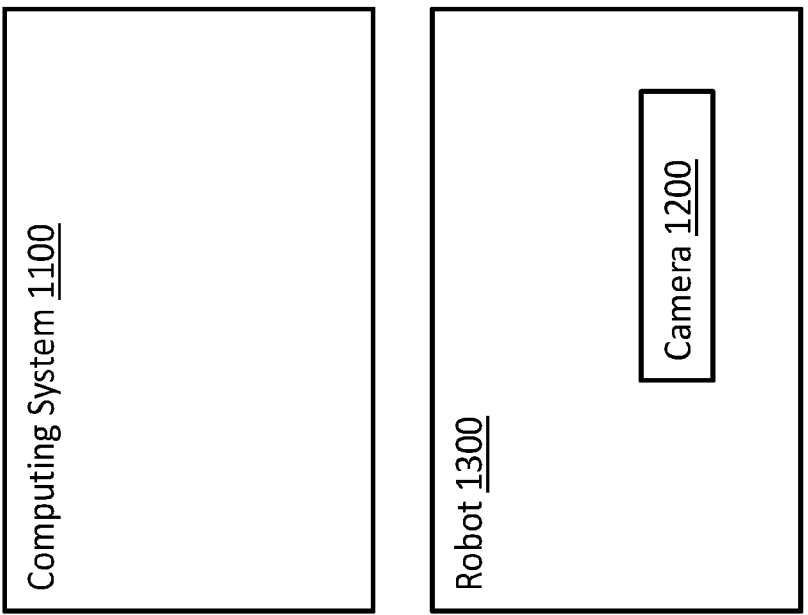

One aspect of the present disclosure relates to using multiple sets of image information that represents multiple views or viewpoints to perform motion planning. The motion planning may involve, e.g., determining a trajectory to be followed by an end effector apparatus (e.g., robot gripper or robot hand) disposed at one end of a robot arm of a robot. The trajectory may be part of a robot interaction between the robot arm and an object, such as a box or crate holding merchandise in a warehouse or retail space. For instance, the robot interaction may carry out an operation in which the robot arm picks up the object and moves the object to a desired destination location. In some cases, the object may be part of a stack of objects disposed on a pallet, and the robot arm may be used to move all of the objects from the pallet to another location.

In an embodiment, the multiple viewpoints may refer to viewpoints of a camera that is configured to generate 2D or 3D image information describing an environment of the camera and/or of the robot. In some cases, the camera may be mounted on or otherwise attached to the end effector apparatus. In such cases, a computing system may cause movement of the camera via movement of the end effector apparatus. More specifically, the computing system may cause the camera to be moved to different camera poses via the end effector apparatus. In a first camera pose, the camera may be, e.g., placed directly above the object, and may generate first image information which represents a top view of the object. In such an example, the first image information may represent a top surface (also referred to as top face) of the object. In some cases, the computing system may use the first image information to determine a first estimate of a structure of the object (also referred to as an object structure) and/or generate an initial motion plan for causing interaction between the robot and the object.

In an embodiment, the computing system may generate an updated motion plan based on second image information which represents another view of the object. More particularly, the first estimate of the object structure or the initial motion plan generated based on the first image information may lack a high level of accuracy or confidence. For instance, if the first image information represents a top view of the object, the top view may provide some information regarding an object dimension such as object length or object width, but may provide no information or limited information regarding an object dimension such as object height. Thus, using solely the first image information to perform motion planning may lead to an unreliable result. Thus, the computing system may cause the camera to generate second image information, which may represent another view of the object.

In an embodiment, the computing system may cause the camera to generate the second image information by using the first image information to identify a corner of the object (also referred to as an object corner). In this embodiment, the computing system may output movement commands for causing the camera to be moved to a second camera pose, via the end effector apparatus, in which the camera is pointed at the object corner. The second image information may be generated by the camera while the camera has the second camera pose. In one scenario, the second image information may represent a perspective view of the object, in which one or more outer side surfaces (also referred to as side faces) of the object are represented by the second image information. Thus, the second image information may provide additional information regarding the structure of the object, such as information which can be used to estimate its object height. In some cases, the computing system may use the second image information (alone or in conjunction with the first image information) to determine a second estimate of the object structure, and/or to determine an updated motion plan. As a result, the second estimate of the object structure and/or the updated motion plan may have a higher degree of reliability or confidence relative to the first estimate or initial motion plan which are generated based solely on the first image information.

In an embodiment, the computing system may be configured to estimate a structure of the stack after the object has been removed. More particularly, the computing system may use the estimate of the object's structure to determine an estimate of the stack's structure. For instance, the computing system may use estimated dimensions of the removed object's structure to determine which portion of the estimate of the stack's structure correspond to the removed object, and remove (e.g., mask out) that portion from the estimate of the stack's structure. As a result, the computing system may generate an updated estimate of the stack's structure. The updated estimate may represent the stack after the object has been removed. In some cases, the computing system may use the updated estimate of the stack's structure to identify remaining object corners (e.g., convex corners) of the stack, which may correspond to object corners (e.g., convex corners) of remaining objects in the stack. The computing system may select one of the object corners, which may belong to one of the remaining objects, and further cause the camera to be moved to a camera pose in which the camera is pointed at the selected object corner. The camera may generate image information while it is in that camera pose, and the image information may be used by the computing system to generate a motion plan for moving that remaining object.

FIG. 1A illustrates a system 1000 for performing motion planning based on image information. More particularly, the system 1000 may include a computing system 1100 and a camera 1200. In this example, the camera 1200 may be configured to generate image information which describes or otherwise represents an environment in which the camera 1200 is located, or more specifically represents an environment in the camera 1200's field of view (also referred to as a camera field of view). The environment may be, e.g., a warehouse, a manufacturing plant, a retail space, or some other premises. In such cases, the image information may represent objects located at such premises, such as containers (e.g., boxes) holding merchandise or other items. The system 1100 may be configured to receive and process the image information, such as by performing motion planning based on the image information, as discussed below in more detail. The motion planning may be used to, e.g., control a robot to facilitate robot interaction between the robot and the containers or other objects. The computing system 1100 and the camera 1200 may be located at the same premises, or may be located remotely from each other. For instance, the computing system 1100 may be part of a cloud computing platform hosted in a data center which is remote from the warehouse or retail space, and may be communicating with the camera 1200 via a network connection.

In an embodiment, the camera 1200 may be a 3D camera (also referred to as a spatial structure sensing camera or spatial structure sensing device) that is configured to generate spatial structure information regarding an environment in the camera's field of view, and/or may be a 2D camera that is configured to generate a 2D image which describes a visual appearance of the environment in the camera's field of view. The spatial structure information may include depth information which describes respective depth values of various locations relative to the camera 1200, such as locations on surfaces of various objects in the camera 1200's field of view. The depth information in this example may be used to estimate how the objects are spatially arranged in three-dimensional (3D) space. In some instances, the spatial structure information may include a point cloud that describes locations on one or more surfaces of an object in the camera's field of view. More specifically, the spatial structure information may describe various locations on a structure of the object (also referred to as an object structure).

In an embodiment, the system 1000 may be a robot operation system for interacting with various objects in the environment of the camera 1200. For example, FIG. 1B illustrates a robot operation system 1000A, which may be an embodiment of the system 1000 of FIG. 1A. The robot operation system 1000A may include the computing system 1100, the camera 1200, and a robot 1300. In an embodiment, the robot 1300 may be used to interact with one or more objects in the environment of the camera 1200, such as with boxes, crates, bins, or other containers holding merchandise in a warehouse. For example, the robot 1300 may be configured to pick up the containers from one location and move them to another location. In some cases, the robot 1300 may be used to perform a de-palletization operation in which a stack of containers are unloaded and moved to, e.g., a conveyor belt, or a palletization operation in which containers are stacked onto a pallet to prepare them for transport.

Figure 1C:
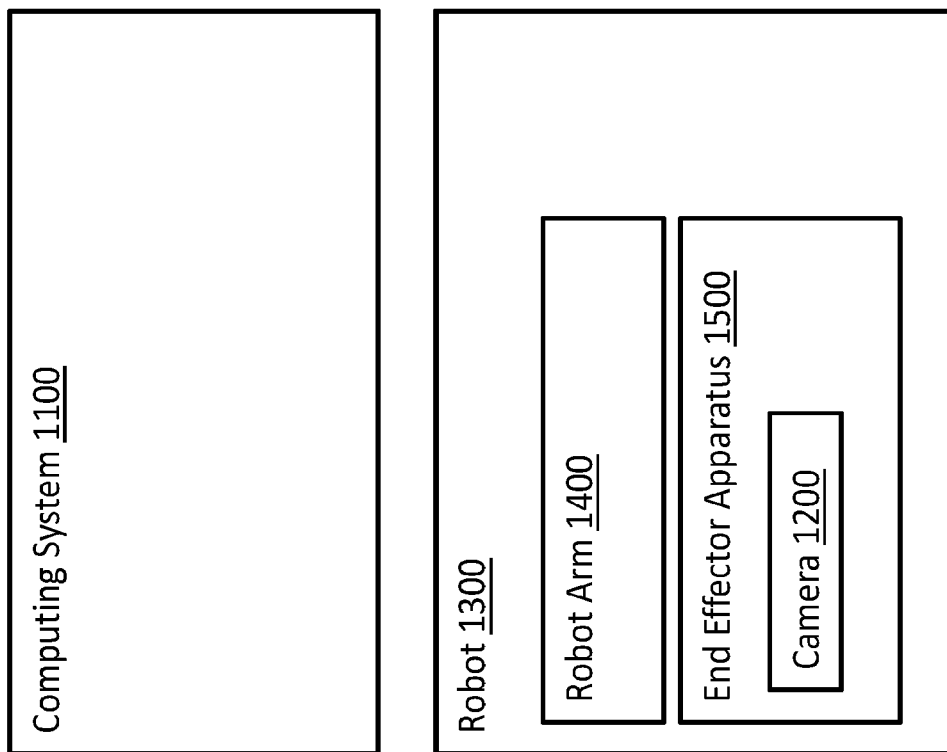

In an embodiment, the camera 1200 may be part of or otherwise attached to the robot 1300, as depicted in FIG. 1B. In some cases, the camera 1200 may be attached to a movable portion of the robot 1300, which may provide the robot 1300 with an ability to move the camera 1200 via the movable portion. For instance, FIG. 1C depicts an example in which the robot 1300 includes a robot arm 1400 and an end effector apparatus 1500 which forms one end of the robot arm 1400 or is attached to one end of the robot arm 1400. The end effector apparatus 1500 may be movable via motion of the robot arm 1400. In the example of FIG. 1C, the camera 1200 may be mounted on or otherwise attached to the end effector apparatus 1500. If the end effector apparatus 1500 is a robot hand (e.g., a gripper apparatus), the camera 1200 may be referred to as an on-hand camera. By attaching the camera 1200 to the end effector apparatus 1500, the robot 1300 may be able to move the camera 1300 to different poses (also referred to as camera poses) via motion of the robot arm 1400 and/or end effector apparatus 1500. For example, as discussed below in more detail, the end effector apparatus 1500 may move the camera 1200 to a camera pose that is optimal or particularly effective for sensing information about an object in the camera 1200's environment or in the robot 1300's environment. In another embodiment, as illustrated in FIG. 1D, the camera 1200 may be separate from the robot 1200. For example, the camera 1200 in such an embodiment may be a stationary camera that is mounted on a ceiling or some other location at a warehouse or other premises.

In an embodiment, the computing system 1100 of FIGS. 1A-1D may form or be part of a robot control system (also referred to as a robot controller), which is part of the robot operation system 1000A. The robot control system may be a system that is configured to, e.g., generate movement commands or other commands for the robot 1300. In such an embodiment, the computing system 1100 may be configured to generate such commands based on, e.g., spatial structure information generated by the camera 1200. In an embodiment, the computing system 1100 may form or be part of a vision system. The vision system may be a system which generates, e.g., vision information which describes an environment in which the robot 1300 is located, or more specifically describes an environment in which the camera 1200 is located. The vision information may include the 3D image or the 2D image discussed above, or some other image information. In some cases, if the computing system 1100 forms a vision system, the vision system may be part of the robot control system discussed above, or may be separate from the robot control system. If the vision system is separate from the robot control system, the vision system may be configured to output information describing the environment in which the robot 1300 is located. The information may be outputted to the robot control system, which may receive such information from the vision system and control movement of the robot 1300 based on the information.

In an embodiment, if the computing system 1100 is configured to generate one or more movement commands, the movement commands may include, e.g., a camera placement movement command, an object interaction movement command, and/or a gripper member placement command. In this embodiment, the camera placement movement command may be a movement command used to control placement of the camera 1200, and more specifically to cause the robot 1300 to move the camera 1200 to a particular camera pose, which may include a combination of a particular camera location and a particular camera orientation. The object interaction movement command may be used to control interaction between the robot 1300 and one or more objects, such as a stack of containers in a warehouse. For instance, the object interaction movement command may cause the robot arm 1400 of the robot 1300 to move the end effector apparatus 1500 to approach one of the containers, cause the end effector apparatus 1500 at one end of the robot arm 1400 to pick up the container, and then cause the robot arm 1400 to move the container to a desired destination location (e.g., a conveyor belt). If the end effector apparatus 1500 has at least one gripper member, the gripper member placement command may cause movement of the gripper member relative to the rest of the end effector apparatus, so as to place or otherwise position the gripper member at a location from which it will grip a portion of the container.

In an embodiment, the computing system 1100 may communicate with the camera 1200 and/or with the robot 1300 via a direct connection, such as a connection provided via a dedicated wired communication interface, such as a RS-232 interface, a universal serial bus (USB) interface, and/or via a local computer bus, such as a peripheral component interconnect (PCI) bus. In an embodiment, the computing system 1100 may communicate with the camera 1200 and/or with the robot 1300 via a network. The network may be any type and/or form of network, such as a personal area network (PAN), a local-area network (LAN), e.g., Intranet, a metropolitan area network (MAN), a wide area network (WAN), or the Internet. The network may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol.

In an embodiment, the computing system 1100 may communicate information directly with the camera 1200 and/or with the robot 1300, or may communicate via an intermediate storage device, or more generally an intermediate non-transitory computer-readable medium. Such an intermediate non-transitory computer-readable medium may be external to the computing system 1100, and may act as an external buffer or repository for storing, e.g., image information generated by the camera 1200, storing sensor information generated by the robot 1300, and/or storing commands generated by the computing system 1100. For example, if the intermediate non-transitory computer-readable medium is used to store the image information generated by the camera 1200, the computing system 1100 may retrieve or otherwise receive the image information from the intermediate non-transitory computer-readable medium. Examples of the non-transitory computer readable medium include an electronic storage device, a magnetic storage device, an optical storage device, an electromagnetic storage device, a semiconductor storage device, or any suitable combination thereof. The non-transitory computer-readable medium may form, e.g., a computer diskette, a hard disk drive (HDD), a solid state drive (SDD), a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), and/or a memory stick.

As stated above, the camera 1200 may be a 3D camera and/or a 2D camera. The 2D camera may be configured to generate a 2D image, such as a color image or a grayscale image. The 3D camera may be, e.g., a depth-sensing camera, such as a time-of-flight (TOF) camera or a structured light camera, or any other type of 3D camera. In some cases, the 3D camera may include an image sensor, such as a charge coupled devices (CCDs) sensor and/or complementary metal oxide semiconductors (CMOS) sensor. In an embodiment, the 3D camera may include lasers, a LIDAR device, an infrared device, a light/dark sensor, a motion sensor, a microwave detector, an ultrasonic detector, a RADAR detector, or any other device configured to capture spatial structure information.

As stated above, the image information may be processed by the computing system 1100. In an embodiment, the computing system 1100 may include or be configured as a server (e.g., having one or more server blades, processors, etc.), a personal computer (e.g., a desktop computer, a laptop computer, etc.), a smartphone, a tablet computing device, and/or other any other computing system. In an embodiment, any or all of the functionality of the computing system 1100 may be performed as part of a cloud computing platform. The computing system 1100 may be a single computing device (e.g., a desktop computer), or may include multiple computing devices.

Figure 2A:
FIGS. 2A-2D provide block diagrams that illustrate a computing system configured for receiving and processing image information and/or to perform motion planning consistent with embodiments hereof.

FIG. 2A provides a block diagram that illustrates an embodiment of the computing system 1100. The computing system 1100 includes at least one processing circuit 1110 and a non-transitory computer-readable medium (or media) 1120. In an embodiment, the processing circuit 1110 includes one or more processors, one or more processing cores, a programmable logic controller ("PLC"), an application specific integrated circuit ("ASIC"), a programmable gate array ("PGA"), a field programmable gate array ("FPGA"), any combination thereof, or any other processing circuit. In an embodiment, the non-transitory computer-readable medium 1120, which is part of the computing system 1100, may be an alternative or addition to the intermediate non-transitory computer-readable medium discussed above. The non-transitory computer-readable medium 1120 be a storage device, such as an electronic storage device, a magnetic storage device, an optical storage device, an electromagnetic storage device, a semiconductor storage device, or any suitable combination thereof, for example, such as a computer diskette, a hard disk drive (HDD), a solid state drive (SSD), a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, any combination thereof, or any other storage device. In some instances, the non-transitory computer-readable medium 1120 may include multiple storage devices. In certain cases, the non-transitory computer-readable medium 1120 is configured to store image information generated by the camera 1200. The non-transitory computer-readable medium 1120 may alternatively or additionally store computer readable program instructions that, when executed by the processing circuit 1110, causes the processing circuit 1110 to perform one or more methodologies described here, such as the operation described with respect to FIG. 5.

Figure 2B:
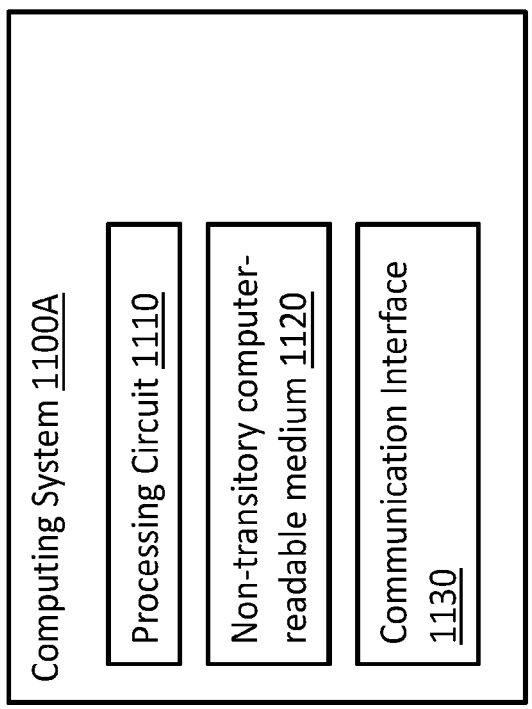

FIG. 2B depicts a computing system 1100A that is an embodiment of the computing system 1100 and includes a communication interface 1130. The communication interface 1130 may be configured to, e.g., receive image information generated by the camera 1200 of FIGS. 1A-1D. The image information may be received via the intermediate non-transitory computer-readable medium or the network discussed above, or via a more direct connection between the camera 1200 and the computing system 1100/1100A. In an embodiment, the communication interface 1130 may be configured to communicate with the robot 1300 of FIGS. 1B-1D. If the computing system 1100 is not part of a robot control system, the communication interface 1130 of the computing system 1100 may be configured to communicate with the robot control system. The communication interface 1130 may include, e.g., a communication circuit configured to perform communication over a wired or wireless protocol. As an example, the communication circuit may include a RS-232 port controller, a USB controller, an Ethernet controller, a Bluetooth® controller, a PCI bus controller, any other communication circuit, or a combination thereof.

In an embodiment, the processing circuit 1110 may be programmed by one or more computer-readable program instructions stored on the non-transitory computer-readable medium 1120. For example, FIG. 2C illustrates a computing system 1100B, which is an embodiment of the computing system 1100/1100A, in which the processing circuit 1110 is programmed by one or more modules, including a motion planning module 1122 and a gripping control module 1124, which are discussed below in more detail.

In an embodiment, the motion planning module 1122 may be configured to determine robot motion for interacting with a container, such as robot motion for a de-palletization operation in which the motion planning module 1122 generates object interaction movement commands for controlling the robot arm 1400 and/or end effector apparatus 1500 of FIG. 1C or FIG. 1D to pick up containers from a pallet and move the containers to a desired destination location. In some cases, the motion planning module 1122 may be configured to generate a motion plan for the robot 1300, or more specifically for the robot arm 1400 and/or the end effector apparatus 1500 to accomplish the de-palletization operation or other interaction. In some cases, the motion plan may include a trajectory for the end effector apparatus 1500 to follow. The trajectory may cause the end effector apparatus 1500 to approach the container or other object, engage the container (e.g., by picking up the container), and move the container to the desired destination location.

Figure 2C:
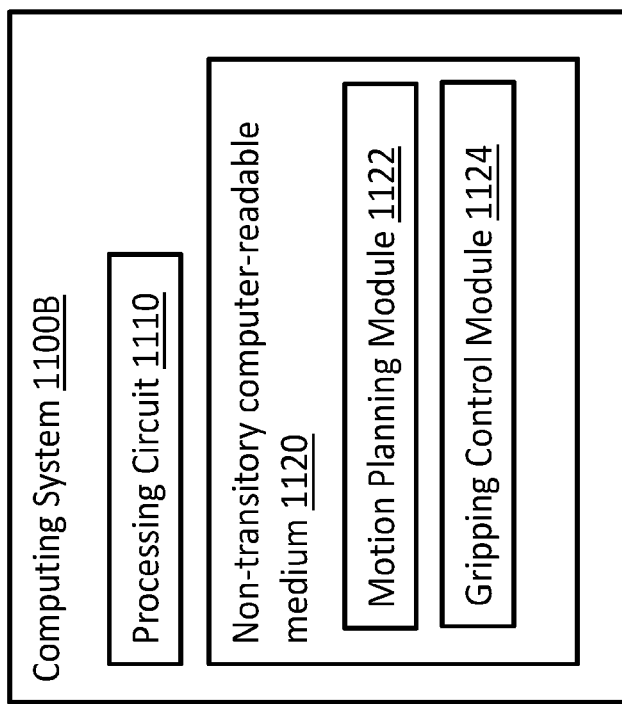
Figure 2D:
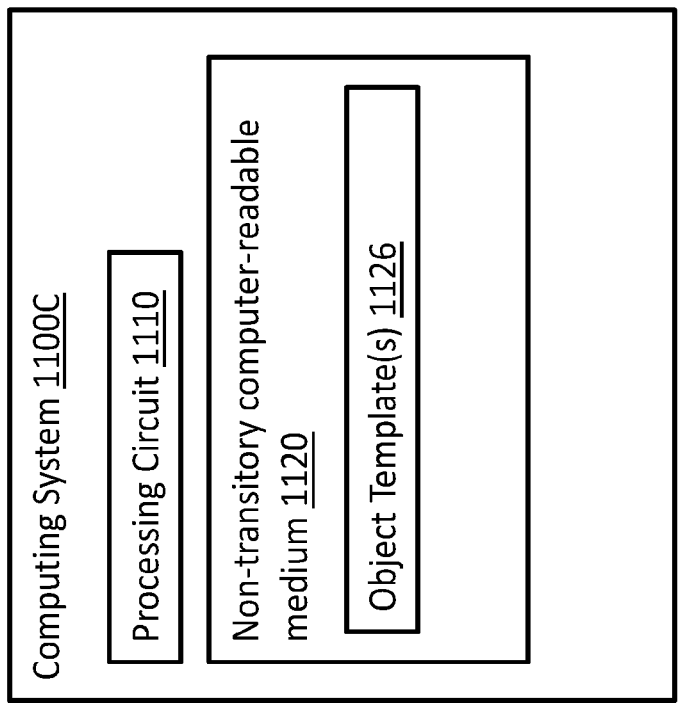

In an embodiment, if the end effector apparatus 1500 of FIGS. 1C and 1D have one or more grippers, the computing system 1100B of FIG. 2C may be configured to execute the gripping control module 1124 to control the one or more grippers. As discussed below in more detail, the one or more grippers may be movable to different locations, and may transition from an open state to a closed state for picking up or otherwise engaging an object, and may transition from the closed state to the open state for releasing the object. In this embodiment, the gripping control module 1124 may be configured to control movement of the one or more grippers to the different locations, and/or to control whether the one or more grippers are in the open state or the closed state. It will be understood that the functionality of the modules as discussed herein is representative and not limiting.

In various embodiments, the terms "computer-readable instructions" and "computer-readable program instructions" are used to describe software instructions or computer code configured to carry out various tasks and operations. In various embodiments, the term "module" refers broadly to a collection of software instructions or code configured to cause the processing circuit 1110 to perform one or more functional tasks. The modules and computer-readable instructions may be described as performing various operations or tasks when a processing circuit or other hardware component is executing the modules or computer-readable instructions.

In an embodiment, the non-transitory computer-readable medium 1120 may store or otherwise include one or more object templates 1126 (e.g., container templates) that are used to describe a particular visual design, physical design, or other aspect of an object design for an object or object type (also referred to as a class of objects). For example, if the object is a container, the object templates 1126 may each describe a particular container design, which may include a visual design for a container or container type (also referred to as a class of containers), and/or a physical design for the container or container type. In some implementations, each of the object templates 1126 may include an object appearance description (also referred to as visual description information) that describes the visual design, and/or may include an object structure description (also referred to as structure description information) that describes the physical design. In some instances, the object appearance description may include one or more visual descriptors which represent a pattern or other visual detail (e.g., logo or picture) that form the visual design. In some instances, the object structure description may include values which describe a size (e.g., a dimension such as length or width) of or associated with an object or object type, or which describe a shape of or associated with the object or object type, and/or may include a computer-aided design (CAD) file that describes a structure of the object or object type. In some cases, the object templates 1126 may be used to perform object recognition, which may involve determining whether an object in an environment of the camera 1200 and/or the robot 1300 of FIGS. 1A-1D match any of the object templates 1126, wherein a match may indicate that the object is associated with an object type described by the matching template. The object templates 1126 may have been, e.g., generated as part of an object registration process, and/or may have been received (e.g., downloaded) from a source such as a server. Templates are discussed in more detail in U.S. patent application Ser. No. 16/991,466 and in U.S. patent application Ser. No. 16/991,510, the entire contents of which are incorporated by reference herein.

Figure 3A:
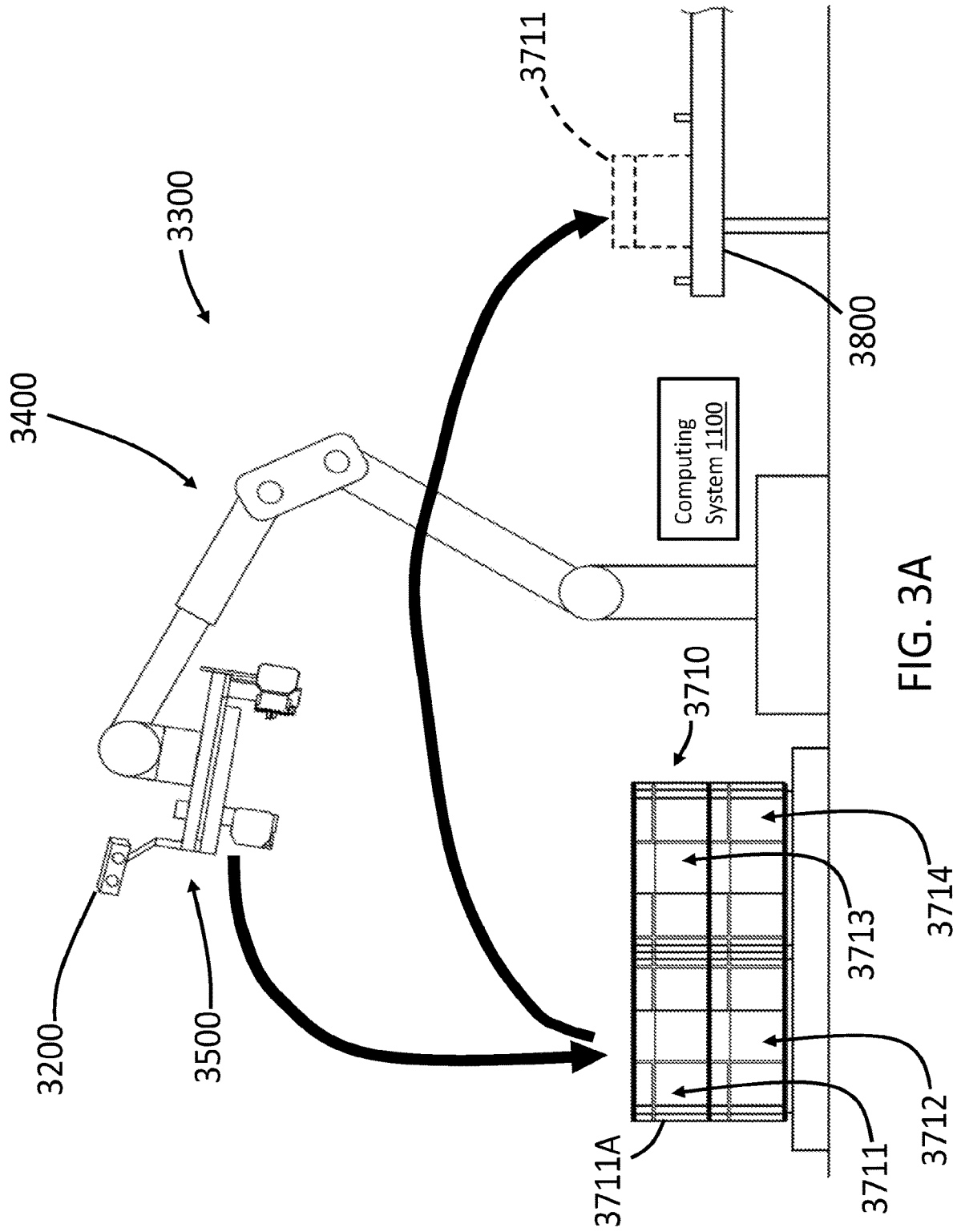
FIGS. 3A and 3B illustrate an environment having a robot arm and an end effector apparatus for executing a motion plan, consistent with an embodiment hereof.
Figure 3B:
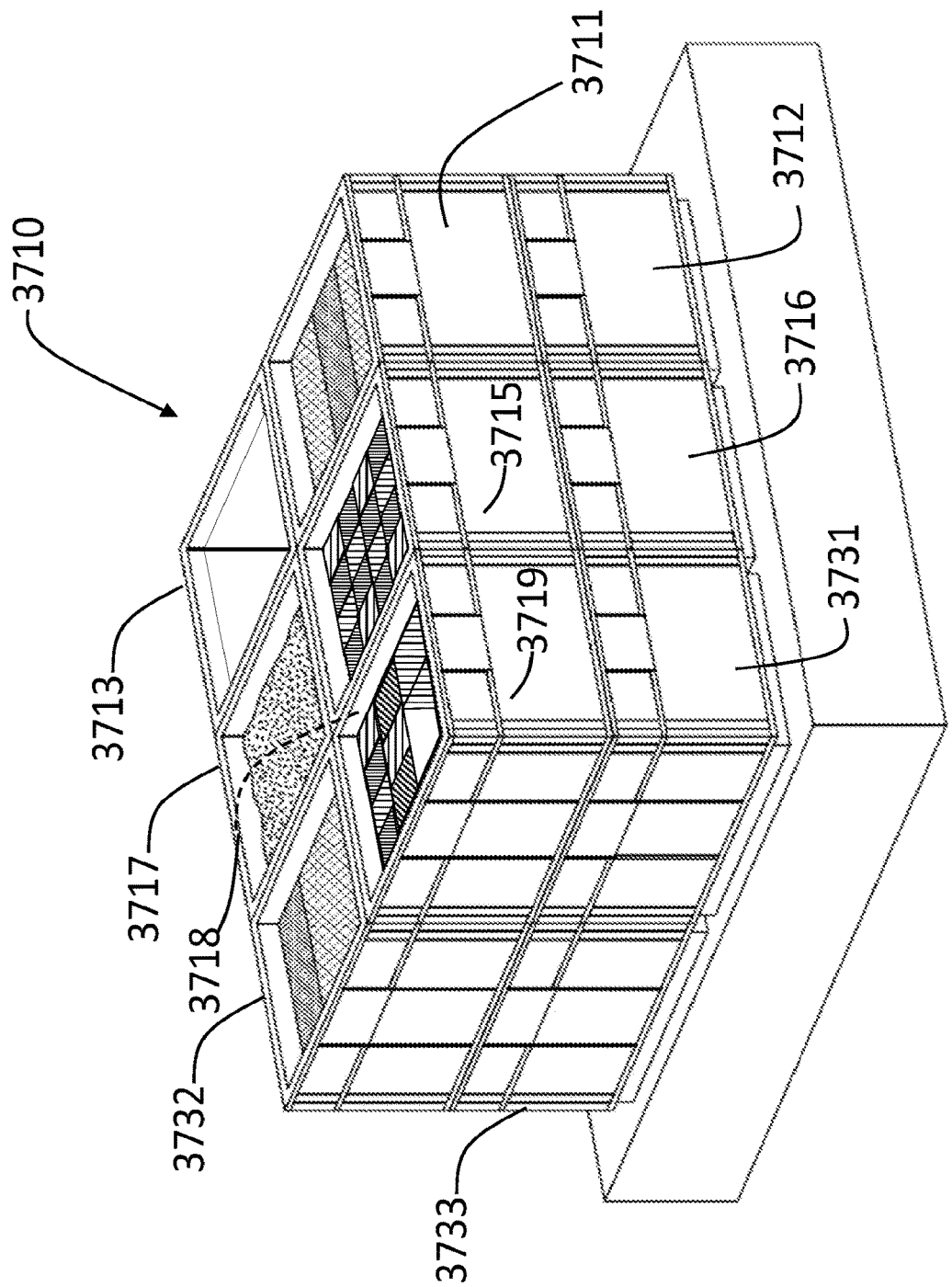

FIGS. 3A and 3B illustrate an example environment in which motion planning for robot interaction may be performed. More particularly, the environment includes the computing system 1100, a camera 3200 (which may be an embodiment of the camera 1200 of FIGS. 1A-1D), and a robot 3300 (which may be an embodiment of the robot 1300). In this embodiment, the robot 3300 may include a robot arm 3400 and an end effector apparatus 3500. In an embodiment, the end effector apparatus 3500 may form one end of the robot arm 3400, or be attached to one end of the robot arm 3400.

In the example of FIG. 3A, the robot 3300 may, via the robot arm 3400, operate to move the end effector apparatus 3500 toward one or more objects, such as a stack of crates or other containers on a pallet, to engage the one or more objects, and to move the one or more objects from the pallet to another location (e.g., as part of a de-palletization operation). More specifically, FIGS. 3A and 3B depict an environment having a stack 3710 of objects, or more specifically a stack of crates or other containers. In some scenarios, as illustrated in FIG. 3B, some or all of the containers may hold smaller objects in the containers (which may also be referred to as items in the containers). The stack 3710 in FIGS. 3A and 3B may include at least objects 3711-3719 and 3731-3733, while the end effector apparatus 3500 may be used to pick up one of the objects in the stack 3710, such as object 3711 (e.g., pick up a container in the stack), and to move the object from the stack 3710 to a destination location, such as a location on a conveyor 3800. To pick up the object 3711, the end effector apparatus 3500 may be moved and tilted to align with the object 3711. The movement of the end effector apparatus 3500 may involve movement of the robot arm 3400, such as movement in which one or more links of the robot arm 3400 rotate relative to each other. In the environment depicted in FIGS. 3A and 3B, an object on the pallet may have a 3D pattern on at least one of its outer side surfaces. For instance, the 3D pattern may be a pattern of ridges (also referred to as a ridge pattern) protruding from an outer side surface. As an example, FIG. 3A depicts a ridge pattern 3711A on an outer side surface of the object 3711. In some cases, an object on the pallet may have visual detail forming a 2D pattern on its outer side surface, such as a logo or other visual pattern.

Figure 4A:
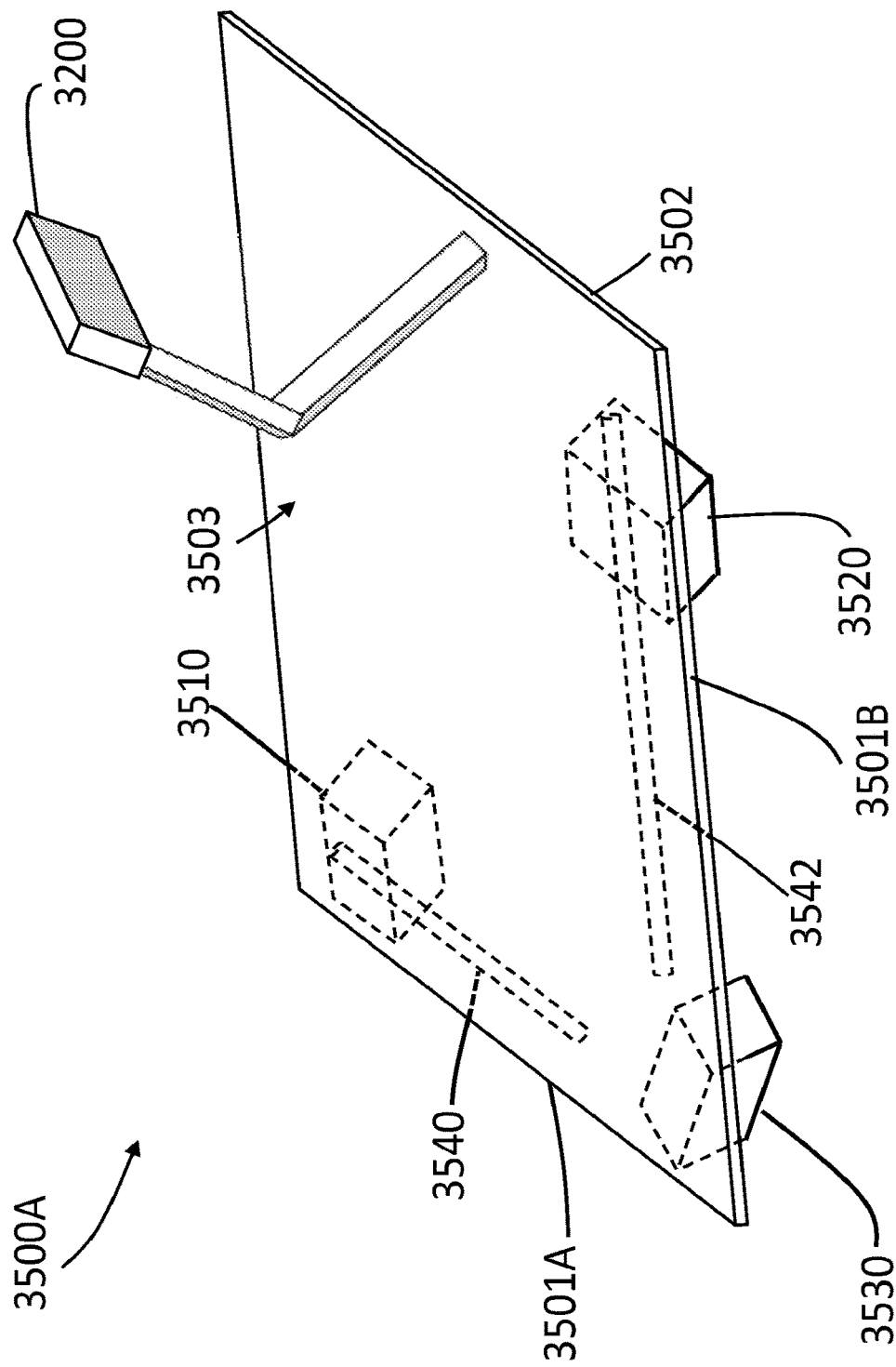
FIGS. 4A-4D illustrate various end effector apparatuses, consistent with embodiments hereof.
Figure 4B:
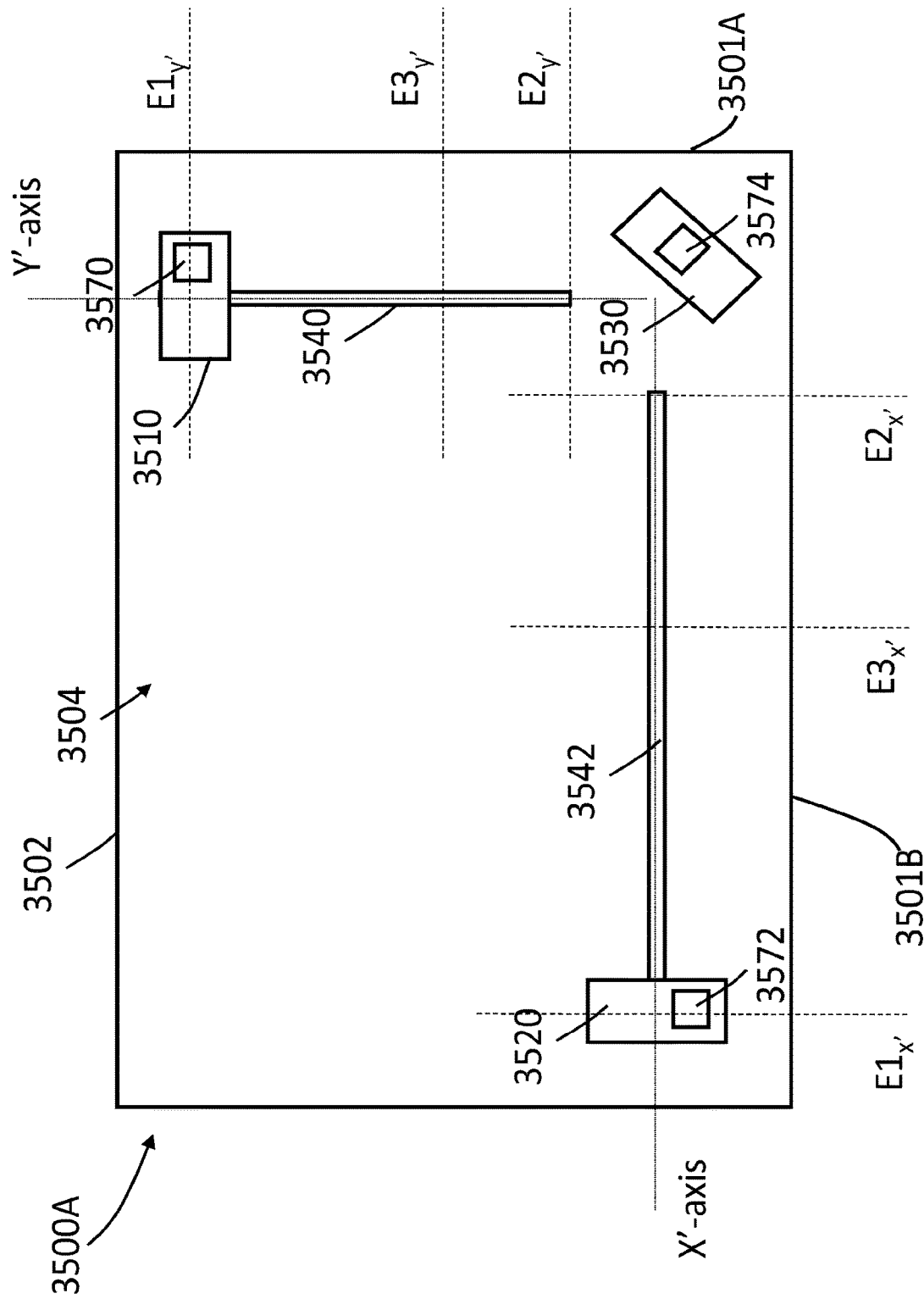
Figure 4C:
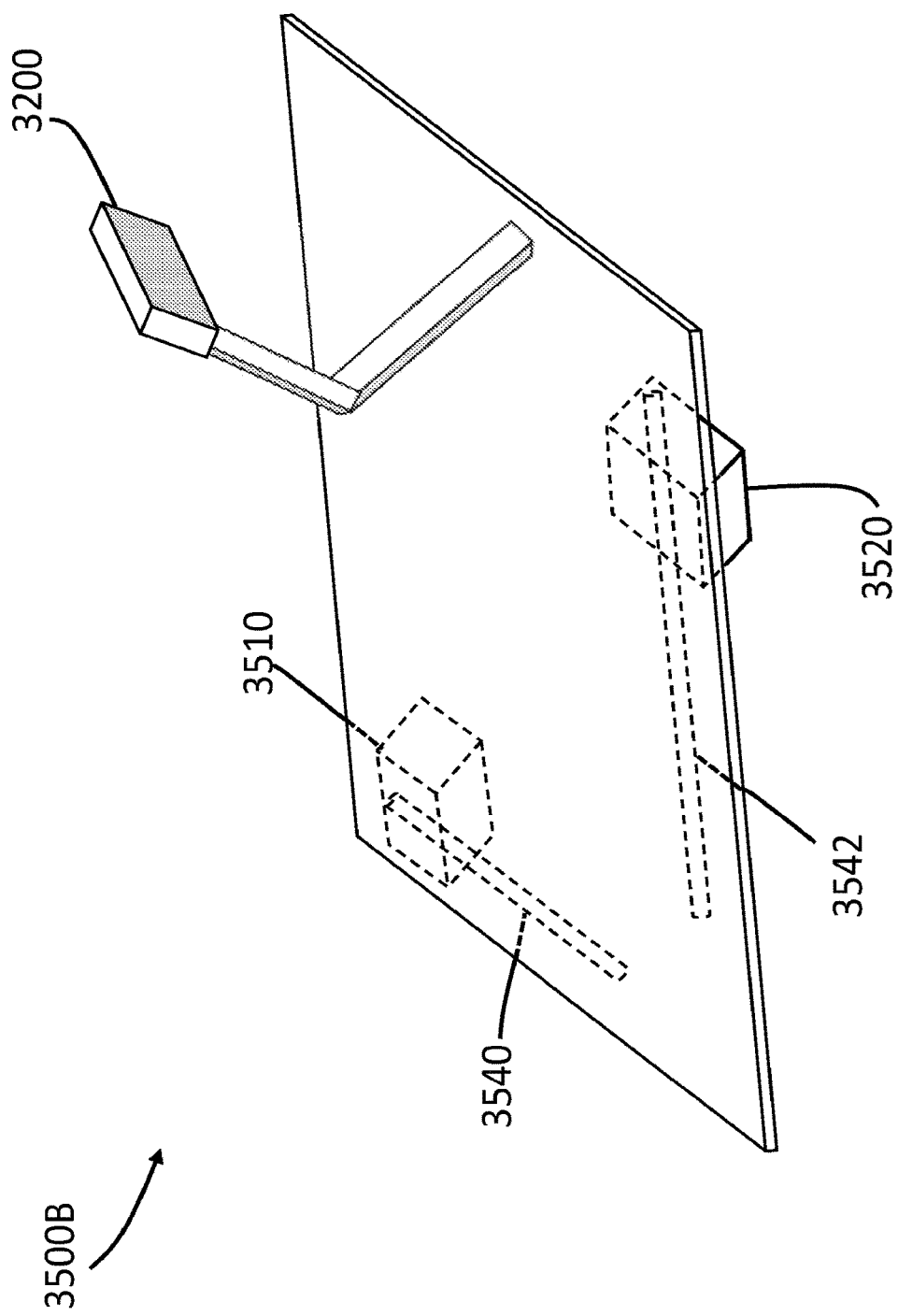

FIGS. 4A and 4B depict an end effector apparatus 3500A, which may be an embodiment of the end effector apparatus 3500. In this embodiment, the end effector apparatus 3500A includes a mounting structure 3502, the camera 3200, a first gripper member 3510 (also referred to as a first gripping member), a second gripper member 3520, and a third gripper member 3530. FIG. 4C depicts an end effector apparatus 3500B, which is similar to the end effector apparatus 3500A, but does not have the third gripper member 3530. The camera 3200 in FIGS. 4A-4C may be mounted on or otherwise attached to a first surface 3503 (e.g., top surface) of the mounting structure 3502 (e.g., a mounting plate), while the gripper members 3510-3530 may be mounted on or otherwise attached to a second and opposite surface 3504 (e.g., bottom surface) of the mounting structure 3502. In some cases, the end effector apparatus 3500/3500A may be mounted on or otherwise coupled to the robot arm 3400 at the first surface (e.g., top surface) of the mounting structure 3502. For instance, the first surface 3503 may have a mounting bracket disposed thereon, wherein the mounting bracket may operate as a coupling point between the end effector apparatus and a robot arm 1400/3400. In these cases, the second surface (e.g., bottom surface) of the end effector apparatus may be oriented to face one or more crates or other containers in an environment of the robot 3300.

Figure 4D:
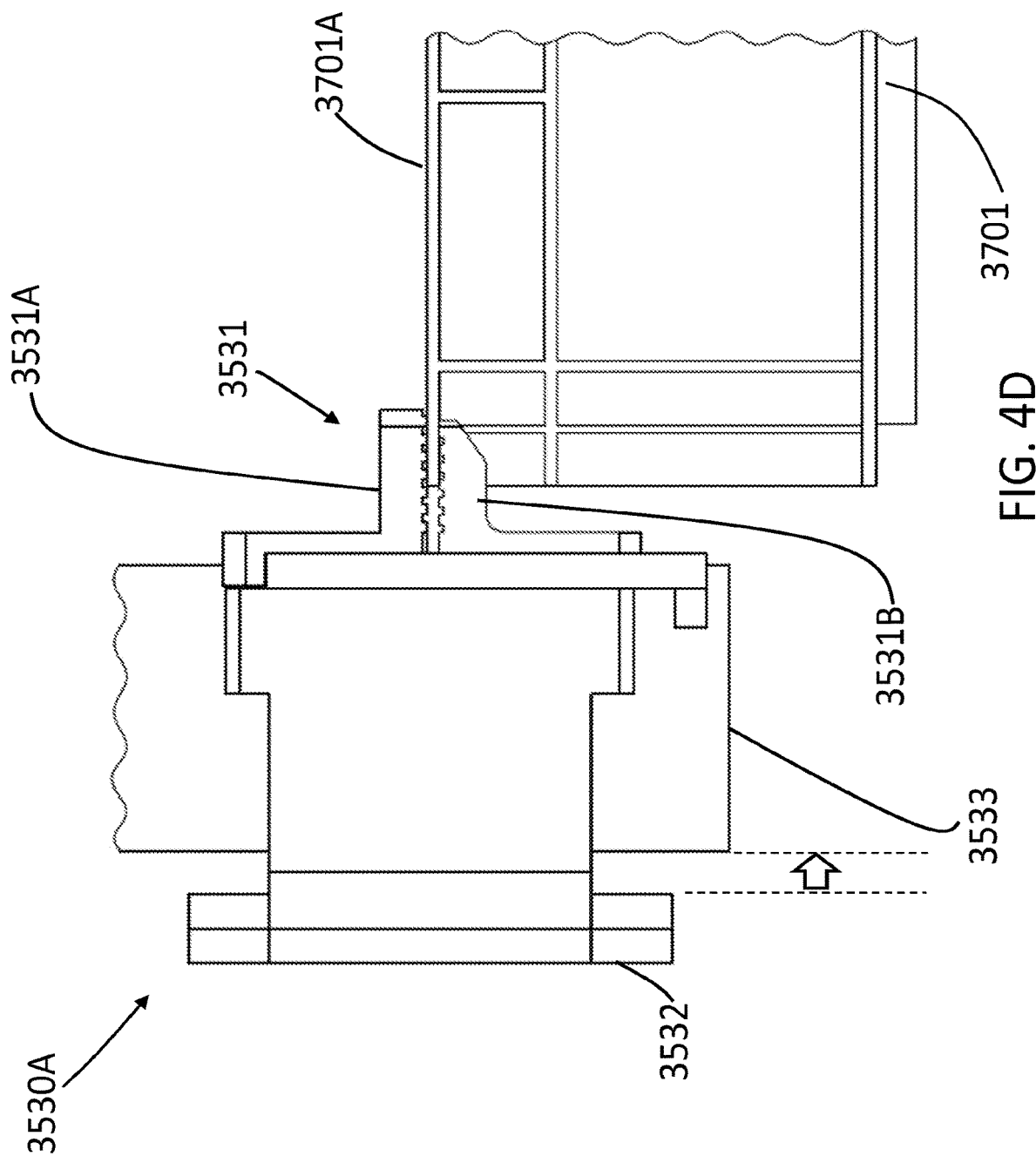

In an embodiment, some or all of the first gripper member 3510, the second gripper member 3520, and the third gripper member 3530 may each include a gripper body which is formed by or is attached to a respective gripper finger assembly. For instance, FIG. 4D depicts a gripper member 3530A, which may be an embodiment of the gripper member 3530, that includes a gripper finger assembly 3531 that is part of or attached to a gripper body 3533. The gripper finger assembly 3531 may be used to grip an object (e.g., a container) by clamping around or pinching a portion of the object, such as a corner of a lip 3701A which forms an outer edge of a container 3701. In the example of FIG. 4D, the gripper finger assembly 3531 may include two components, also referred to as gripper fingers 3531A, 3531B, that may be movable relative to each other (e.g., gripper fingers 3531A and 3531B may both move toward or away from each other, or one of the gripper fingers 3531A/3531B may remain static, while the other gripper finger 3531B/3531A moves). For example, the two gripper fingers 3531A, 3531B may form a chuck or clamp, in which the two gripper fingers are movable toward each other to grip the portion of the object, or to tighten a grip around the object, and in which the two gripper fingers 3531A, 3531B are movable away from each other to loosen the grip, or to release the object. In some scenarios, one of the two gripper fingers (e.g., 3531A) may be an upper gripper finger, while the other one of the two gripper fingers (e.g., 3531B) may be a lower gripper finger. In the example of FIG. 4D, the gripper member 3530A may further include a backplate 3532, wherein the gripper body 3533 may be movable relative to the backplate 3532. The relative movement may be in an inward direction toward a center of the mounting structure 3502 of FIGS. 4A and 4B, or in an outward direction away from the center of the mounting structure 3502. The gripper member 3530A may further include a sensor 3517 which is configured to detect inward movement of the gripper finger assembly 3531 and of the gripper body 3533. In an embodiment, the first gripper member 3510 and the second gripper member 3520 may each have the same or similar gripper finger assembly as what is depicted in FIG. 4D. Such gripper finger assemblies may each include at least a pair of gripper fingers for clamping around a portion of an object. When the end effector apparatus 3500 is being used to grip a portion of an object, such as a portion of a container lip, at least one of the pair of gripper fingers of a gripper member (e.g., 3510) may be movable in a direction (e.g., upward direction) toward the other gripper finger, so that the two gripper fingers make contact with the portion of the object, and more specifically pinch the portion of the object. When the end effector apparatus 3500 is to release the container, the at least one gripper finger may be movable in an opposite direction (e.g., downward direction), away from the other gripper finger, so that the pair of gripper fingers release the portion of the object.

In the embodiment of FIGS. 4A and 4B, the first gripper member 3510 and the second gripper member 3520 may each be a movable gripper member, while the third gripper member 3530 may be a fixed gripper member. More particularly, the first gripper member 3510 may be movable (e.g., slidable) along a first edge 3501A of the mounting structure 3502, while the second gripper member 3520 may be movable along a second edge 3501B of the mounting structure 3502 that is perpendicular to the first edge 3501A. More particularly, the first gripper member 3510 may be movable along a first axis, such as a Y'-axis in FIG. 4B, which may be a longitudinal axis of a first rail 3540. The second gripper 3520 may be movable along a second axis, such as a X'-axis in FIG. 4B, which may be a longitudinal axis of a second rail 3542. The first axis may be parallel with the first edge 3501A, while the second axis may be parallel with the second edge 3501B, such that the first rail 3540 may be perpendicular to the second rail 3542. In this example, the third gripper member 3530 may be disposed at a corner of the mounting structure 3502, wherein the corner may be at or near a location at which the first axis in FIG. 4B intersects the second axis. The gripper members 3510-3530 may each be able to grip or otherwise engage a respective portion of an object, or more specifically a respective portion of its object structure, as discussed below in more detail. In some scenarios, the first gripper member 3510 operates to engage one side (e.g., left side) of an object, while the second gripper member 3520 operates to engage another side (e.g., front side) of the object, and the third gripper member 3530 operates to engage a corner of the object. For example, the first gripper member 3510 and the second gripper member 3520 may engage with two perpendicular sides of an object, respectively, while the third gripper member 3530 may engage with a corner of the object that is located between the two perpendicular sides.

As stated above, the first gripper member 3510 may be movable relative to the second surface (e.g., bottom surface) of the mounting structure 3502 via the first rail 3540, while the second gripper member 3520 may be movable relative to the second surface of the mounting structure 3502 via the second rail 3542. The first rail 3540 may extend along a Y'-axis, while the second rail 3542 may extend along a X'-axis, which is perpendicular to the Y'-axis. In some scenarios, the first rail 3540 may extend from a location that is near a first corner of the mounting structure 3502 (e.g., a corner at which the third gripper member 3530 is located) to another location that is near a second corner of the mounting structure 3502. Further, the second rail 3542 in such scenarios may extend from the location near the first corner of the mounting structure 3502 to a location which is near a third corner of the mounting structure 3502. The first rail 3540 and the second rail 3542 may allow the end effector apparatus 3500A to accommodate a range of different object sizes. For example, sliding the first gripper member 3510 along the first rail 3540 and sliding the second gripper member 3520 along the second rail 3542 may vary where the first gripper member 3510 and the second gripper member 3520 grip an object (that is, vary grip points at which the end effector apparatus 3500A grips the object).

More particularly, sliding the first gripper member 3510 allows the end effector apparatus 3500A to accommodate different values of a first dimension (e.g., width dimension) of various objects, while sliding the second gripper member 3520 along the second rail 3550 may allow the end effector apparatus 3500A to accommodate different values of a second dimension (e.g., length dimension) of various objects. For example, the end effector apparatus 3500A may have a variable grip size (also referred to as a variable span), which may describe a size of a region which is defined by where the first gripper member 3510 and the second gripper member 3520 are located. The region may represent a reach or coverage of the gripper members 3510, 3520. More specifically, the region may have a first corner at a location of the first gripper member 3510, a second corner at a location of the third gripper member 3520, and a third corner at a location at which the first axis (e.g., Y'-axis) intersects the second axis (e.g., X'-axis), also referred to as an intersection location. Increasing a size of the region, and thus increasing the grip size of the end effector apparatus 3500A, may increase an object size that the end effector apparatus 3500A is able to grip. The grip size may increase as the first gripper member 3510 or the second gripper member 3510 moves away from the intersection location. More particularly, the grip size of the end effector apparatus 3500A may be defined by at least a first dimension and a second dimension. The first dimension of the grip size may be defined by a distance from the intersection location to a location of the first gripper member, while the second dimension of the grip size may be defined by a distance from the intersection location to a location of the second gripper member. In this example, the first dimension of the grip size increases in value as the first gripper member 3510 moves along the first rail 3540 away from the intersection location, while the second dimension of the grip size increases in value as the second gripper member moves along the second rail 3542 away from the intersection location.

In an embodiment, the first rail 3540 and the second rail 3542 may have the same size. In another embodiment, the first rail 3540 and the second rail 3542 may have different sizes. For instance, as illustrated in FIG. 4B, the second rail 3542 may be longer than the first rail 3540. As stated above, the grip size of the end effector apparatus 3500A may have a first dimension that is defined by a distance between the first gripper member 3510 and an intersection point at which the X'-axis intersects the Y'-axis, and may have a second dimension that is defined by a distance between the second gripper member 3520 and the intersection point. In this embodiment, the longer size of the second rail 3542 may allow a maximum distance between the second gripper member 3520 and the intersection point to be greater than a maximum distance between the first gripper member 3510 and the intersection point. That is, the maximum distance between the second gripper member 3520 and the intersection point is based on a size of the second rail 3542, while the maximum distance between the first gripper member 3510 and the intersection point is based on a size of the first rail 3540. Thus, the longer size of the second rail 3542 may cause a maximum value for the second dimension of the grip size of the end effector apparatus 3500A to be greater than a maximum value for the first dimension of the grip size. Such an embodiment may allow the end effector apparatus 3500A to accommodate objects which has a first dimension (e.g., width dimension) that differs in value from a second dimension (e.g., length dimension). For instance, if the end effector apparatus 3500A is used to grip a rectangular object which has a first side and has a second side longer than the first side, the end effector apparatus 3500A may be oriented so that the second rail 3542 is aligned with the second side of the rectangular object. This is because the second rail 3542 is longer than the first rail 3540, such that a maximum distance the second gripper member 3520 is able to slide (relative to the intersection point discussed above) is greater than a maximum distance the first gripper member 3510 is able to slide (relative to the intersection point). As a result, the second rail 3542 and the second gripper member 3520 may be better able to accommodate the second, longer side of the rectangular object, while the first rail 3540 and the first gripper member 3510 may be used to accommodate the first, shorter side of the rectangular object.

In an embodiment, the computing system 1100 and/or the robot 1300/3300 may be configured to control an amount the first gripper member 3510 moves along the first rail 3540, and/or an amount the second gripper member 3520 moves along the second rail 3542. For instance, as discussed below in more detail, the computing system 1100 and/or the robot 1300/3300 may be configured to control one or more actuators which are used to cause movement of the first gripper member 3510 and movement of the second gripper member 3520, and/or to control a braking mechanism used to stop that movement. The one or more actuators may be controlled via, e.g., one or more gripper member placement commands, which the computing system 1100 may be configured to generate and output to the robot 1300/3300 (e.g., via the communication interface). In some scenarios, the computing system 1100 and/or the robot 1300/3300 may control the respective amounts of movement of the first gripper member 3510 and the second gripper member 3520 based on an object size (e.g., based on respective values of length dimension and width dimension) for an object that is to be gripped by the end effector apparatus 3500A. For instance, the amount of movement of the first gripper member 3510 along the first rail 3540 may be controlled so that a first dimension of the end effector apparatus 3500A's grip size has a value which is at least a predefined percentage of a value for a first dimension of the object (e.g., the first dimension of the grip size is at least 50% of a value of the width dimension of the object, or is equal to the value of the width dimension). Similarly, the amount of movement of the second gripper member 3520 along the second rail 3542 may be controlled in a manner such that a second dimension of the end effector apparatus 3500A's grip size has a value which is at least the predefined percentage of a value for a second dimension of the object (e.g., the second dimension of the grip size is at least 50% of a value of the length dimension of the object, or is equal to the value of the length dimension). In such an example, a corner of the mounting structure 3502 (e.g., a corner at which the third gripper member 3530 is located) may be aligned with a corner of the object. In this example, the corner of the object may be gripped by the third gripper member 3530, while the placement of the first gripper member 3510 and the second gripper member 3520 may cause the grip points at which the gripper members 3510, 3520 grip the object to be sufficiently far from that corner of the object (at which it is gripped by the third gripper member 3530) such that an overall grip of the object by the gripper members 3510, 3520, and/or 3530 is balanced and stable.

In some scenarios, the first gripper member 3510 and the second gripper member 3520 may be configured to be moved along the first rail 3540 and the second rail 3542, respectively, by one or more actuators, such as a pneumatic actuator, an electro-magnetic actuator, an electro-mechanical actuator, any other actuator, or a combination thereof. The one or more actuators may be part of the end effector apparatus 3500A, or may more generally be part of the robot 1300/3300 or of the system 1000 of FIG. 1A. The one or more actuators may be configured to generate a first force that actuates the first gripper member 3510 in a first direction along the Y'-axis or in a second and opposite direction along the Y'-axis, so as to cause movement of the first gripper member 3510 in the first direction or the second direction along the Y'-axis. The first direction along the Y'-axis may cause the first gripper member 3510 to move toward the third gripper member 3530, while the second direction along the Y'-axis may cause the first gripper member 3510 to move away from the third gripper member 3530. The one or more actuators may be configured to generate a second force that actuates the second gripper member 3520 in a first direction along the X'-axis or in a second and opposite direction along the X'-axis, so as to cause movement of the second gripper member 3520 in the first direction or movement of the second gripper member 3520 in the second direction along the X'-axis. The first direction along the X'-axis may cause the second gripper member 3520 to move toward the third gripper member 3530, while the second direction along the X'-axis may cause the second gripper member 3520 to move away from the third gripper member 3530.

In an embodiment, as stated above, the one or more actuators may include any type of actuator, such as a pneumatic actuator, electro-magnetic actuator, or electro-mechanical actuator. The one or more actuators may be part of the end effector apparatus 3500, or may be considered separate from the end effector apparatus 3500. For instance, the one or more actuators may include a plurality of electro-magnetic actuators (e.g., motors or solenoids) that are mounted on the mounting structure 3502 and are part of the end effector apparatus 3500. In another example, the one or more actuators may include a pneumatic actuator (e.g., pump) that is configured to generate pneumatic or hydraulic pressure inside a pneumatic or hydraulic tube, and the end effector apparatus 3500 may include a port that is configured to be coupled to or otherwise receive the pneumatic or hydraulic tube. The port may direct the pneumatic or hydraulic pressure generated by the pneumatic actuator to the first gripper member 3510 and/or the second gripper member 3520. The pneumatic or hydraulic pressure may push on a gripper body of the first gripper member 3510 to cause movement thereof along the first rail 3540, and/or may push on a gripper body of the second gripper member 3530 to cause movement thereof along the second rail 3542.

In an embodiment, the one or more actuators may be configured to cause other movement in the end effector apparatus 3500A. For instance, the one or more actuators may be configured to cause relative movement within each of the gripper finger assemblies described above, or more specifically cause relative movement between a first gripper finger and a second gripper finger of a gripper finger assembly.

In some scenarios, the one or more actuators may be configured to cause a gripper finger assembly and/or gripper body of the first gripper member 3510 (e.g., a portion of the gripper body that includes the gripper fingers of the first gripper member 3510) to extend along an axis that is perpendicular to the first rail 3540. The movement may be in an inward direction or outward direction relative to the mounting plate 3502, and may be parallel with an upper surface or bottom surface the mounting plate 3502. Similarly, the one or more actuators may be configured to cause a gripper finger assembly and/or gripper body of the second gripper member 3520 (e.g., a portion of the gripper body that includes the gripper fingers of the second gripper member 3520) to extend along an axis that is perpendicular to the second rail 3542. The movement may also be in an inward direction or outward direction relative to the mounting plate 3502, and may be parallel with an upper surface or bottom surface of the mounting plate 3502. For instance, if the end effector apparatus 3500A is used to grip a container having a container lip forming or surrounding an edge of the container, the movement described above may occur after the first gripper member 3510 has been positioned at a particular location along the first rail 3540, and may cause the gripper finger assembly of the first gripper member 3510 to be moved closer toward a first portion of the container lip, so that the first portion of the container lip is between the pair of gripper fingers of the gripper finger assembly. Such a movement allows the gripper fingers to clamp around the first portion of the container lip. The movement described above may further allow the gripper finger assembly of the second gripper member 3520 to be moved closer toward a second portion of the container lip, so that its gripper fingers can clamp around the second portion of the container lip. Additionally, the one or more actuators may be configured to cause movement of a gripper finger assembly 3531A of the third gripper member 3530 toward a corner of the container lip, as illustrated in FIG. 4D. The movement may be along an axis that is oblique relative to the X'-axis and the Y'-axis of FIG. 4B (e.g., 45 degrees relative to the X'-axis).

In an embodiment, the end effector apparatus 3500A may be configured to engage with and move objects of varying respective sizes. To achieve this, the movement of the first gripper member 3510 along the first rail 3540 and the movement of the second gripper member 3520 along the second rail 3542 may be controlled by the computing system 1100 and/or by the robot 3300. For instance, the first gripper member 3510 may be movable between end positions $E1_{y'}$ and $E2_{y'}$, which are illustrated in FIG. 4B, and the second gripper member 3520 may be movable between end positions $E1_{x'}$ and $E2_{x'}$. The first gripper member 3510 may further be movable to an intermediate position (e.g., $E3_{y'}$) between the two end positions $E1_{y'}$ and $E2_{y'}$. Similarly, the second gripper member 3510 may further be movable to an intermediate position (e.g., $E3_{x'}$) between the two end positions $E1_{x'}$ and $E2_{x'}$. Thus, the first gripper member 3510 and the second gripper member 3520 may be moved into different positional configurations thereby enabling the end effector apparatus 3500 to engage with objects that have different sizes.

In an embodiment, the computing system 1100 and/or the robot 1300/3300 may be configured to control movement of the first gripper member 3510 along the first rail 3540 and movement of the second gripper member 3520 along the second rail 3542 by controlling the one or more actuators and/or a stopping mechanism (e.g., braking mechanism). For instance, the computing system 1100 and/or the robot 1300/3300 may be configured to control whether the one or more actuators are activated, which actuator of the one or more actuators are activated, a level (e.g., power level) at which the one or more actuators are activated, and/or a duration at which the one or more actuators are activated. For instance, if the computing system 1100 and/or the robot 1300/3300 has determined a position (e.g., $E3_{x'}$ or $E3_{y'}$) at which the first gripper member 3510 or the second gripper member 3520 is to be positioned, the computing system 1100 and/or the robot 1300/3300 may activate an actuator to cause the first gripper member 3510 or the second gripper member 3520 to move toward the determined position, and to deactivate the actuator with a timing that causes the first gripper member or the second gripper member 3520 to stop at the determined position. In some scenarios, if the end effector apparatus 3500A includes a stopping mechanism, the computing system 1100 and/or the robot 1300/3300 may be configured to activate the stopping mechanism as the first gripper member or the second gripper member 3520 is approaching the determined position, so as to cause the first gripper member or the second gripper member 3520 to stop at the determined position.

In an embodiment, the end effector apparatus 3500A of may include one or more sensors for measuring movement of the gripper members 3510, 3520, and/or detecting presence (e.g., proximity) of a container or other object to be engaged (e.g., gripped) by the end effector apparatus 3500A. For instance, the one or more sensors may include a first gripper body sensor (e.g., optical sensor, mechanical sensor, electro-mechanical sensor) configured to measure or otherwise determine a location of the first gripper member 3510 along the first rail 3540, and a second gripper body sensor configured to measure or otherwise determine a location of the second gripper member 3520 along the second rail 3542.

In some scenarios, the one or more sensors may include a first gripper member proximity sensor 3570, a second gripper member proximity sensor 3572, and a third gripper member proximity sensor 3574, as illustrated in FIG. 4B. The first gripper member proximity sensor 3570 may be disposed at and/or part of the first gripper member 3510, while the second gripper member proximity sensor 3572 may be disposed at and/or part of the second gripper member 3520, and the third gripper member proximity sensor 3574 may be disposed at and/or part of the third gripper member 3530. The gripper member proximity sensors 3570, 3572, 3574 operate to detect proximity of a container or other object to be gripped by or otherwise engaged by the end effector apparatus 3500A. For example, to engage with and pick up an object, such as the object 3711 of FIG. 3A, the computing system 1100 and/or robot 3300 may, via the robot arm 3400, cause the end effector apparatus 3500 to move toward the object 3711. The gripper body proximity sensors 3570, 3572, 3574 operate to detect when the gripper members 3510, 3520, and 3530 are within a defined (e.g., predefined) threshold distance from the object 3711, and/or when the gripper members 3510, 3520, 3530 are aligned with the object 3711. In some instances, if the end effector apparatus 3500A approaches the object 3711 by being lowered toward the object 3711, then the gripper member proximity sensors 3570, 3572, 3574 may detect when the gripper members 3510, 3520, 3530 of the end effector apparatus 3500A have been lowered sufficiently such that they are at a same height as a portion of the object 3711 (e.g., container lip) to be gripped. The gripper member proximity sensors 3570, 3572, and 3574 may each include a mechanical sensor, an electro-mechanical sensor, an optical sensor, or any other type of sensor configured to detect proximity between the sensor and an object.

In some scenarios, the one or more sensors may include a first gripper finger sensor, a second gripper finger sensor, and a third gripper finger sensor. In these scenarios, each of the first gripper member 3510, second gripper member 3520, and the third gripper member 3530 may include a respective gripper finger assembly having at least a pair of gripper fingers. The first gripper finger sensor, second gripper finger sensor, and third gripper finger sensor may each be configured to measure or otherwise determine relative position of a respective pair of gripper fingers for a respective gripper finger assembly, and/or detect whether there is an object or portion thereof between the respective pair of gripper fingers. The gripper finger sensors may each be used to control relative movement between a respective pair of gripper fingers. For instance, if a particular gripper finger sensor indicates that a container lip is disposed between a respective pair of gripper fingers being monitored by the gripper finger sensor, the computing system 1100 and/or robot 1300/3300 may control the one or more actuators discussed above to cause the pair of gripper fingers to move toward each other, so as to clamp around the portion of the object.

Figure 5:
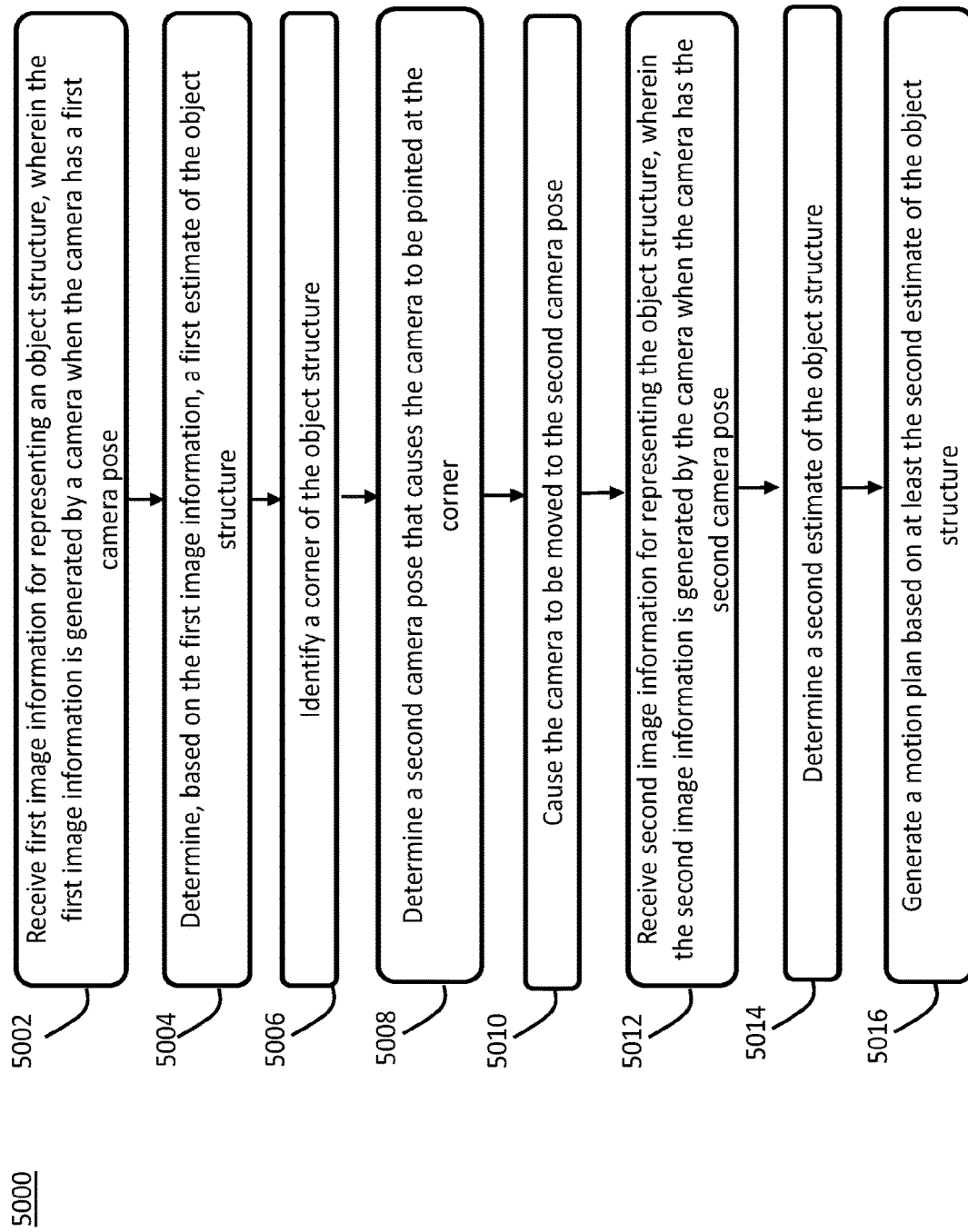
FIG. 5 illustrates a flow diagram which illustrates an example method for generating a motion plan, according to an embodiment hereof.

As stated above, one aspect of the present application relates to performing motion planning, which may be used to facilitate robot interaction, such as an interaction in which a robot moves an object from a current location to a destination location. FIG. 5 depicts a flow diagram for an example method 5000 for performing motion planning. The method 5000 may be performed by, e.g., the computing system 1100 of FIGS. 2A-2D or of FIG. 3A, or more specifically by the at least one processing circuit 1110 of the computing system 1100. In some scenarios, the at least one processing circuit 1100 may perform the method 5000 by executing instructions stored on a non-transitory computer-readable medium, such as the non-transitory computer-readable medium 1120. For instance, the instructions may cause the processing circuit 1110 to execute the motion planning module 1122, which may perform method 5000. In an embodiment, the method 5000 may be performed in an environment in which the computing system 1100 is in communication with a robot and a camera, such as the robot 3300 and the camera 3200 in FIGS. 3A and 3B, or with any other robot discussed in this disclosure. In some scenarios, the camera (e.g., 3200) may be mounted on an end effector apparatus (e.g., 3500) of the robot (e.g., 3300). In other scenarios, the camera may be mounted elsewhere, and/or may be stationary.

Figure 6A:
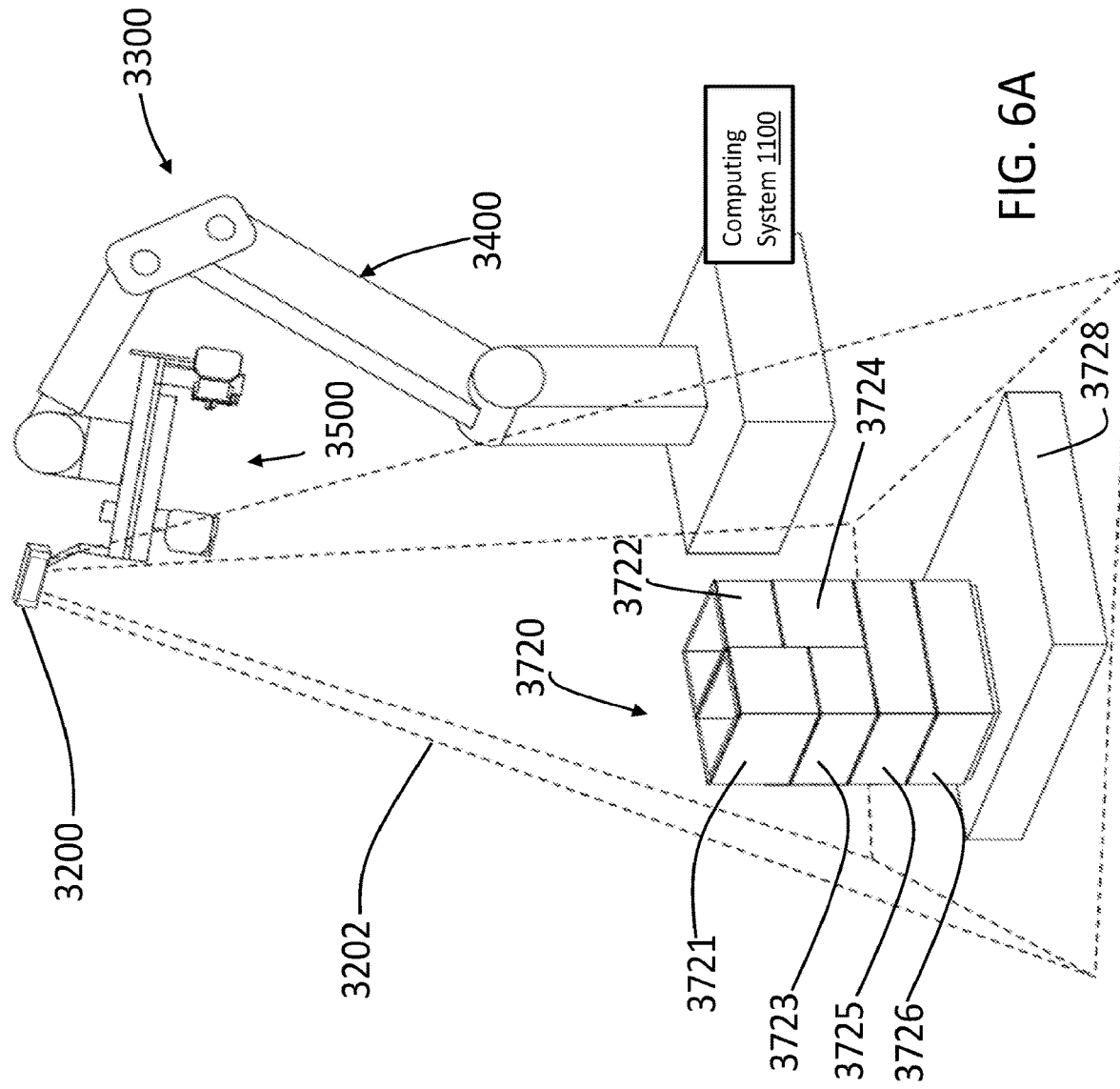
FIGS. 6A-6C illustrate various aspects of generating image information for representing an object or a stack of objects, according to an embodiment hereof.

In an embodiment, the method 5000 may begin with or otherwise include a step 5002, in which the computing system 1100 receives first image information for representing a structure of an object (also referred to as object structure) that is or has been in a field of view of a camera (also referred to as a camera field of view). For instance, FIG. 6A depicts a scenario in which a stack 3720 of objects 3721-3726 are disposed within a camera field of view 3202 of the camera 3200. Each of the objects 3721-3726 may be, e.g., a box, crate, or other container. In the example of FIG. 6A, the objects 3721-3726 may be disposed on a pallet 3728. In an embodiment, the pallet 3728 may be used to stack containers or other objects which may have a large variety of sizes (e.g., wide variety of length, width, and height values), and with a large variety of stacking configurations.

In an embodiment, the first image information that is received by the computing system 1100 may be generated by the camera (e.g., 3200) when the camera has a first camera pose, such as the camera pose illustrated in FIG. 3A or the camera pose illustrated in FIG. 6A. The camera pose may refer to a location and orientation of the camera (e.g., 3200). In some scenarios, the camera pose may affect a perspective or viewpoint of the camera (e.g., 3200). For example, the first camera pose depicted in 6A may involve the camera 3200 having a location that is directly above the stack 3720 and having an orientation in which the camera 3200 is pointed at a top portion of the stack 3720, or more specifically at objects 3721, 3722 which form the top portion of the stack 3720. In some instances, the steps of method 5000 may be performed to facilitate robot interaction with individual objects of the stack 3720, such as object 3722. In such instances, a particular object that is a target for the robot interaction may be referred to as a target object. In some scenarios, the steps of method 5000 may be performed multiple times or multiple iterations, so as to facilitate robot interaction with multiple target objects.

In some scenarios, the first image information may represent a particular view of the stack 3720, or more specifically a particular view of one or more objects which form the stack 3720. In the example of FIG. 6A, the first image information may represent a top view of the stack 3720, or more specifically of the objects 3721, 3722, because the first image information may be generated when the camera 3200 has the first camera pose illustrated in FIG. 6A, in which the camera 3200 is above the objects 3721, 3722 and is pointed at top ends of the objects 3721, 3722. In the example of FIG. 6A, the objects 3721, 3722 may each be a crate or other open-top container having one or more walls that enclose a bottom inner surface of the container. The one or more walls may form a rim at a top end of the container. In such an example, the top view of the object 3721/3722 may include a view of a surface of the rim (also referred to as a rim surface) for the object 3721/3722 and include a view of the bottom inner surface of the object 3721/3722. In another example, the bottom inner surface of the object 3721/3722 is not represented by the first image information, or is only partially represented by the first image information. Such an example may occur when, e.g., the object 3721/3722 is a container that is partially or completely filled with items that are disposed or stacked over the bottom inner surface of the object 3721/3722, such as the situation illustrated for some of the containers in FIG. 3B. In such a situation, the first image information may describe or otherwise represent the items disposed within the container, while those items may partially or completely obstruct or obscure a view of the bottom inner surface of the container. In another example, a fully enclosed box, such as a container with a lid, or other container may be in a camera field of view (e.g., 3202) of the camera 3200. In this example, the top view of the fully enclosed container may include a view of an outer surface (e.g., a top outer surface, also referred to as a top face) of the container.

Figure 6B:
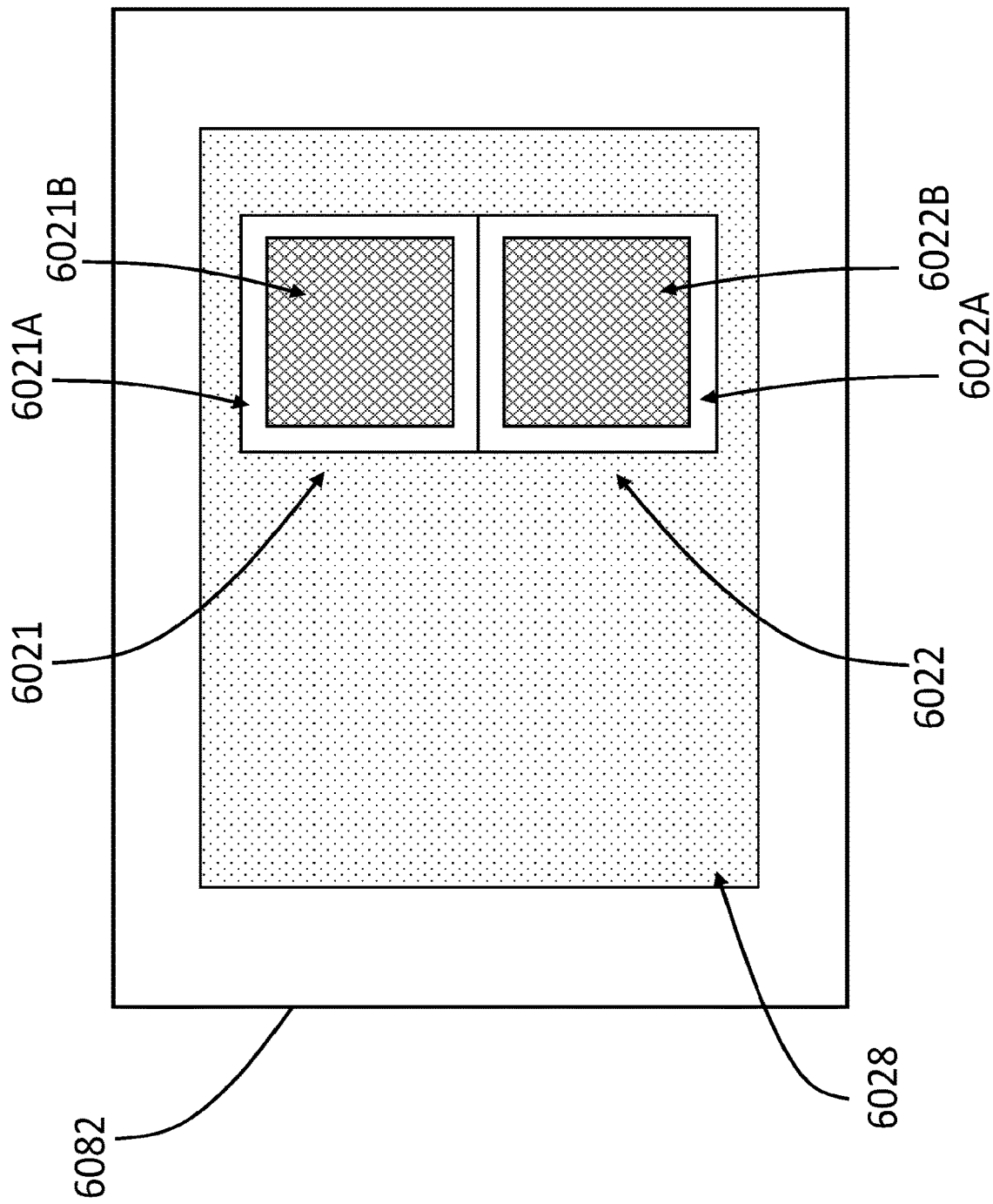

In an embodiment, the first image information may describe an appearance of the stack 3720, or more specifically of one or more objects (e.g., 3721 and 3722) that form the stack 3720. For instance, FIG. 6B provides an example in which the first image information includes or forms a 2D image 6082 (e.g., a grayscale or color image) that includes an image portion 6021 (e.g., a region of pixels) that describes an appearance of the object 3721, an image portion 6022 that describes an appearance of the object 3722, and an image portion 6028 that describes an appearance of the pallet 3728. More particularly, the image 6082 may describe the appearance of the objects 3721, 3722 and of the pallet 3728 from a viewpoint of the camera 3200 of FIG. 6A, and more specifically may represent the top view of the objects 3721, 3722. As stated above, the image 6082 may be generated when the camera 3200 has the first camera pose depicted in FIG. 6A. More particularly, the 2D image 6082 may represent one or more surfaces of the object 3721 and one or more surfaces of the object 3722. For example, the image portion 6021 of the 2D image 6082 may more specifically include an image portion 6021A which represents a first surface (e.g., rim surface) of the object 3721, and an image portion 6021B that represents a second surface (e.g., bottom inner surface) of the object 3721. Similarly, the image portion 6022 may include an image portion 6022A that represents a first surface (e.g., rim surface) of the object 3722, and an image portion 6022B that represents a second surface (e.g., bottom inner surface) of the object 6022. In another example, if the first object 3722 is a container filled with items, as discussed above, the image portion 6022, or more specifically the image portion 6022B, may describe an appearance of the items disposed within the container.

In an embodiment, the first image information may describe a structure of the stack (also referred to as a stack structure) or at least a portion of the stack structure, wherein the stack structure may be defined by the structures of the objects 3721-3726 which form the stack. More specifically, the first image information may describe a structure of an object (also referred to as an object structure) forming the stack, or at least a portion of the object structure. In such an embodiment, the camera (e.g., 3200) that generates the first image information may be a 3D camera (also referred to as a spatial structure sensing device). As stated above, the first image information that is received in step 5002 may represent a particular viewpoint of the camera when the first image information is generated, such as a top view of the stack structure. In some scenarios, the first image information may include spatial structure information, which may also be referred to as three-dimensional (3D) information, that describes how the object is arranged in 3D space. For instance, the spatial structure information may include depth information, which describes depth of one or more portions of the object or of its object structure relative to a reference point, such as a point at which the camera (e.g., 3200) is located when the camera generates the first image information.

Figure 6C:
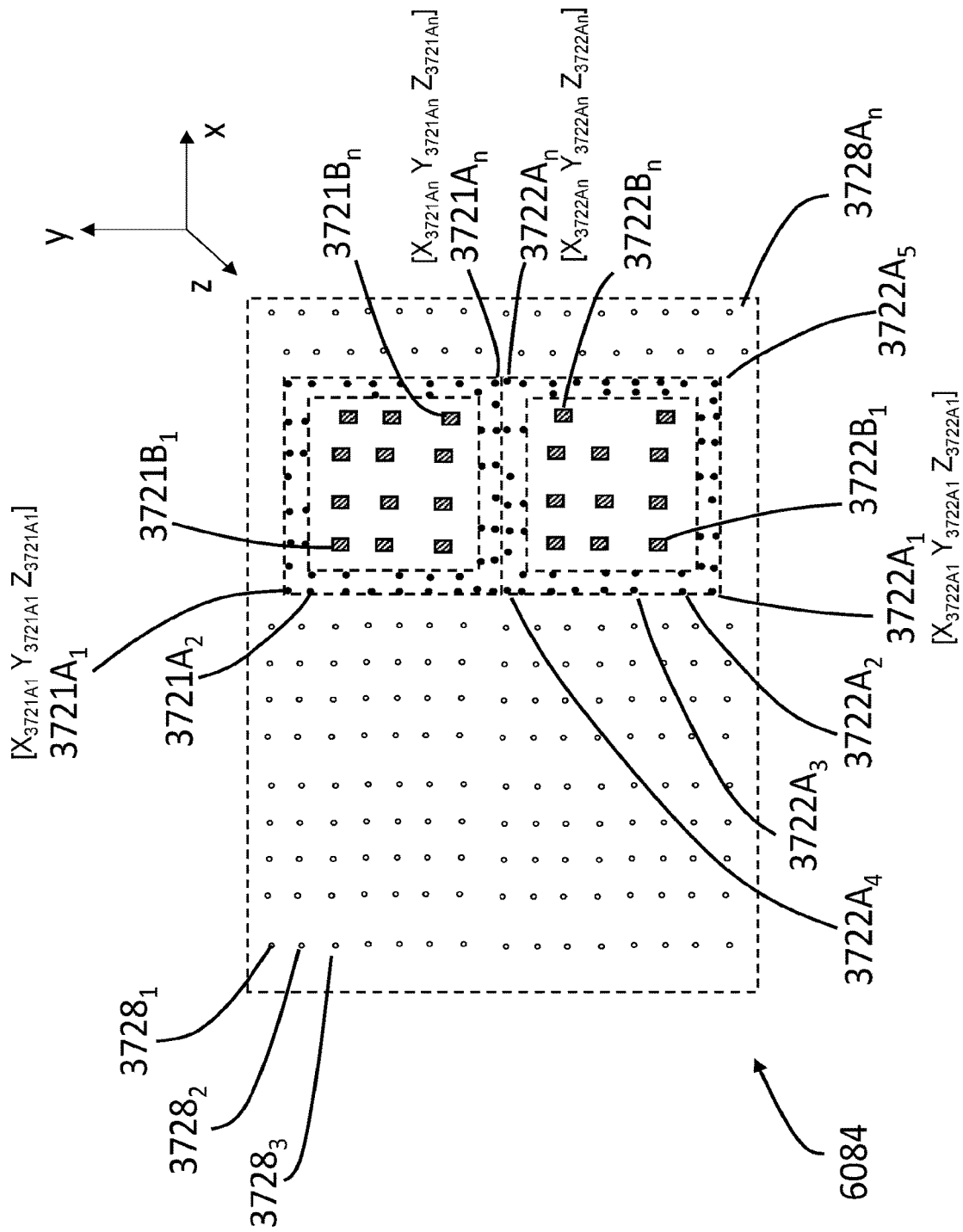

In some scenarios, the spatial structure information may describe respective depth values for a plurality of locations (also referred to as a plurality of points) on one or more surfaces of an object structure. For instance, FIG. 6C depicts the first image information having 3D image information 6084 that describes respective depth values for various locations on surfaces of objects (also referred to as object surfaces) in a camera field of view (e.g., 3202) of the camera (e.g., 3200), such as object surfaces of the object 3721, the object 3722, and the pallet 3728 of FIG. 6A. In the example of FIG. 6C, the various locations identified or otherwise described by the spatial structure information may include locations $3728_1$ through $3728_n$ (depicted as white circles) on a top surface of the pallet 3728, locations $3721A_1$ through $3721A_n$ on a first surface of the object 3721 (e.g., rim surface), locations $3721B_1$ through $3721B_n$ on a second surface of the first object 3721 (e.g., bottom inner surface), locations $3722A_1$ through $3722A_n$ on a first surface of the object 3722 (e.g., rim surface), and locations $3722B_1$ through $3722B_n$ on a second surface of the object 3722 (e.g., bottom inner surface). In another example, if the object 3721/3722 is a container that is filled with items, as discussed above, the locations $3721B_1$ through $3721B_n$ and/or locations $3722B_1$ through $3722B_n$ may be locations on one or more surfaces of the within the container. In some scenarios, the first image information may describe the respective depth values with a depth map, which may include an array of pixels that correspond to, e.g., a grid of locations on one or more object surfaces in the camera field of view (e.g., 3202). In such scenarios, some or all of the pixels may each include a respective depth value for a respective location that corresponds to the pixel, wherein the respective location is on the one or more object surfaces. In some situations, the first image information may describe the respective depth values through a plurality of 3D coordinates, which may describe various locations on the one or more object surfaces. For example, the 3D coordinates may describe locations $3728_1$ through $3728_n$, locations $3721A_1$ through $3721A_n$, locations $3721B_1$ through $3721B_n$, locations $3722A_1$ through $3722A_n$, and locations $3722B_1$ through $3722B_n$ in FIG. 6C. The plurality of 3D coordinates may, e.g., form a point cloud or part of a point cloud that describes at least a portion of an object structure, such as a top portion of the object structure for the object 3721, and/or a top portion of the object structure for the object 3722. The 3D coordinate may be expressed in a camera coordinate system, or in some other coordinate system. In some instances, a depth value for a particular location may be represented by or based on a component of a 3D coordinate for that location. As an example, if the 3D coordinate for a location is a [X Y Z] coordinate, the depth value for that location may be equal to or based on the Z-component of the 3D coordinate.

Returning to FIG. 5, the method 5000 may in an embodiment include a step 5004, in which the computing system 1100 may determine, based on the first image information, a first estimate of the object structure for an object in the camera field of view (e.g., 3202), such as the object structure for the object 3721 or the object structure for the object 3722 of FIG. 6A. In some instances, the first estimate for the object structure may include an estimate of one or more object dimensions, such as an estimated value for a length of the corresponding object (e.g., 3721 or 3722) and/or an estimated value for a width of the corresponding object. In some instances, the first estimate for the object structure may include an estimate of a shape of the corresponding object (also referred to as an object shape). For instance, the first estimate of the object structure may indicate that the object structure has a rectangular shape. In some scenarios, the first estimate for the object structure may include a point cloud that describes a first outer surface (e.g., top outer surface) that forms the object structure, or more specifically describes locations on the first outer surface. In some implementations, the point cloud may later be updated to incorporate different sets of image information that represent different viewpoints of the object structure, such as the first image information and second image information, which is discussed below in more detail with respect to step 5012 and 5014. In such an implementation, the point cloud may be referred to as a global point cloud. In some instances, the point cloud may specifically represent an object structure for a target object, such as the object 3722. In some instances, if the target object is part of a stack, such as stack 3720, the point cloud may represent a stack structure for the stack. In such instances, a portion of the point cloud may specifically represent the object structure for the target object (e.g., 3722).

In some scenarios, the first estimate for the object structure (e.g., estimated values of object dimensions or object shape) may be determined directly based on the first image information. For instance, if the first image information includes 3D coordinates for the locations $3722A_1$ through $3722A_n$ on the rim surface of the object 3722 in FIG. 6C, the computing system 1100 may determine the first estimate of the object structure by using the 3D coordinates. More specifically, if the first estimate for the object structure is or includes a point cloud, the computing system 1100 may determine the first estimate for the object structure by including the 3D coordinates in the point cloud. For instance, the computing system 1100 may insert or add the 3D coordinates into the point cloud, or more specifically into a file or other data structure representing the point cloud. The 3D coordinates from the first image information may, e.g., form a partial point cloud that represents a portion of the object structure (e.g., a rim surface that forms a top portion of the object structure) or a particular viewpoint of the object structure (e.g., top view). In this example, the computing system 1100 may in step 5014 incorporate information from the partial point cloud into a global point cloud. In step 5004, the global point cloud may include only or primarily information from the partial point cloud discussed above, which represents the viewpoint associated with the first camera pose. As discussed below, the global point cloud may eventually incorporate additional image information that represents one or more additional viewpoints (e.g., a perspective viewpoint), which may allow the global point cloud to become a more complete representation of the object structure for the object (e.g., 3722), relative to the partial point cloud associated with the first camera pose. In some implementations, the computing system 1100 may determine whether the 3D coordinates in the partial point cloud use a different coordinate system than a coordinate system used by 3D coordinates of the global point cloud. If so, the computing system 1100 may transform the 3D coordinates in the partial point cloud so that they are expressed relative to the coordinate system of the global point cloud, and may add the transformed coordinates to the global point cloud.

In some instances, if the first image information includes the 3D coordinates discussed above, and if the first estimate for the object structure includes an estimated value for an object length and an estimated value for an object width of the object structure, the computing system 1100 may be configured to determine the estimated values directly based on a difference between some of the 3D coordinates. For example, the computing system 1100 may determine the estimated values based on a difference between a 3D coordinate $[X_{3721A1}\ Y_{3721A1}\ Z_{3721A1}]$ for the location $3721A_1$ and a 3D coordinate $[X_{3721An}\ Y_{3721An}\ Z_{3721An}]$ for the location $3721A_n$ in FIG. 6C. More particularly, the computing system 1100 may determine the estimated value for the object length for the object 3721 to be equal to or based on an absolute value of $Y_{3721An}-Y_{3721A1}$ (wherein the Y-axis may correspond to a length dimension), and may determine the estimated value for the object width to be equal to or based on $X_{3721An}-X_{3721A1}$ (wherein the X-axis may correspond to the width dimension). Similarly, the computing system 1100 may determine an estimated value for an object length for the object 3722 to be equal to or based on $Y_{3722An}-Y_{3722A1}$, and may determine an estimated value for an object width for the object 3722 to be equal to or based on $X_{3722An}-X_{3722A1}$.

In an embodiment, the first image information may be generated by the camera (e.g., 3200) while the camera has a first camera pose in which the camera is pointed directly at a first outer surface of an object structure, such as the object structure for the object 3721/3722. The first outer surface (e.g., top outer surface) may thus be encompassed within a camera field of view (e.g., 3202 of FIG. 6A) of the camera (e.g., 3200), which may refer to the camera having a line-of-sight to the first outer surface or at least a portion thereof. The first image information may thus describe the first outer surface (e.g., top outer surface) of the object structure. In some scenarios, when the camera is in the first camera pose, it may lack a line-of-sight to some or all other outer surfaces of the object structure, such as all outer side surfaces and a bottom outer surfaces of the object structure for the object 3721/3722. In such scenarios, the first image information may have no description for such outer surfaces (e.g., outer side surfaces and bottom outer surface, also referred to as side faces and a bottom face). For instance, the first image information illustrated in FIGS. 6B and 6C may describe the top outer surface of the object structure for the object 3721/3722, but may have little to no description for outer side surfaces of the object structure for the object 3721/3722. As another example, if the first estimate for the object structure includes estimated values for one or more object dimensions, such as object length and object width, the first estimate may omit an estimated value for one or more object dimensions, such as object height. In this example, the object height may be omitted from the first estimate of the object structure because the first image information on which the first estimate is based may represent a top view of the object structure (e.g., for the object 3721, 3722). In such an example, the top view may lack information which would allow the computing system 1100 to directly determine the object height. If the first estimate for the object structure in step 5004 includes a point cloud, or more specifically the global point cloud discussed above, the global point cloud in step 5004 may include 3D coordinates that represent a top portion of the object structure for an object (e.g., 3721/3722), but may lack 3D coordinates that represent a bottom portion and/or a side portion of the object structure, because those portions of the object structure may not be within a line-of-sight of the camera (e.g., 3200) when the camera generated the first image information.

In some scenarios, the computing system 1100 may determine the first estimate of the object structure based on a defined maximum value for a property of the object structure, such as an object height or other object dimension. In this example, the computing system 1100 may use the defined maximum value to make an initial estimate for an object dimension or other property, which may not be completely described or represented (if it is described at all) by the first image information. For instance, if the first image information is based on a top view of an object structure and does not describe an object height for the object structure, the computing system 1100 may determine an initial estimate for the object height to be equal to or based on a defined maximum object height. The computing system 1100 may use the initial estimate for the object height or other property as the first estimate or part of the first estimate of the object structure. The defined maximum object height or some other defined maximum value may be, e.g., provided manually to the computing system 1100 to indicate a maximum object dimension that the computing system 1100 or robot (e.g., 3300) is likely to encounter, and/or may be determined through an object registration process in which the computing system 1100 determined and stored information that describes object structures of previously encountered objects.

In some scenarios, determining the first estimate for the object structure for an object may involve determining an object type corresponding to the object (e.g., 3722) represented by the first image information. The object type may refer to a particular object design, such as a visual design and/or physical design, for an object (e.g., 3722) or class of objects. For example, if the object discussed above is a container, the object type may refer to a container type, and may refer to a particular container design, which may include a particular visual design and/or physical design for the container or a class of containers. The determined object type may be associated with a particular object structure, and thus may be used to determine the first estimate for the object structure. More particularly, the computing system 1100 may in some implementations store or otherwise have access to templates (e.g., 1126) that describe various respective object types. As discussed above, a template may include visual description information and/or object structure description that describes an object type, or more specifically describe an object design associated with that object type. The visual description information in the template may describe the visual design that defines an appearance associated with the object type, and the object structure description in the template may describe the physical design that defines a structure associated with the object type. In some scenarios, the object structure description may describe a 3D structure for a physical design associated with an object type. For example, the object structure description may describe a combination of values for an object length, an object width, and an object height, respectively, for the physical design, and/or may include a CAD model that describes a contour, shape, and/or any other aspect of the physical design.

In some instances, the computing system 1100 may determine the object type corresponding to an object by comparing the first image information to the various templates discussed above, to determine whether the first image information matches any of the various templates. If the first image information includes or forms a 2D image that represents an appearance of the object (e.g., 3722), the computing system 1100 may compare the 2D image or a portion thereof (e.g., image portion 6021/6022 in FIG. 6B) with the visual description information of the template. In some instances, if the first image information includes 3D image information that describes a portion of an object structure (e.g., describes object length and object width), the computing system 1100 may compare the 3D image information or other description with an object structure description (also referred to as structure description information) of the template.

In some situations, if step 5004 involves determining the object type for an object represented by the first image information or a portion thereof, the determined object type in this step may be an initial estimate for the object type. More particularly, if the first image information lacks a description of certain portions of an object structure, such as its outer side surfaces, using the first image information to perform template matching may lead to results with only a moderate or low level of confidence. In some scenarios, the first image information may match multiple templates, especially if those templates have visual description information or object structure description that share similarities for a certain portion (e.g., top portion) of their respective physical designs. As discussed below in more detail with respect to steps 5012 and 5014, the computing system 1100 may use second image information to perform another template matching operation, which may be more successful and/or lead to a result with a higher level of confidence.

In an embodiment, the computing system 1100 may be configured to determine a motion plan based on the first estimate of the object structure. In some scenarios, the motion plan may be an initial motion plan that is determined immediately or shortly after step 5004. In such scenarios, the computing system 1100 may further generate a motion plan in step 5016 that is an updated motion plan, as discussed below in more detail. In some scenarios, the method 5000 may omit the determination of an initial motion plan based on the first estimate for the object structure. If, however, such an initial motion plan is generated, it may include planned motion, or more specifically a set of one or more movements, for the robot (e.g., 3300) or a portion thereof (e.g., robot arm 3400 and/or end effector apparatus 3500). The planned motion may be used to cause interaction between the robot (e.g., 3300) and an object (e.g., 3722) corresponding to the object structure determined in step 5004. In such an example, the movement commands may be referred to as object interaction movement commands. The interaction may include, e.g., the end effector apparatus (e.g., 3500) of the robot (e.g., 3300) picking up the object and moving the object to a destination location. In some instances, the planned motion may describe a desired motion for the end effector apparatus (e.g., 3500). For example, the planned motion may describe a trajectory to be followed by the end effector apparatus (e.g., 3500). In some implementations, the planned motion may more specifically describe motion of various components of the robot arm (e.g., 3400), such as motion of various joints that connect links of the robot arm or motion of various motors or other actuators that are configured to actuate the links.

In some instances, if the motion plan includes a trajectory to be followed by the end effector apparatus (e.g., 3500) or other component, the computing system 1100 may determine an end point for the trajectory. The end point may specify, for instance, a location (or, more specifically, a pose) at which the robot (e.g., 3500) or a component thereof (e.g., the end effector apparatus 3500) stops movement and ends its interaction with a particular object (e.g., 3722). Ending the interaction may involve, e.g., releasing the object from a grip of the end effector apparatus (e.g., 3500). In some implementations, the computing system 1100 may determine the end point of the trajectory based on an object height for the object, wherein the object height may have been determined from the first estimate for the object structure.

More particularly, the computing system 1100 may determine a final end effector height based on an estimated value for the object height, and determine the end point of the trajectory based on the final end effector height (also referred to as a determined final end effector height or a planned final end effector height). The determined final end effector height may refer to a height of the end effector apparatus (e.g., 3500) when the end effector apparatus releases or otherwise stops interaction with the object (e.g., 3722). In some scenarios, the determined final end effector height may be expressed relative to the destination location. If the destination location is part of a destination structure for receiving the object, the destination location may refer to a location or area of the destination structure at which an earliest or initial contact between the object and the destination structure will occur. For example, if the destination structure is a roller conveyor having a set of rollers, the destination location may be a highest location on one or more of the rollers, because this location will be the first to contact the object during a trajectory in which the end effector apparatus (e.g., 3500) lowers the object toward the roller conveyor. If the destination structure is, e.g., a conveyor belt having an upper surface or a floor, the destination location may be a location on the upper surface or the floor. The final end effector height may represent, e.g., a height that the end effector apparatus (e.g., 3500) is planned or likely to have when a bottom portion of the object (e.g., bottom outer surface) comes into contact with the destination location. More particularly, the final end effector height may represent a height at which the end effector apparatus (e.g., 3500) should have when motion of the end effector apparatus ends. Thus, the computing system 1100 may determine the end point of the trajectory based on the final end effector height. In some scenarios, the computing system 1100 may determine the final end effector height to be equal to or based on the estimated value of the object height, which may be from the first estimate for the object structure of a particular object (e.g., 3722). As stated above, however, the estimated value of the object height from the first estimate of the object structure may lack accuracy. As a result, the first estimate of the object structure may affect a reliability of the final end effector height and the trajectory determined by the computing system 1100. As discussed below in more detail, the computing system 1100 may determine a second estimate for the object structure in step 5014. The second estimate may provide greater accuracy, and may be used to determine a more reliable motion plan in step 5016.

Returning to FIG. 5, the method 5000 may in an embodiment include a step 5006, in which the computing system 1100 may identify a corner of the object structure, or more specifically an outer corner or convex corner of the object structure. In some scenarios, the corner of the object structure (also referred to as an object corner) may be determined based on the first estimate of the object structure or based on the first image information. In some scenarios, determining the object corner may involve determining an exact or approximate location of the object corner. For instance, the computing system 1100 may identify location $3722A_1$ in FIG. 6C, with 3D coordinate [$X_{3722A1}$ $Y_{3722A1}$ $Z_{3722A1}$], as an object corner for the object 3722. In some instances, identifying the corner may involve identifying vertices (also referred to as contour points) from a point cloud, and identifying convex corners based on the vertices. Identifying convex corners is discussed in more detail in U.S. patent application Ser. No. 16/578,900, the entire content of which is incorporated by reference herein in its entirety.

In an embodiment, if the first estimate of the object structure describes a plurality of object corners, the computing system 1100 in step 5006 may select from among the plurality of object corners. For instance, a first estimate for the object structure of object 3722 of FIG. 6A, which may be based on the first image information depicted in FIGS. 6B and 6C, may describe multiple corners corresponding to, e.g., locations $3722A_1$, $3722A_4$, $3722A_5$, and $3722A_n$. In some implementations, the computing system 1100 may make the selection based on at least one of: (i) respective amounts of occlusion experienced by the plurality of object corners, or (ii) respective levels of accessibility by the end effector apparatus (e.g., 3500) to the plurality of object corners. For example, the computing system 1100 may be configured to select, as the corner identified in step 5006, an object corner of the object structure that is experiencing the least occlusion among the plurality of object corners, and/or has a highest level of accessibility by the end effector apparatus.

Figure 7A:
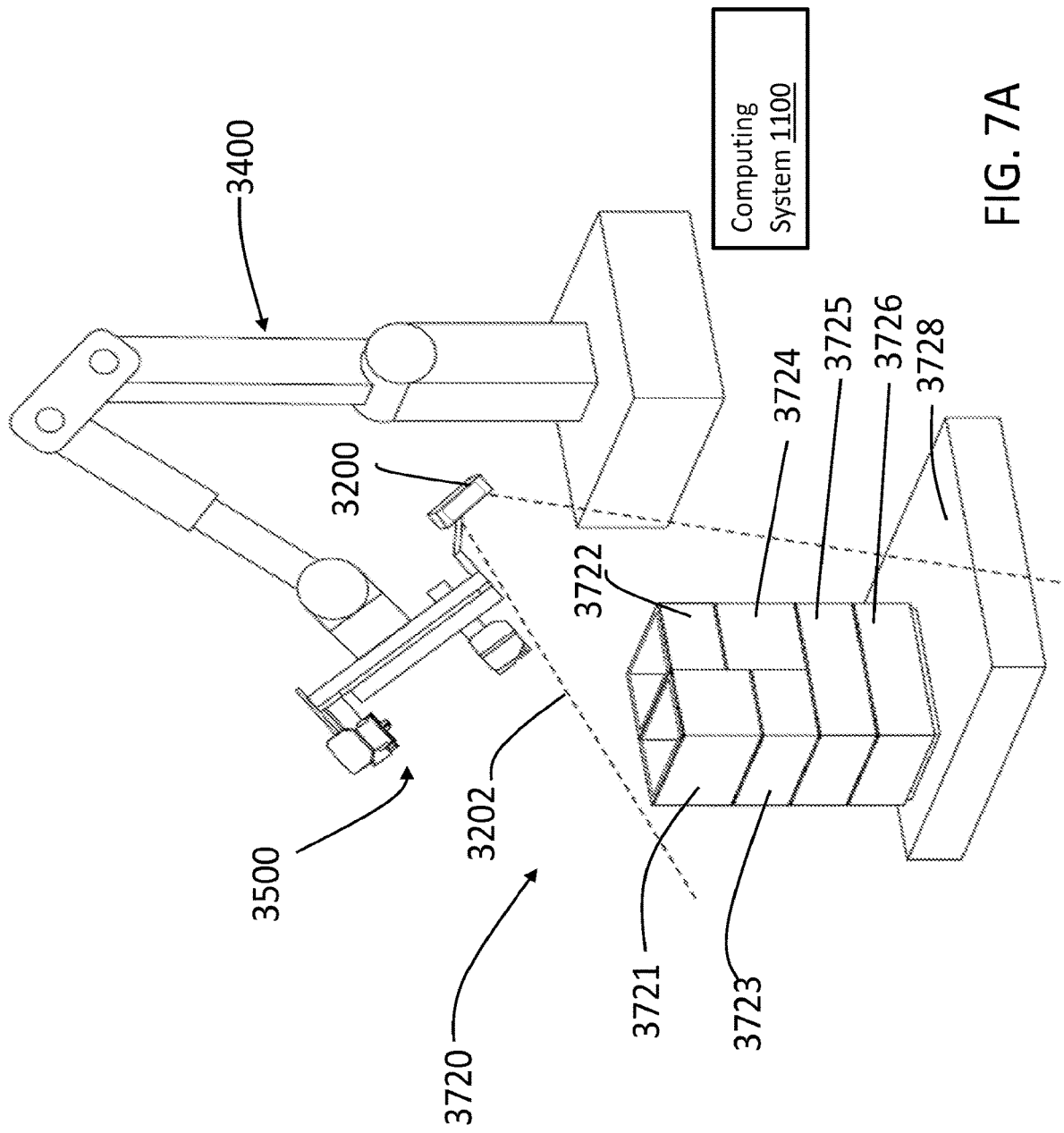
FIGS. 7A-7D illustrate various aspects of generating image information for representing an object or a stack of objects, according to an embodiment hereof.

Referring again to FIG. 5, the method 5000 may in an embodiment include a step 5008 in which the computing system 1100 may determine a second camera pose, such as the camera pose in FIG. 7A. The second camera pose may include a combination of a particular location and orientation of the camera (e.g., 3200) which, when adopted by the camera (e.g., 3200), causes the camera (e.g., 3200) to be pointed at the corner of the object structure determined in step 5006. For instance, the second camera pose depicted in FIG. 7A may cause the camera 3200 to be pointed at a corner of the object 3722 of FIG. 6A, wherein the object corner may correspond to the location $3722A_1$ in FIG. 6C. The second camera pose may cause the camera to also be pointed at an outer surface, such as an outer side surface, which was not previously within a line-of-sight of the camera (e.g., 3200) when the camera was in the first camera pose. In other words, when the camera (e.g., 3200) has the first camera pose, it may have a camera field of view (e.g., 3202) that encompasses a first outer surface (e.g., top outer surface) of an object structure without encompassing a second outer surface (e.g., side outer surface). When the camera moves to the second camera pose, the camera field of view may alternatively or additionally encompass the second outer surface. In an embodiment, the second camera pose may provide the camera 3200 with a different perspective or viewpoint relative to a viewpoint or perspective of the first camera pose. More particularly, the second camera pose may provide the camera 3200 with a perspective view of the object structure for the object 3722, as discussed below in more detail.

Returning to FIG. 5, the method 5000 may in an embodiment include a step 5010, in which the computing system 1100 causes the camera (e.g., 3200) to be moved to the second camera pose. For instance, the computing system 1100 may be configured to generate one or more movement commands, such as one or more motor commands, for causing the robot arm (e.g., 3400) and/or end effector apparatus (e.g., 3500) on which the camera (e.g., 3200) is mounted to move the camera to the second camera pose. The computing system 1100 may output the one or more movement commands, which may be referred to as camera placement movement commands, to the robot (e.g., 3300) via a communication interface (e.g., 1130 of FIG. 2B) of the computing system 1100. The robot (e.g., 3300) may be configured, upon receiving the one or more camera placement movement commands, to execute them to cause the camera (e.g., 3200) to be moved to the second camera pose.

Figure 7B:
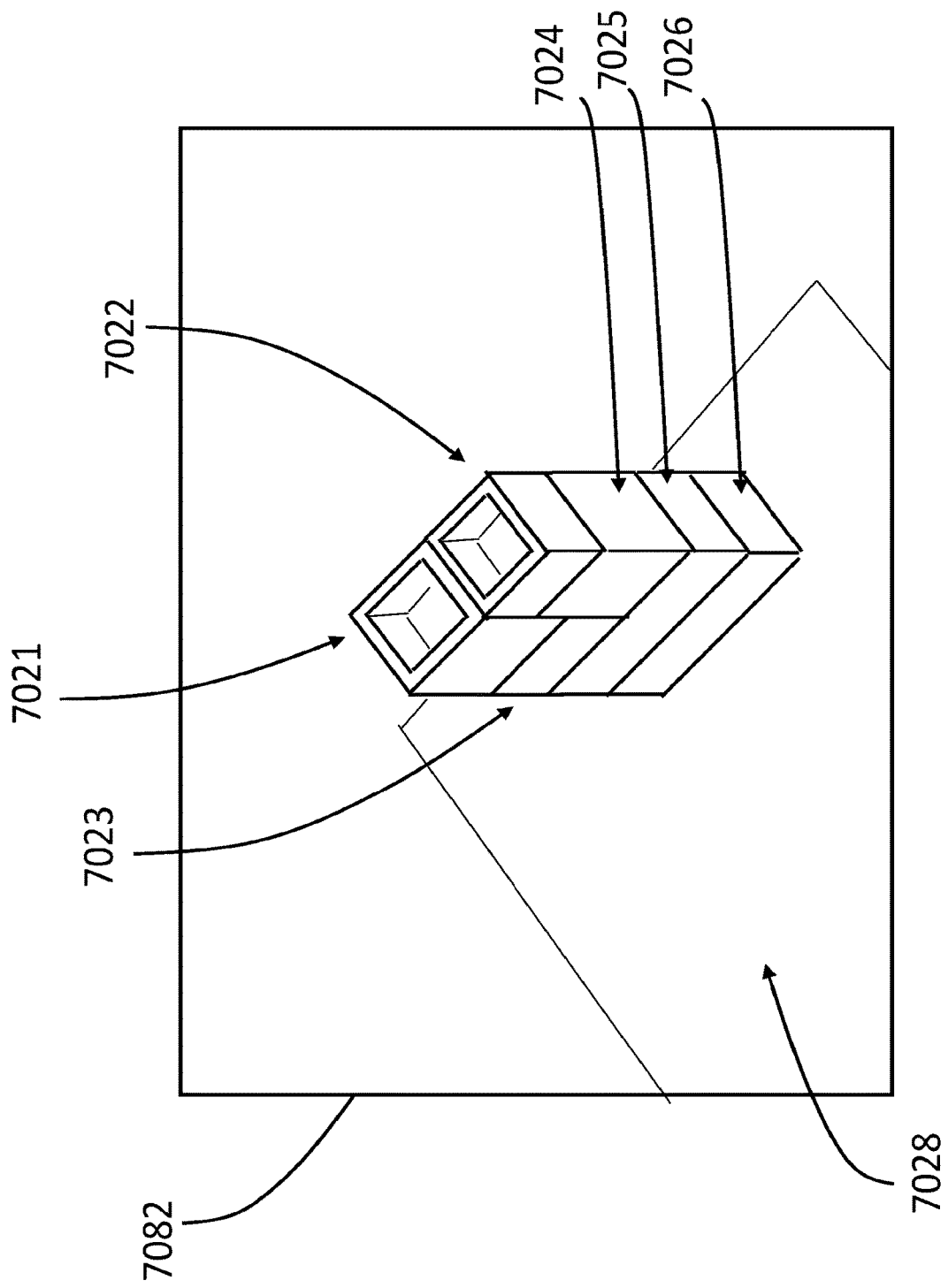
Figure 7C:
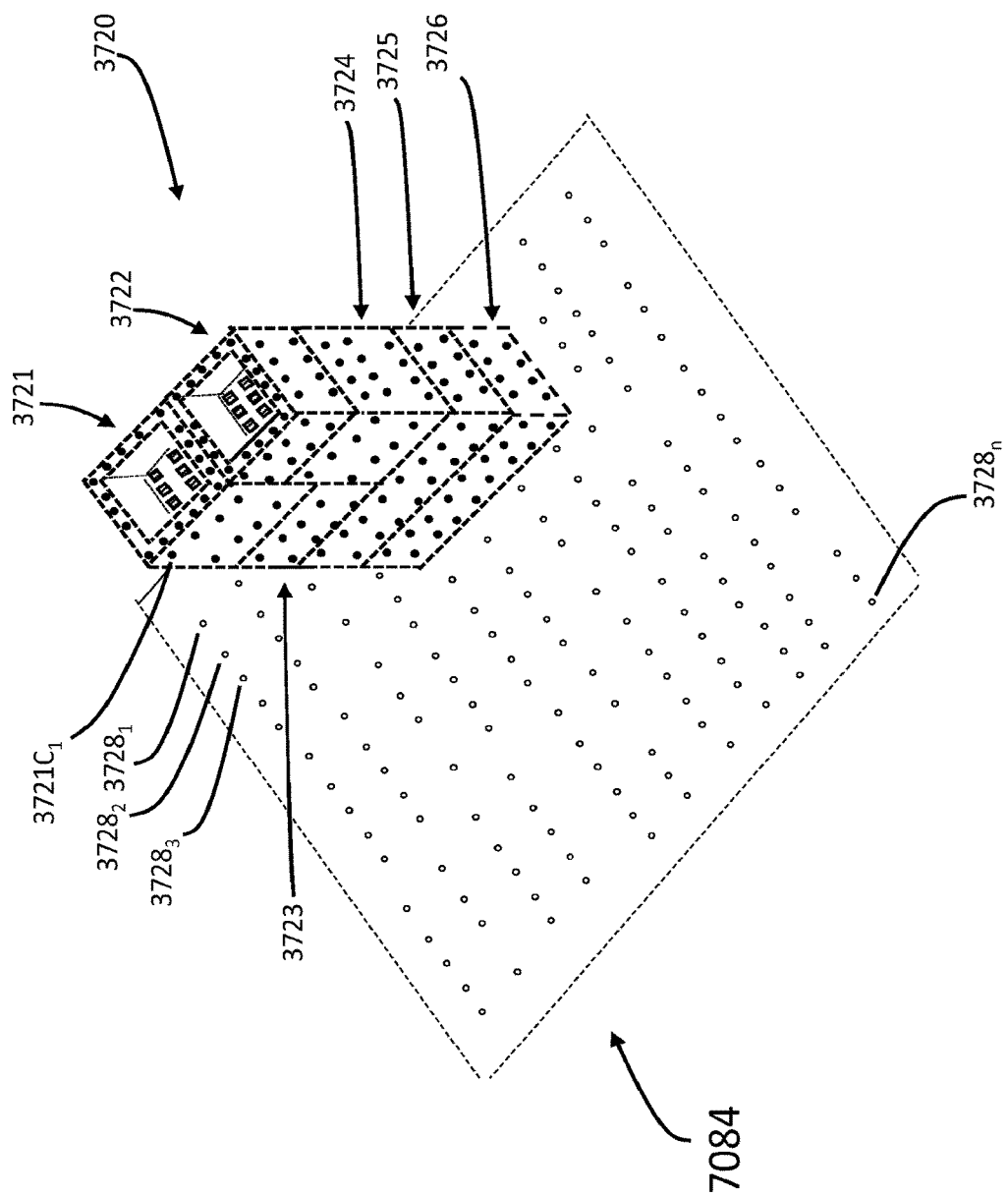

Returning to FIG. 5, the method 5000 may in an embodiment include a step 5012, in which the computing system 1100 may receive second image information. In this example, at least a portion of the second image information represents the object structure corresponding to the object and object corner of steps 5006 and 5008, such as the object 3722 in FIG. 7A. The second image information may be generated by the camera (e.g., 3200) while the camera (e.g., 3200) has the second camera pose illustrated in FIG. 7A. The second image information may include a 2D image that describes an appearance of the object (e.g., 3722), and/or 3D image information that describes the object structure for the object. In some instances, the second image information may describe a stack structure that is formed by the object structure. In such instances, the object structure may be represented by a portion of the second image information. For instance, FIG. 7B illustrates an embodiment in which the second image information includes a 2D image 7082 that describes an appearance of the object 3722, or more generally of the stack 3720 that includes the object 3722. Additionally, FIG. 7C depicts an embodiment in which the second image information includes 3D image information 7084 that describes an object structure for the object 3722, and more generally of a stack structure for the stack 3720.

More particularly, the 2D image 7082 in FIG. 7B may represent a perspective view of various objects 3721-3726 of the stack 3720 of FIGS. 7A and 6A. As depicted in FIG. 7B, the image 7082 may include an image portion 7028 (e.g., a region of pixels) for representing an appearance of the pallet 3728 of FIG. 7A on which the stack 3720 is placed, and may include image portions 7021 through 7026 that represent respective appearances of the objects 3721 through 3726, respectively, from the perspective view. While the first image information illustrated in FIG. 6B may include an image portion (e.g., 6022) that represents a first outer surface of an object, the second image information illustrated in FIG. 7B may include an image portion (e.g., 7022) that represents one or more additional outer surfaces that are not visible or more generally not represented in the first image information. For instance, the first image information may represent a rim surface, or more generally a top surface (also referred to as top face) of the structure of the object 3722, while the second image information may represent a first outer side surface and a second outer side surface (also referred to as a first side face and a second side face) of the object 3722's structure, which are not represented by the first image information. In certain situations, one or more objects in the stack 3720, such as the object 3722, may have a 2D pattern or 3D pattern on an outer side surface. The 2D pattern may include, e.g., a visual pattern or other visual detail (e.g., logo or picture) appearing on the outer side surface, while the 3D pattern may include, e.g., a pattern of ridges or protrusions (also collectively referred to as a ridge pattern) protruding from the outer side surface, such as the ridge patterns depicted in FIGS. 3A and 3B. The 2D pattern or 3D pattern may be partially or completely hidden in or otherwise omitted from the first image information, but may be more completely represented in the second image information. In the example of FIG. 7B, the second image information may also represent the top outer surface. In some situations, the one or more additional surfaces represented in the second image information may be perpendicular to the first outer surface, oblique with the first outer surface, or more generally non-parallel with the first outer surface.

Figure 7D:
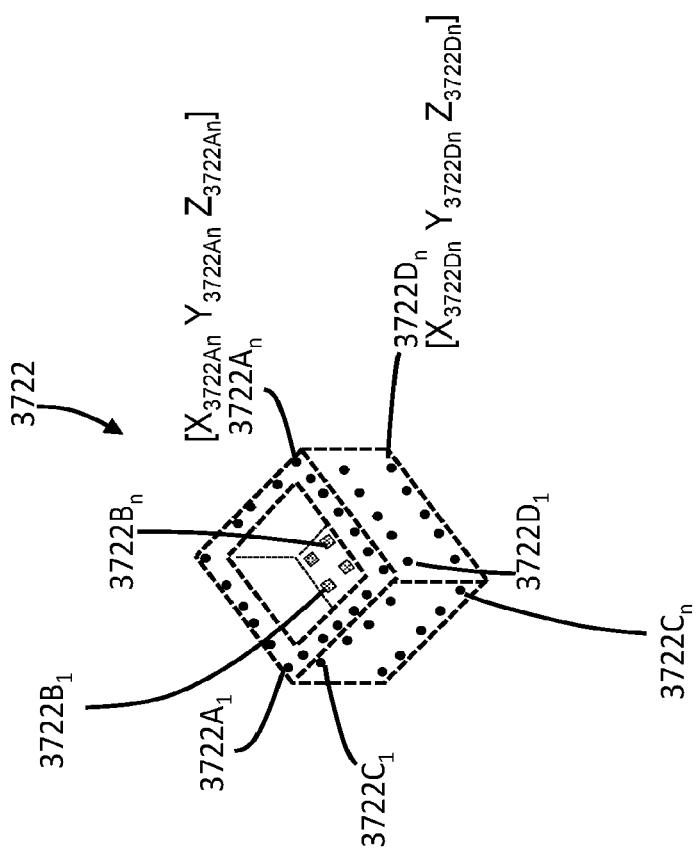

In an embodiment, if the second image information includes 3D image information, the 3D information may include a plurality of 3D coordinates that describe various locations on one or more object surfaces in the camera field of view (e.g., 3202 of FIG. 7A). For example, FIG. 7C depicts 3D image information 7084 that includes 3D coordinates for locations $3728_1$ through $3728_n$ on a surface (e.g., top surface) of the pallet 3728, and 3D coordinates for various locations on one or more object surfaces of the objects 3721 through 3726. The one or more surfaces may include, e.g., a top outer surface (e.g., a rim surface), one or more inner side surfaces, a bottom inner surface, and/or one or more outer side surfaces. As an example, FIG. 7D depicts a portion of the 3D information 7084, wherein the portion includes 3D coordinates for locations on various surfaces of the object 3722, including locations $3722A_1$ through $3722A_n$ on the rim surface of the object 3722, locations $3722B_1$ through $3722B_2$ on the bottom inner surface of the object 3722, locations $3722C_1$ through locations $3722C_n$ on a first outer side surface of the object 3722 (also referred to as an object outer side surface), and locations $3722D_1$ through $3722D_n$ on a second outer side surface of the object 3722. Each of the 3D coordinates may be, e.g., a [X Y Z] coordinate in a coordinate system of the camera (e.g., 3200) when the camera was in the second camera pose, or in some other coordinate system. In some scenarios, the second image information may include a depth map which describes respective depth values for the locations discussed above, and the computing system 1100 may be configured to determine the 3D coordinates for those locations based on the respective depth values.

Returning to FIG. 5, the method 5000 may in an embodiment include a step 5014, in which the computing system 1100 determines a second estimate of the object structure (e.g., for object 3722) based on the second image information. The second estimate for the object structure may include, e.g., a point cloud that describes the object structure, an estimated value(s) of an object dimension(s), and/or an estimate of an object shape. If the second estimate for the object structure includes a point cloud, step 5014 may include inserting or adding 3D coordinates into the point cloud, wherein the 3D coordinates may be included in the second image information or determined based on the second image information. In some scenarios, determining the second estimate of the object structure may involve generating or updating a global point cloud. As discussed above with respect to step 5004, the global point cloud may in some instances already include 3D coordinates that are included in or determined based on the first image information. As illustrated in FIG. 6C, these 3D coordinates may represent, e.g., locations on a first outer surfaces of the object structure, such as locations $3722A_1$ through $3722A_n$ on the rim surface of the object 3722. In some scenarios, the 3D coordinates may also represent locations on an inner surface, such as locations $3722B_1$ through $3722B_n$ on the bottom inner surface of the object 3722. In such an example, the computing system 1100 in step 5014 may insert or add, to the global point cloud, 3D coordinates which represent other surfaces and/or other locations on the object structure. For example, as illustrated in FIG. 7D, the 3D coordinates used to update the global point cloud may represent locations $3722C_1$ through locations $3722C_n$ on the first outer side surface of the object 3722 and the locations $3722D_1$ through $3722D_n$ on the second outer side surface of the object 3722. In some scenarios, if step 5004 involved generating an initial global point cloud based on the first image information, then the added or inserted 3D coordinates from the second image information of steps 5012 and 5014 may represent one or more surfaces (e.g., outer surfaces) that are not described by the initial global point cloud of step 5004. In such an example, step 5012 may update the initial global point cloud to generate an updated global point cloud. As stated above, if the object 3722 has a 3D pattern (e.g., ridge pattern) on its outer side surface, the first image information may lack information regarding the 3D pattern, such that the initial global point cloud may omit a description of the 3D pattern. The second image information may capture or otherwise represent the 3D pattern, such that the updated global point cloud represents the 3D pattern on the outer side surface of the object 3722. If the 3D coordinates that are included in the second image information use a coordinate system which is different than a coordinate system used by the initial global point cloud, the computing system 1100 may be configured to transform the 3D coordinates so that they are expressed in the coordinate system of the initial global point cloud, and update the initial global point cloud by adding or inserting the transformed 3D coordinates into the initial global point cloud.

In some instances, if the second estimate of the object structure includes an estimated value for an object dimension, the object dimension that is estimated may be one that is not described by the first estimate of the object structure. For example, the first estimate for the object structure determined in step 5004 may include an estimated value for a first object dimension (e.g., object length) and an estimated value for a second object dimension (e.g., object width), but may lack an estimated value for a third object dimension (e.g., object height). In this example, the second estimate for the object structure may include an estimated value for the third object dimension (e.g., object height). In some instances, the first estimate of the object structure determined in step 5004 may already include an estimated value for the third object dimension, but this estimated value may be potentially inaccurate. As discussed above, this inaccuracy may arise because step 5004 may be based on a top view of the object structure. If step 5004 involves determining an estimated value for object height based on the top view of the object structure, such an estimated value may lack a high degree of accuracy or confidence. In such an example, step 5014 may be used to generate an updated estimated value for that object dimension, as discussed below in more detail. The updated estimated value may have a higher degree of accuracy or confidence.

In an embodiment, the computing system 1100 may be configured to determine the estimated value for an object dimension, such as object height, based on the 3D coordinates. These 3D coordinates may be in a global point cloud, and may include 3D coordinates that are included in the second image information or determined based on the second image information. As an example, the computing system 1100 may determine the estimated value of the object height for a structure of the object 3722 based on a difference between two of the 3D coordinates, such as the 3D coordinate $[X_{3722An}\ Y_{3722An}\ Z_{3722An}]$ and $[X_{3722Dn}\ Y_{3722Dn}\ Z_{3722Dn}]$. More particularly, the computing system 1100 in this example may determine the estimated value for the object height to be equal to or based on $Z_{3722An} - Z_{3722Dn}$. In this example, the 3D coordinate $[X_{3722An}\ Y_{3722An}\ Z_{3722An}]$ may represent a location on the object 3722's rim surface or other top outer surface, which may form a top portion of the object 3722, while the 3D coordinate $[X_{3722Dn}\ Y_{3722Dn}\ Z_{3722Dn}]$ may describe a location that is part of a bottom portion of the object 3722. More particularly, the 3D coordinate $[X_{3722Dn}\ Y_{3722Dn}\ Z_{3722Dn}]$ may represent a location which is on an outer side surface of the object 3722 and also is near a bottom outer side surface of the object 3722. In some scenarios, if the first estimate for the object structure already includes an estimated value for an object dimension (e.g., object length or object width), such an estimated value based on the first image information, step 5014 may involve determining an updated estimated value for the object dimension, wherein the updated estimated value is based on the second image information.

In an embodiment, determining the second estimate for the object structure in step 5014 may involve determining an object type for an object corresponding to the object structure, such as the object 3722. As discussed above, the computing system 1100 may store or otherwise have access to templates that describe various respective object types. The templates may include visual description information and/or object structure description, such as a CAD model or respective values of various object dimensions. The object structure description in the templates may in some situations include a more complete description of an object's structure than what is provided by the first image information and/or second image information, and may be used as the second estimate for the object structure. For instance, the second image information may have a sufficient level of detail to be used to be compared against various templates in step 5014 to determine whether the second image information matches any of the templates. If one of the templates matches the second image information, the matching template may have an object structure description which has a higher level of detail relative to the second image information. In some scenarios, the object type may have already been determined in step 5004 based on the first image information, but such a determination may be intended as an initial estimate for the object type. As discussed above, using the first image information to perform template matching may lead to a result that lacks a high level of accuracy or confidence, especially if the first image information lacks a description of certain portions of the object's structure, such as its outer side surfaces. As discussed above, the first image information may lack a description of a 2D pattern or 3D pattern on an outer side surface of the object's structure. The second image information, on the other hand, may capture or otherwise represent the 2D pattern, 3D pattern, or other visual detail or structural detail on the side surface of the object's structure. If step 5014 also involves performing template matching, this step may lead to a result with a higher level of accuracy or confidence, because step 5014 uses the second image information, which may augment the first image information by describing certain portions of the object's structure that are not included in or that is omitted from the first image information. In some scenarios, the second image information may represent a portion of an object structure, such as multiple outer side surfaces of the object structure, that may be especially useful for template matching. More particularly, the second image information may describe the visual detail (e.g., visual pattern) or structural detail (e.g., ridge pattern) on one or more side surfaces of the object's structure. This visual detail or structural detail described by the second image information may improve an accuracy or effectiveness of the template matching, especially when many of the different types of containers or other objects for receiving robot interaction have similar sizes. In such a situation, an object's size may match respective object structure descriptions of many templates, each of which may be associated with a different object type. However, the visual detail or structural detail (e.g., ridge pattern) on the object's side surface, as represented by the second image information, may only match the visual description information or object structure description of one template or a few templates, thus narrowing down which object type(s) the object (e.g., 3722) may belong to. Thus, the visual detail or structural detail in the second image information, which may provide a better description of an object's side surfaces than does the first image information, may improve an accuracy or effectiveness of the template matching, and improve an accuracy and effectiveness of determining which object type is associated with an object represented by the second image information.

As stated above, the pallet 3728 may in an embodiment be used to stack containers or other objects, which may have a large variety of sizes. The large variety of object sizes may result in a large variety of stacking configurations. In other words, different pallets may have considerably different stacking configurations for how their containers or other objects are arranged. Thus, if the computing system 1100 is determining a motion plan to remove an object from a pallet, a location of the object (e.g., a location of a corner or edge of the object) may have a large range of possible values. Thus, the second image information may be especially useful, because it can be leveraged by the computing system 1100 to perform fine/precise detection of a location of the object, and/or some other property (e.g., size) of the object.

In an embodiment, the second image information may be used by the computing system 1100 to identify grip points, which may be locations or portions on an object (e.g., 3722) to be gripped by the robot 1300/3300, or more specifically by the end effector apparatus 3500 of FIG. 3A/6A. These grip points may be identified as part of a motion plan determined during step 5016, which is discussed below in more detail. As stated above, the end effector apparatus 3500 may in some scenarios include gripper fingers that clamp around or pinch a portion of the object, such as a portion of a container rim. In some situations, the grip points may need to be determined with a high degree of accuracy and reliability. For instance, determination of the grip points may need to take into account whether any portion of the object (e.g., any portion on a container rim on object 3722) is damaged, inaccessible, or otherwise difficult to grip, so that none of the grip points are placed or otherwise positioned at or near that portion of the object, because having a grip point at or near the damaged portion of the object may result in a difficult or unstable grip. The second image information provide sufficient accuracy for the computing system 1100 to identify a damaged portion of the object, which may allow grip points to be determined with a sufficiently high level of reliability and accuracy. The second image information may also be used to eliminate grip points that are inaccessible, such as due to presence or positioning of adjacent objects that would prevent the end effector apparatus 3500 from accessing the grip points.

In some implementations, if the second image information includes or forms a 2D image that represents an object (e.g., 3722), the computing system 1100 may compare the 2D image or a portion thereof (e.g., image portion 7022 in FIG. 7B) with the visual description information of the templates discussed above. Such a comparison may be used for determining whether an object appearance represented by the 2D image or a portion thereof matches the visual description information of one of the templates. In some cases, if the second image information includes the 3D image information (e.g., 7084 in FIG. 7C), the template matching may be performed based on comparing the 3D image information, or a portion of the 3D image information representing the object's structure (e.g., the portion in FIG. 7D), against the object structure description of each of the templates. In one example, the template matching may involve comparing the object structure description of the templates against the global point cloud discussed above, which may be based on the second image information and the first image information.

Returning to FIG. 5, the method 5000 may in an embodiment include a step 5016, in which the computing system 1100 generates a motion plan based on at least the second estimate of the object structure. The motion plan that is generated in step 5016 may be for causing robot interaction between the robot and the object (e.g., 3722) associated with the estimated object structure. The interaction may involve, e.g., the end effector apparatus (e.g., 3500) approaching the object (also referred to as the target object), picking up the target object, and moving the target object to a destination location. In some cases, the motion plan generated in step 5016 may be an updated motion plan which updates the initial motion plan that is based on the first estimate for the object structure, as discussed above. In some scenarios, generating the initial motion plan before step 5016 may facilitate more timely execution of the robot interaction. For instance, generating the initial motion plan may involve performing calculations or determining information that is re-usable when the updated motion plan is determined. If such calculations or determinations are all made during step 5016, there may be scenarios in which there is an excessive lag between when the camera (e.g., 3200) generates the second image information and when a motion plan is generated based on the second image information. Such a lag may delay execution of the robot interaction. In such scenarios, at least some of those calculations or determinations may be performed as part of determining an initial motion plan based on the first image information. These calculations may take place before step 5016, and thus may reduce an amount of time needed to generate the updated motion plan in step 5016. In some embodiments, however, the method 5000 may omit the determination of the initial motion plan based on the first estimate of the object structure.

Figure 8A:
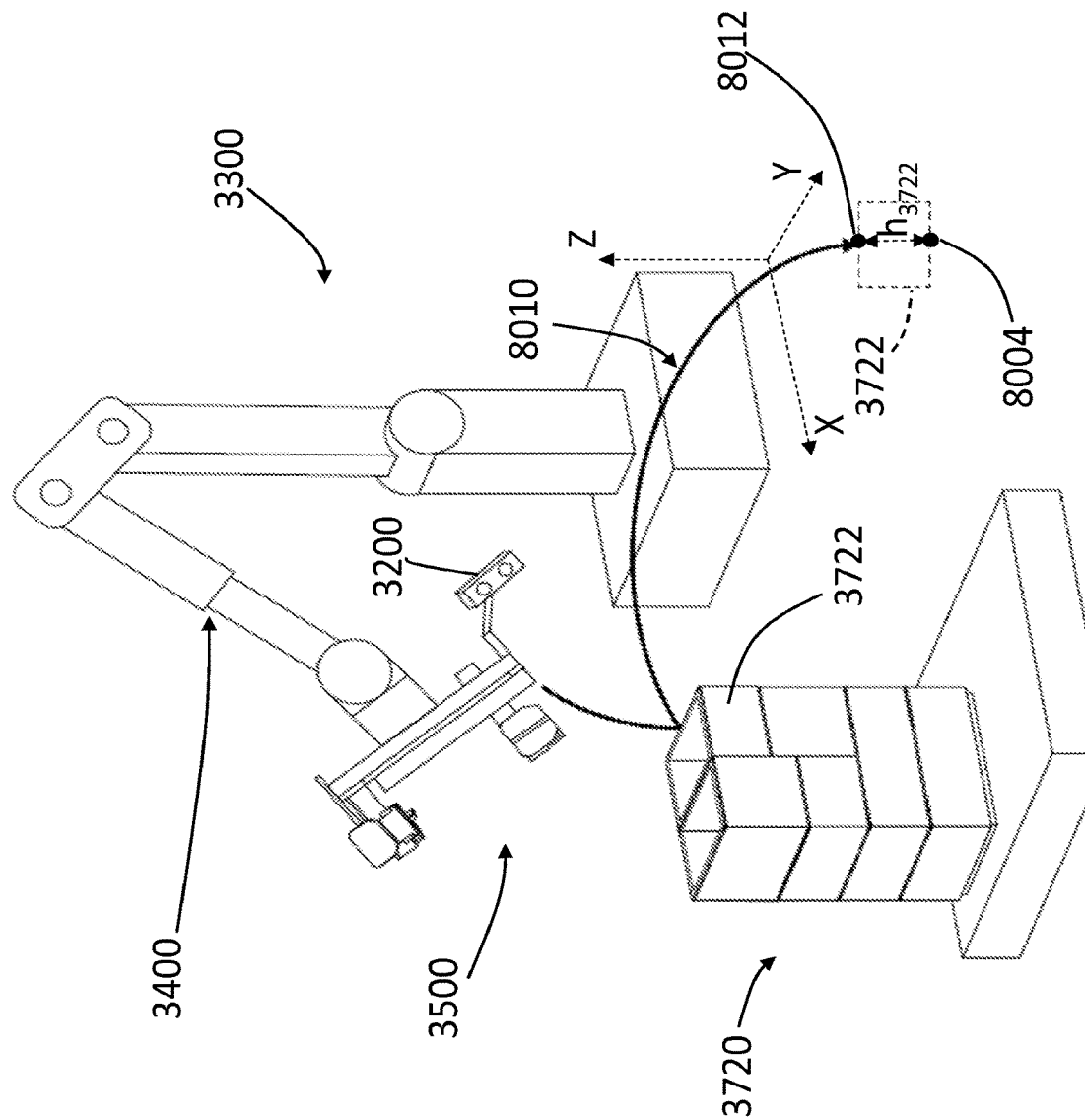

In an embodiment, the motion plan determined in step 5016 may include a trajectory for an end effector apparatus (e.g., 3500) of the robot (e.g., 3300) to follow. For example, FIG. 8A depicts an example trajectory 8010 which, when followed by the end effector apparatus 3500, causes the end effector apparatus 3500 to approach the object 3722, engage the object 3722 (e.g., pick up the object 3722), and to move the object to a destination location 8004. In some instances, step 5016 may include determining grip points at which the end effector apparatus 3500 grips or otherwise engages the object, as discussed above. The grip points may be based on the second estimate of the object structure. For instance, the grip points may be determined based on object dimensions indicated by the second estimate of the object structure. As an example, if the object structure includes at least four co-planar corners (e.g., it has a rectangular shape), the first grip point may be located along a first edge of the object structure, and may be between a first corner and a second corner of the at least four co-planar corners, while the second grip point may be located along a second edge of the object structure, and may be between the first corner and a third corner of the at least four co-planar corners. The first grip point may be closer to the second corner than the first grip point is to the first corner, while the second grip point may be closer to the third corner than the second grip point is to the first corner. That is, the first grip point may have a distance from the first corner that is at least a predefined percentage of a value for a first dimension of the object (e.g., the distance from the first grip point to the first corner is at least 50% of a value of width dimension of the object), while the second grip point may have a distance from the first corner that is at least a predefined percentage of a value for a second dimension of the object (e.g., the distance from the second grip point to the first corner is at least 50% of a value of the length dimension of the object). The grip points in such an example may facilitate a balanced or otherwise stable grip of the object. In an embodiment, the location of the grip points may define or otherwise correspond to the grip size for the end effector apparatus (e.g., 3500A), as discussed above with respect to FIGS. 3A and 3B.

As an example of the motion plan discussed above, FIGS. 8B-8F depict the end effector apparatus 3500 on the robot arm 3400 of the robot 3300 following the trajectory 8010 of FIG. 8A to pick up the object 3722. As stated above, if the destination location 8004 is part of a destination structure for receiving the object (e.g., 3722), the destination location may refer to a location at which an earliest contact will occur between the object and the destination structure. For example, if the destination structure is a conveyor belt or is a floor, the destination location 8004 may be a location on an upper surface of the conveyor belt or the floor. If the destination structure is a roller conveyor having a set of rollers, the destination location 8004 may be a highest location on one or more of the rollers, as illustrated in FIG. 8F.

In some cases, determining the trajectory (e.g., 8010) may involve verifying that the trajectory will not result in collision between the object (e.g., 3722) receiving the robot interaction and a physical element or item in an environment of the object (e.g., 3722) and/or of the robot (e.g., 3300). Examples of the physical element include a wall, support beam, power cable, etc. Verifying the absence of collisions may be based on, e.g., an estimate of object structure for the object (e.g., 3722), which may be determined from step 5014. For example, the computing system 1100 may determine whether the trajectory (e.g., 8010) will cause the object structure to occupy a space is also occupied by any of the physical elements discussed above. In this example, the space occupied by the object structure may be defined by the global point cloud discussed above, an estimated shape of the object structure, and/or estimated values for various dimensions (e.g., length, width, height) of the object structure.

In an embodiment, if the end effector apparatus (e.g., 3500) includes at least a first gripper member, a second gripper member, and a third gripper member, such as the gripper members illustrated in FIGS. 4A and 4B, the computing system 1100 may determine movement of the gripper members as part of the motion plan. For instance, the computing system 1100 may generate the motion plan by determining movement for causing the first gripper member (e.g., 3510) to engage one of a first edge or a second edge of the object structure, and for causing the second gripper member (e.g., 3520) to engage another one of the first edge or second edge of the object structure. The first and second edges may be, e.g., perpendicular to each other. The determined movement may further cause the third gripper member (e.g., 3530) to engage an object corner associated with the second camera pose, such as the corner represented by location 3722A$_1$ in FIG. 6C, or may cause the third gripper member to engage another object corner of the object structure.

In some instances, if the first gripper member (e.g., 3510) is slidable along a first rail (e.g., 3540) of the end effector apparatus (e.g., 3500A), and the second gripper member (e.g., 3520) is slidable along a second rail (e.g., 3542) longer than the first rail, as depicted in FIGS. 4A and 4B, the computing system 1100 may be configured to generate the motion plan by determining movement for causing the first gripper member to engage a shorter one of the first edge or second edge of the object structure, and for causing the second gripper member to engage a longer one of the first edge or second edge of the object structure. The computing system 1100 may further be configured to control one or more actuators or stopping mechanism mechanisms, which are discussed above, to cause the first gripper member (e.g., 3510) to slide along the first rail (e.g., 3540) to a location at which it can grip a first grip point described by the motion plan, and to cause the second gripper member (e.g., 3520) to slide along the second rail (e.g., 3542) to a location at which it can grip a second grip point described by the motion plan.

In an embodiment, step 5016 may involve determining an end point for the trajectory, such as the end point 8012 for the trajectory 8010 depicted in FIGS. 8A and 8F. The end point may specify, for instance, a location (or, more specifically, a pose) at which the robot (e.g., 3500) or a component thereof (e.g., the end effector apparatus 3500) stops movement and ends its interaction with a particular object (e.g., 3722). Ending the interaction may involve, e.g., releasing the object from a grip of the end effector apparatus (e.g., 3500). In some implementations, the computing system 1100 may determine the end point of the trajectory based on the second estimate of the object structure determined in step 5014, such as based on an object height of the object structure, such as an estimated value $h_{3722}$ of the object height for object 3722, as illustrated in FIG. 8A. If the motion plan determined in step 5016 is an updated motion plan, and if the computing system 1100 already determined an initial motion plan having a first end point (e.g., based on the first image information), the end point that is determined in step 5016 may be an updated end point. In some cases, the updated end point may be more reliable than the first end point for performing the robot interaction, because the updated end point may be based on the second estimate for the object structure, which may have better accuracy than the first estimate of the object structure.

In the example of FIGS. 8A and 8F, the computing system 1100 may determine the end point 8012 of the trajectory 8010 based on the determined or planned final end effector height for the end effector apparatus 3500. As discussed above with respect to determining an initial motion plan, the final end effector height may refer to a height of the end effector apparatus 3500 when the end effector apparatus releases or otherwise stops interaction with an object (e.g., 3722), and/or a height of the end effector apparatus 3500 when its motion ends. In some cases, the final end effector height may be expressed relative to the destination location (e.g., 8004) discussed above. In an embodiment, the computing system 1100 may determine the final end effector height based on an estimated value of the object height for the object, wherein the estimated value may be determined in step 5014, based on the second image information. In some cases, the computing system 1100 in FIG. 8A may determine the final end effector height to be a height that is above the destination location 8004 by an amount that is equal to or based on the estimated value $h_{3722}$ of the object height for the object 3722, wherein the estimated value $h_{3722}$ is part of or based on the second estimate for the object structure of the object 3722 determined in step 5014. More generally, the computing system 1100 in FIG. 8A may determine the end point 8012 to be a location which is separated from the destination location 8004 by a distance which is equal to or based on the estimated value $h_{3722}$. By generating a trajectory based on the final end effector height, the computing system 1100 may control the end effector apparatus 3500 to stop its motion at substantially a same time as when a bottom portion of the object (e.g., 3722) being carried by the end effector apparatus 3500 is positioned (e.g., placed) on or otherwise makes contact with the destination location 8004. Such a trajectory may thus be especially suitable for the end effector apparatus 3500 to stop its motion and release the object.

Figure 8B:
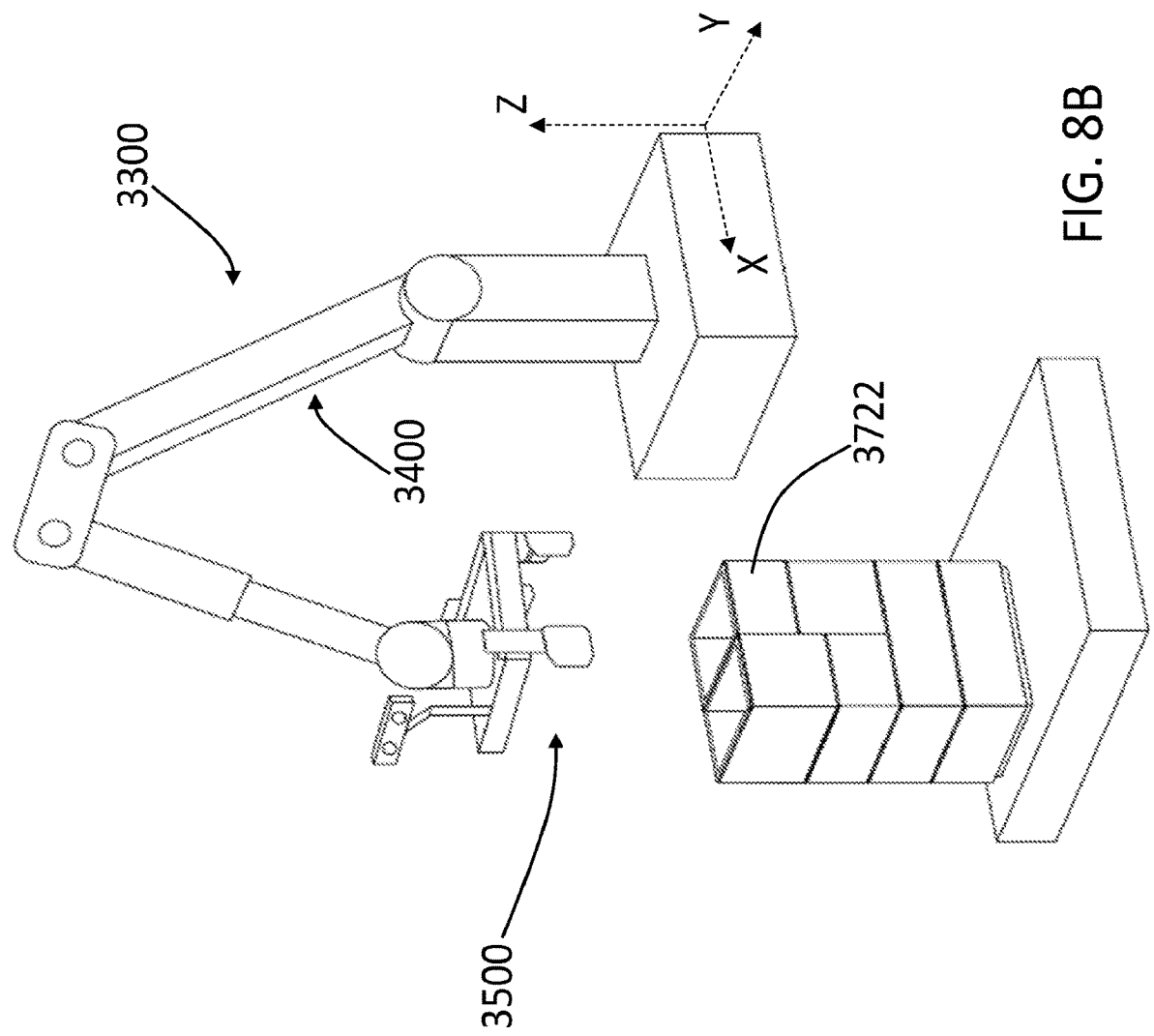
Figure 8C:
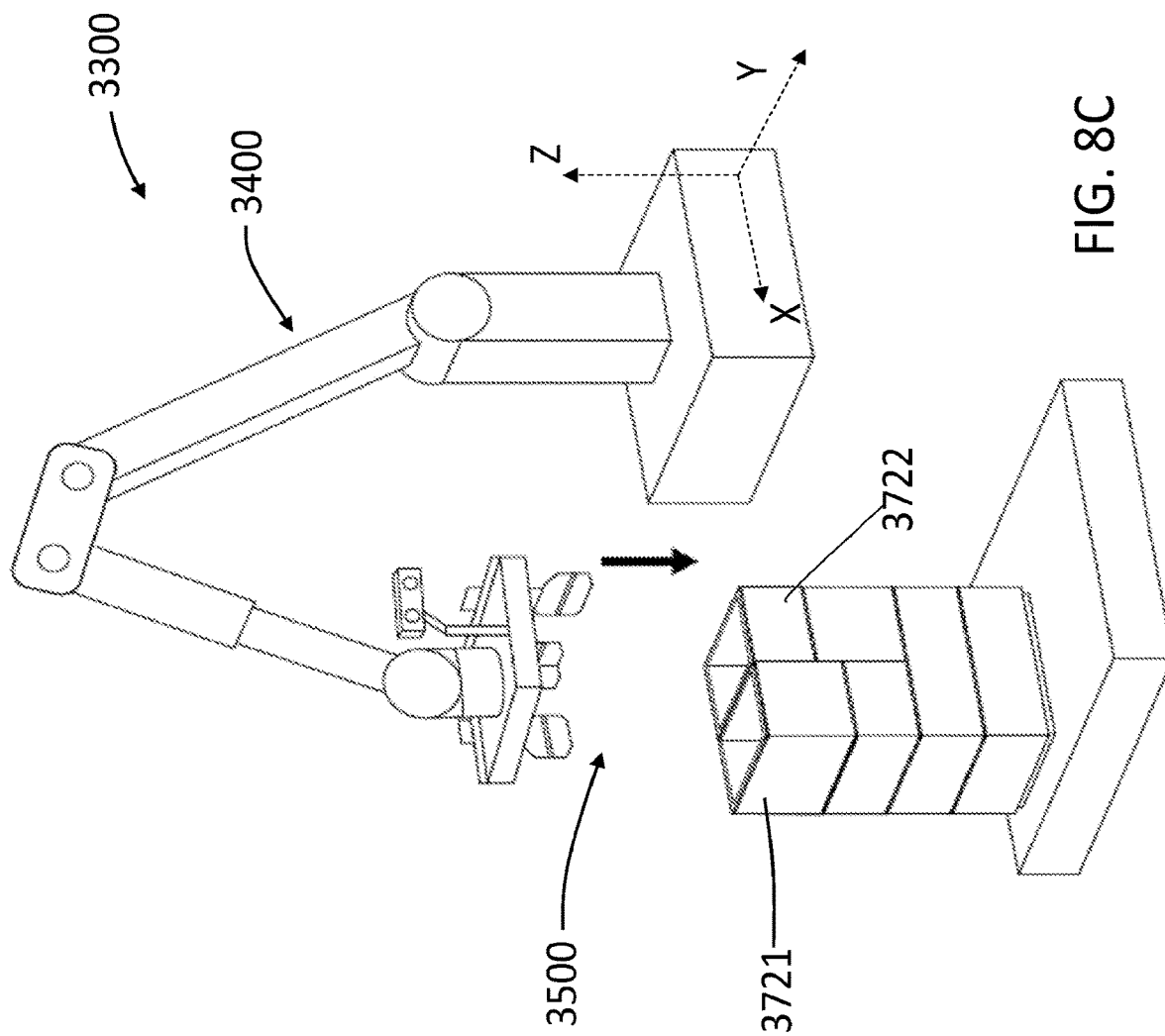
Figure 8E:
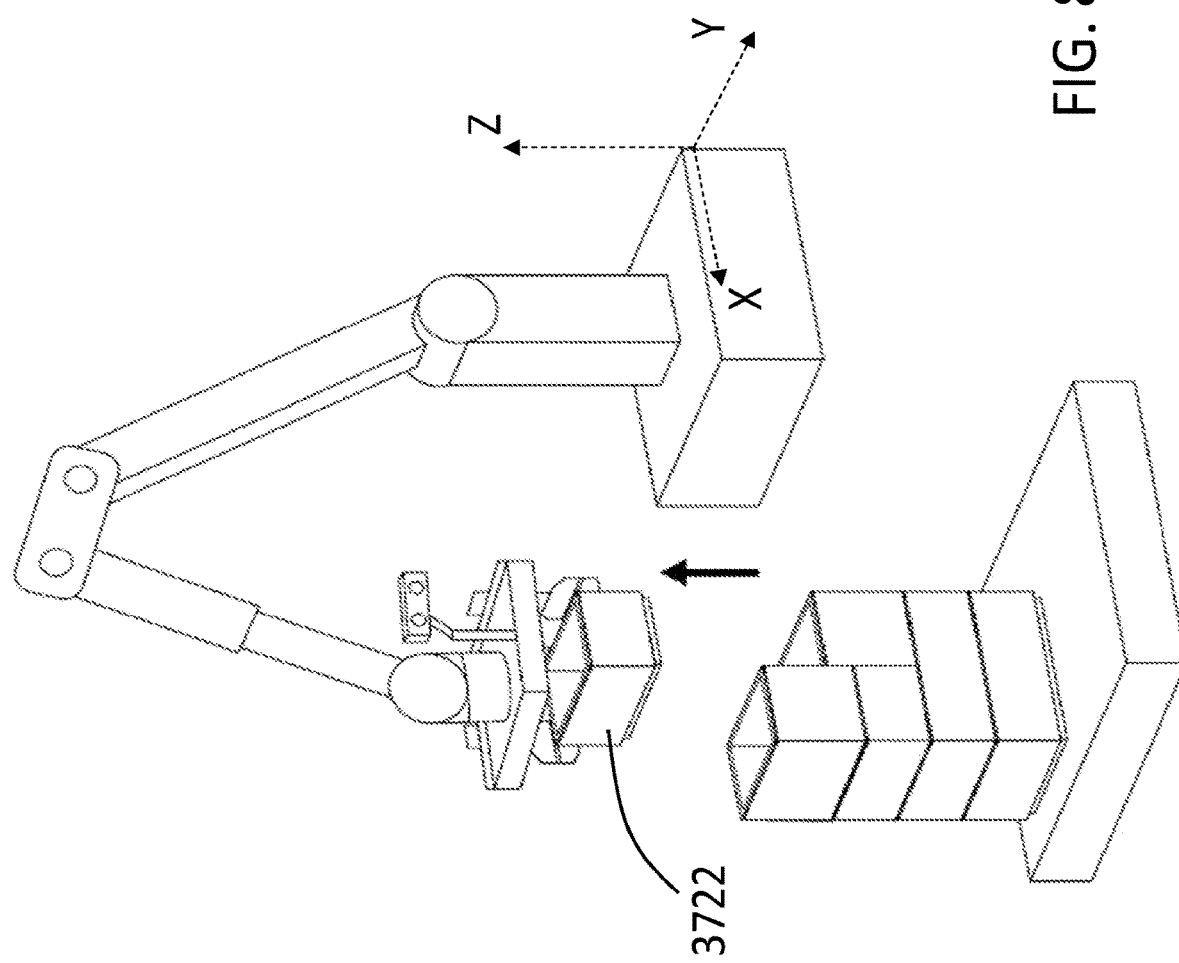
Figure 8G:
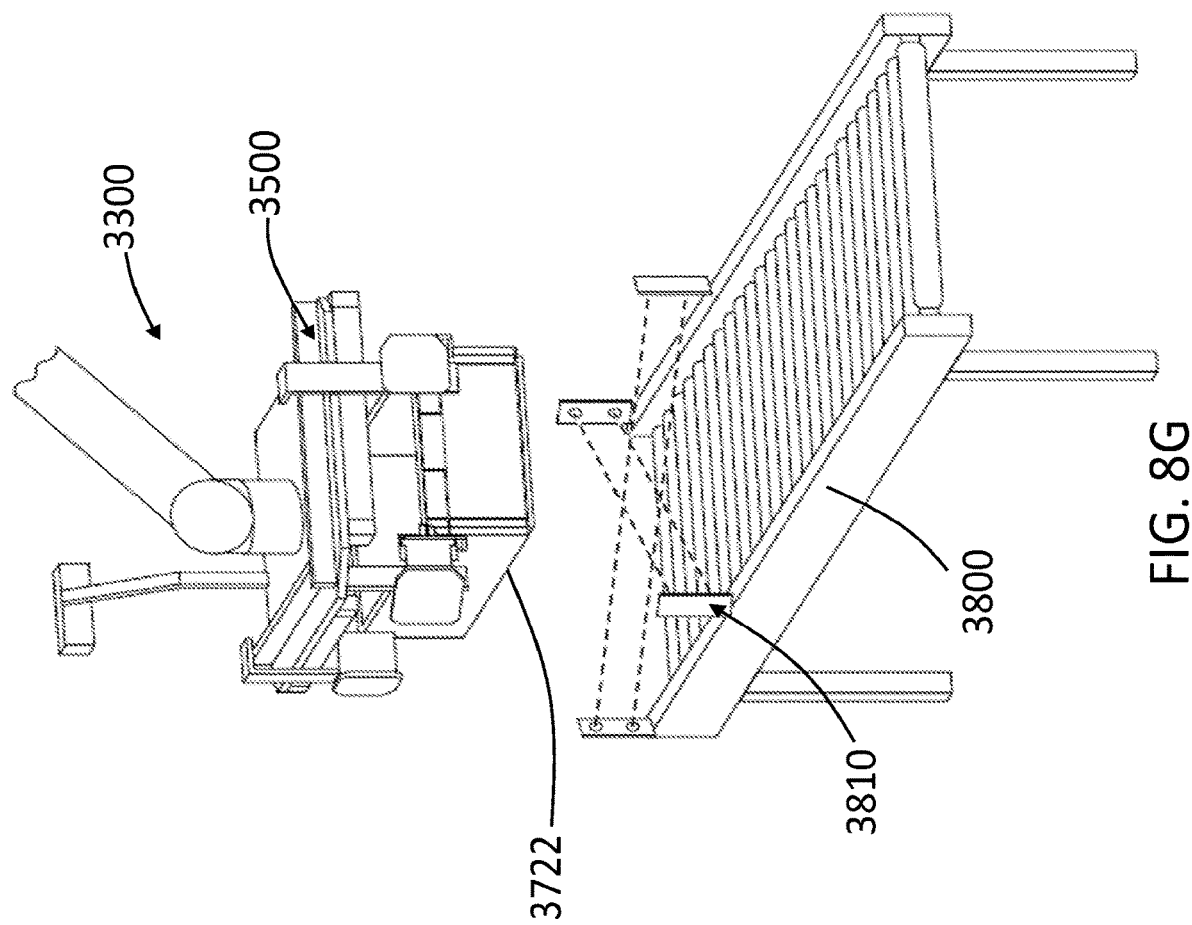
Figure 81:
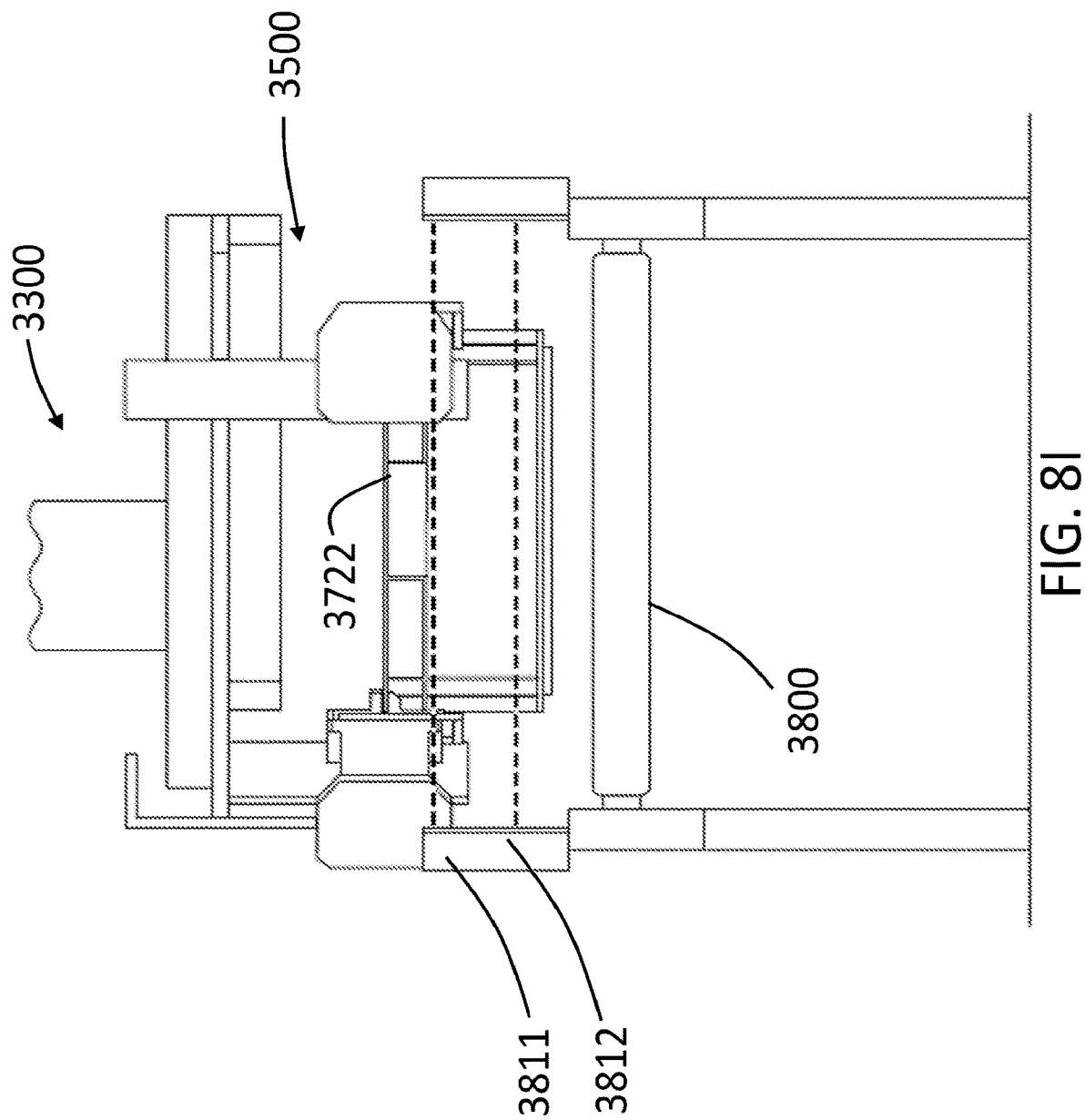

In an embodiment, the computing system 1100 may be configured to detect the arrival of the object (e.g., 3722) at the destination location. For example, as illustrated in FIGS. 8G, 8H, and 8I, the roller conveyor 3800 may include one or more sensors 3810, such as a first line sensor 3811 and a second line sensor 3812. The first line sensor 3811 may be disposed at a first distance (e.g., first height) relative to the roller conveyor 3800, while the second line sensor 3812 may be disposed at a second distance (e.g., second height) relative to the roller conveyor 3800. The computing system 1100 may generate and output a control signal that causes the robot to move the end effector apparatus 3500 towards the roller conveyor 3800. As illustrated in FIG. 8H, the first line sensor 3811 may output a first sensor signal to the computing system 1100 that indicates detection of proximity of the object 3722 and/or the end effector apparatus 3500 within the first distance from the roller conveyor 3800. The computing system 1100 may, upon receiving the first sensor signal, output one or more movement commands (e.g., via the communication interface) for decelerating or otherwise slowing down movement of the robot arm 3400 and of the end effector apparatus 3500 toward the roller conveyor 3800. As illustrated in FIG. 8I, the second line sensor 3812 may output a second sensor signal to the computing system 1100 that indicates detection of proximity of the object 3722 and/or the end effector apparatus 3500 within the second distance from the roller conveyor 3800. The computing system 1100 may, upon receiving the second sensor signal, output one or more movement commands for causing movement of the end effector apparatus 3500 to stop, and/or for causing the end effector apparatus 3500 to release or otherwise disengage with the object 3722.

Returning to FIG. 5, the method 5000 may in an embodiment include a step in which the computing system 1100 may cause the robot (e.g., 3300), or more specifically the robot arm (e.g., 3400) and/or the end effector apparatus (e.g., 3500), to perform the robot interaction by following the motion plan determined in step 5016. In some instances, the computing system 1100 may generate one or more movement commands based on the motion plan, and may output the one or more movement commands to the robot (e.g., 3300) via, e.g., the communication interface 1130 of FIG. 2B. The one or more movement commands (also referred to as one or more object interaction movement commands), when received and executed by the robot (e.g., 3300), may cause the robot (e.g., 3300) to follow the motion plan and perform the robot interaction with the object discussed above (e.g., 3722).

In an embodiment, the object which receives or is the target of robot interaction as a result of the motion plan from step 5016 may be one of a plurality of objects, such as a stack 3720 of crates or other containers, as depicted in FIGS. 6A and 7A-7C. In that example, the object 3722 that is moved in accordance with the motion plan of step 5016 may be a first object moved from the stack 3720 to the destination location 8004, as illustrated in FIGS. 8A-8F. In such an example, the first image information and the second image information received in steps 5002 and 5012 may represent an appearance of the stack 3720 and/or describe a structure of the stack (also referred to as stack structure). Further, the computing system 1100 may use the first image information and/or the second image information to determine an estimate of the stack structure. For instance, if the first estimate in step 5004 and the second estimate in step 5014 include a global point cloud, this global point cloud may more specifically describe the stack structure for the stack 3720, wherein different portions of the global point cloud may describe different respective objects 3721-3726 that form the stack 3720. The global point cloud in the above examples may represent the stack 3720 before removal of the first object 3722 discussed above. In an embodiment, method 5000 may involve interacting with additional objects on the stack, such as one or more of objects 3721 and 3723-3726. The interaction may involve, e.g., picking up each of the objects 3721, 3723-3726 and moving them to a destination location (e.g., a conveyor belt) as part of a de-palletization operation.

In an embodiment, interacting with the additional object (e.g., 3721) may involve determining an updated stack structure which reflects removal or other movement of the first object (e.g., 3722) that is moved in accordance with the motion plan of step 5016. While this updated estimate of the stack structure can be determined based on using the camera (e.g., 3200) to generate additional image information after the first object (e.g., 3722) has been moved from the stack (e.g., 3720), the computing system 1100 may alternatively or additionally use the second estimate for the object structure of the first object (e.g., 3722) to determine the updated estimate of the stack structure of the stack 3720.

Figure 9A:
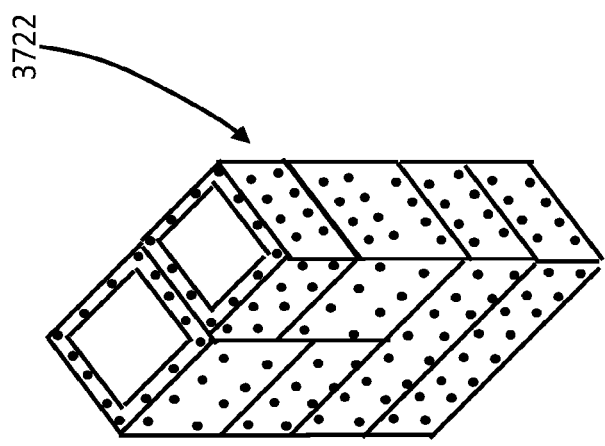
FIGS. 9A-9C illustrate various aspects of updating an estimate for a stack structure which represents a stack of objects, according to an embodiment hereof.
Figure 9B:
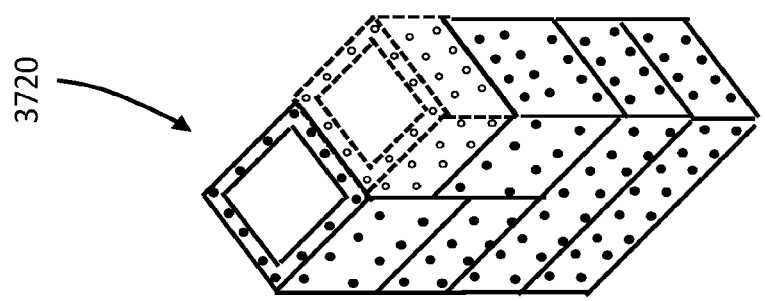
Figure 9C:
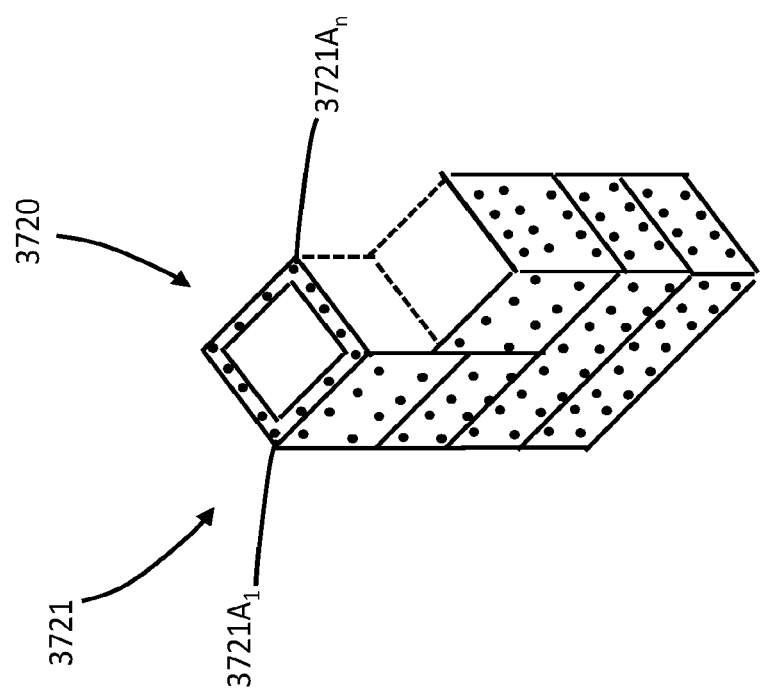

For instance, FIG. 9A illustrates an embodiment in which the computing system 1100 has determined an estimate of the stack structure for the stack 3720 before removal of the first object (e.g., 3722). The estimate of the stack structure may be, e.g., a global point cloud that represents a contour or shape of the stack 3720, and may be the same as or similar to the 3D image information 7084 of FIG. 7C. In this example, the computing system 1100 may have determined an estimate of an object structure for the first object (e.g., 3722). This estimate may be, e.g., the second estimate of the object structure determined in step 5016. Further, this estimate of the object structure may be, e.g., a portion of the global point cloud for the stack structure. Because the estimate for the object structure of the first object (e.g., 3722) has already been determined, the computing system 1100 may directly determine the updated estimate for the stack structure by removing a portion of the estimate that corresponds to the first object. As an example, the estimate for the object structure of for the first object (e.g., 3722) may identify 3D coordinates that are on various surfaces of the first object. The computing system 1100 may be configured to remove these 3D coordinates from the estimate of the global point cloud that represents the stack structure, such as by masking out those 3D coordinates from the global point cloud, as illustrated in FIGS. 9B and 9C. More particularly, FIG. 9B depicts, with white circles, 3D coordinates which have been deleted or otherwise removed from the global point cloud for the stack 3720. FIG. 9C depicts a resulting global point cloud that represents an updated estimate for the stack 3720 after removal of the first object 3722. As illustrated in FIG. 9C, the updated estimate no longer represents the first object 3722, and may instead represent an empty space which was previously occupied by the first object 3722 before its removal from the stack 3720.

In an embodiment, if method 5000 involves interacting with a second object (e.g., 3721) on the stack (e.g., 3720) after removal of the first object (e.g., 3722), the method 5000 may involve generating a second motion plan. The second motion plan may be generated based on the updated estimate of the stack structure, and may cause robot interaction with the second object, such as an interaction in which the end effector apparatus (e.g., 3500) approaches the second object, engages the second object, and moves the second object to a destination location (e.g., 8004). In some cases, generating the second motion plan may involve determining, based on the updated estimate of the stack structure, a new corner of the stack structure exposed by removal of the first object (e.g., 3722). For instance, the new corner may be associated with the second object (e.g., 3721), such as the corner represented by location 3722A$_n$ in FIG. 9B. Thus, the computing system 1100 may identify the new object corner based on the updated estimate of the stack structure.

In the above example, although the computing system 1100 can cause the camera (e.g., 3200) to return to the first camera pose and generate additional image information representing, e.g., a top view of the stack (e.g., 3720) after the first object (e.g., 3722) has been removed, doing so may be unnecessary because the computing system 1100 has already determined an estimate of an object structure of the first object in step 5016. In other words, after the first object (e.g., 3722) is removed from the stack (e.g., 3720), the computing system 1100 may determine an updated estimate of a stack structure for the stack by determine which portion of the estimated stack structure corresponds to the first object, and masking out or otherwise removing that portion. In some cases, the computing system 1100 may use estimated values for object dimensions of the first object, and/or use a point cloud representing the first object to determine what portion of the estimated stack structure corresponds to the first object. After generating the updated estimate of the stack structure, the computing system 1100 may use the updated estimate of the stack structure to identify object corners of remaining objects. In an embodiment, the computing system 1100 may specifically identify convex corners (e.g., outer corners) of the remaining objects. Such corners may also be, e.g., convex corners of the stack. In some cases, a corner of one of the remaining objects, such as the corner at location 3721A$_n$ in FIG. 9C, may become a convex corner after removal of the first object (e.g., 3722). More particularly, that corner may have been immediately adjacent to the first object (e.g., 3722), and may become exposed by the removal of the first object. The computing system 1100 may select the new object corner discussed above from among the convex corners of the remaining objects.

In an embodiment, the new object corner may be used to obtain image information which represents a perspective view of the second object (e.g., 3721) to be removed from the stack (e.g., 3720). For instance, the computing system 1100 may determine an additional camera pose in which the camera (e.g., 3200) is pointed at the new object corner. The computing system 1100 may repeat steps 5006-5016 to cause the camera to move to the additional camera pose, and may receive additional image information that is generated by the camera (e.g., 3200) while the camera has the additional camera pose. In this example, the computing system 1100 may use the additional image information to generate the second motion plan for causing robot interaction with the second object (e.g., 3721), in a manner that is the same as or similar to steps 5014 and 5016.

Figure 10:
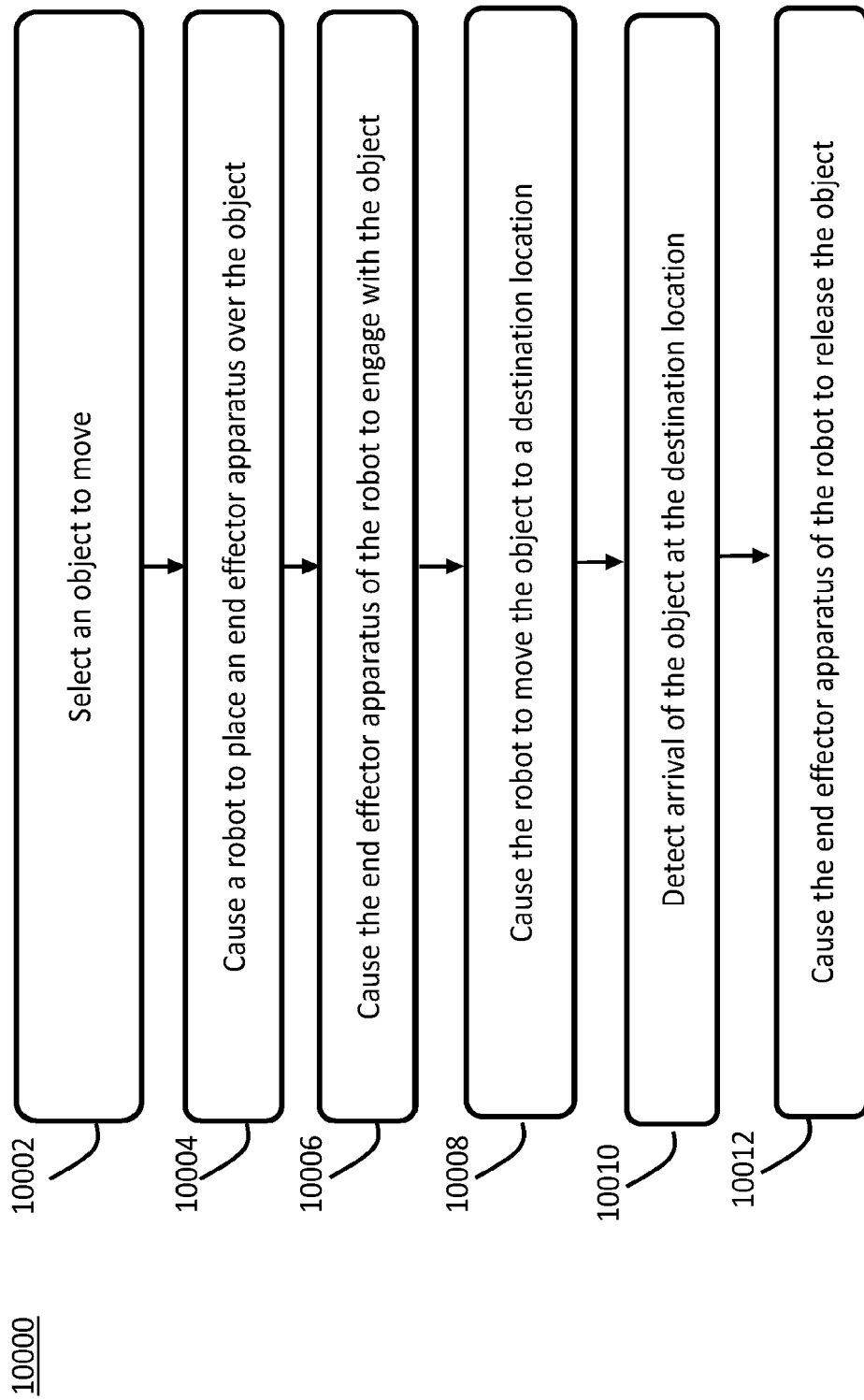
FIG. 10 provides a flow diagram which illustrates an example method for controlling a robot to engage an object and move the object to a destination location, according to an embodiment hereof.

As stated above, one aspect of the present application relates to an interaction in which a robot moves an object from a current location to a destination location. FIG. 10 depicts a flow diagram for an example method 10000 for moving an object (e.g., 3722 in FIGS. 8A and 8B). The method 10000 may be performed by, e.g., the computing system 1100 of FIGS. 2A-2D. In an embodiment, the method 10000 may begin with or otherwise include a step 10002, in which the computing system 1100 selects an object to move. For instance, the computing system 1100 may select a container or other object to be moved, and determine a motion plan for causing a robot to engage with and move the object to a destination location. The motion plan may include a trajectory in which the end effector apparatus (e.g., 3500) is lowered by robot (e.g., 3300) to approach the object, align with an edge or corner of the object, and grip the object.

The method 10000 may in an embodiment include a step 10004, in which computing system 1100 may output one or more movement commands for causing the robot to place or otherwise position the end effector apparatus (e.g., 3500) directly over the object. In an embodiment, the computing system 1100 may determine or verify a location of the object, e.g., the object 3722, using image information generated by the camera 3200 in FIG. 8A at the time of engaging with the object. Once the location of the object is determined, the computing system 1100 may generate and output the one or more movement commands that cause the robot 3300 to place the end effector apparatus 3500 directly over the object 3722, as illustrated in FIG. 8B. In an embodiment, the computing system 1100 may cause the robot 3300 to orient the end effector apparatus 3500 such that a bottom surface of the end effector apparatus 3500 is facing the object 3722.

In step 10006, the computing system 1100 may cause the end effector apparatus (e.g., 3500) of the robot (e.g., 3300) to grip or otherwise engage with the object. In an embodiment, step 10006 may involve generating one or more movement commands for causing the end effector apparatus 3500 to be lowered toward the object, or more generally in a negative Z direction, as illustrated in FIG. 8C. In an embodiment, the computing system 1100 may be configured to cause movement of a first gripper member (e.g., 3510) and a second gripper member (e.g., 3520) along a first rail (e.g., 3540) and a second rail (e.g., 3542), respectively, so as to adjust a grip size of the end effector apparatus (e.g., 3500) based on a size of the object (e.g., 3722), as discussed above. More particularly, the computing system 1100 may cause a region defined by the grip size of the end effector apparatus to have a size which substantially matches or is otherwise based on a size of the object 3701. In a more specific example, the computing system 1100 may determine grip points on the object 3701, and control movement of the first gripper member and the second gripper member so that they are able to grip the object 3701 at the determined grip points. The computing system 1100 may further cause the end effector apparatus 3500 to engage with the object 3722, as illustrated in FIG. 8D.

In step 10008, the computing system 1100 may cause the robot to move the object to a destination location. For example, the computing system 100 may generate and output one or more movement commands for causing the robot 3300 to move the end effector apparatus 3500 to the destination location, such as a location on a conveyer 3800, as illustrated in FIGS. 8E-8G. In an embodiment, the one or more movement commands may be generated based on the motion plan discussed above.

In step 10010, the computing system 1100 may detect the arrival of the object at the destination location. In an embodiment, the computing system 1100 may detect the arrival of the object at the destination location using one or more sensor located at the destination location, such as the line sensors discussed above with respect to FIGS. 8G through 8I. In step 10012, the computing system 1100 may generate one or more movement commands for causing the end effector apparatus 3500 of the robot 3300 to release the object 3722 at the destination location.

Additional discussion of various embodiments:

Embodiment 1 relates to a computing system comprising a communication interface and at least one processing circuit. The communication interface is configured to communicate with: (i) a robot having an end effector apparatus, and (ii) a camera mounted on the end effector apparatus and having a camera field of view. The at least one processing circuit is configured, when an object is or has been in the camera field of view, to: receive first image information for representing at least a first outer surface of an object structure associated with the object, wherein the first image information is generated by the camera when the camera has a first camera pose in which the camera is pointed at the first outer surface such that the camera field of view encompasses the first outer surface; determine, based on the first image information, a first estimate of the object structure; identify, based on the first estimate of the object structure or based on the first image information, a corner of the object structure; determine a second camera pose which, when adopted by the camera, causes the camera to be pointed at the corner of the object structure such that the camera field of view encompasses the corner and at least a portion of a second outer surface of the object structure; output one or more camera placement movement commands which, when executed by the robot, causes the end effector apparatus to move the camera to the second camera pose; receive second image information for representing the object structure, wherein the second image information is generated by the camera while the camera has the second camera pose; determine a second estimate of the object structure based on the second image information; generate a motion plan based on at least the second estimate of the object structure, wherein the motion plan is for causing robot interaction between the robot and the object; and output one or more object interaction movement commands for causing the robot interaction, wherein the one or more object interaction movement command are generated based on the motion plan.

Embodiment 2 includes the computing system of embodiment 1, wherein the first estimate for the object structure includes at least an estimated value for a first object dimension of the object structure and an estimated value for a second object dimension of the object structure, and wherein the second estimate for the object structure includes at least an estimated value for a third object dimension of the object structure.

Embodiment 3 includes the computing system of embodiment 2, wherein the first object dimension is an object length, the second object dimension is an object width, and the third object dimension is an object height.

Embodiment 4 includes the computing system of embodiment 2 or 3, wherein the second estimate for the object structure includes an updated estimated value for the first object dimension and an updated estimated value for the second object dimension.

Embodiment 5 includes the computing system of any one of embodiments 1-4, wherein the second estimate for the object structure includes an estimated shape for the object structure.

Embodiment 6 includes the computing system of any one of embodiments 1-5, wherein the first estimate for the object structure includes a point cloud which identifies locations on the first outer surface of the object structure without identifying locations on the second outer surface of the object structure, and wherein the second estimate for the object structure includes an updated point cloud which identifies locations on the first outer surface and locations on the second outer surface of the object structure.

Embodiment 7 includes the computing system of any one of embodiments 1-6, wherein the at least one processing circuit is configured to determine the second estimate of the object structure by: determining, based on the second image information, an object type corresponding to the object; determining a defined object structure description associated with the object type, wherein the object structure description describes structure associated with the object type; and determining the second estimate of the object structure based on the object structure description.

Embodiment 8 includes the computing system of embodiment 7, wherein the at least one processing circuit is configured to determine the object type by comparing the second image information to one or more templates that include one or more respective object structure descriptions.

Embodiment 9 includes the computing system of any one of embodiments 1-8, wherein the motion plan includes a trajectory which, when followed by the end effector apparatus, causes the end effector apparatus to approach the object, engage the object, and to move the object to a destination location.

Embodiment 10 includes the computing system of embodiment 9, wherein the motion plan is an updated motion plan, wherein the at least one processing circuit is configured to generate an initial motion plan based on the first estimate of the object structure, and to generate the updated motion plan based on the initial motion plan and based on the second estimate of the for the object structure.

Embodiment 11 includes the computing system of embodiment 9 or 10, wherein the second estimate of the object structure includes an estimated value for an object height, wherein the at least one processing circuit is configured to: determine, based on the estimated value for the object height, a final end effector height relative to a destination location, and determine an end point of the trajectory based on the final end effector height.

Embodiment 12 includes the computing system of any one of embodiments 1-11, wherein the at least one processing circuit is configured, when the end effector apparatus includes at least a first gripper member, second gripper member, and third gripper member, to generate the motion plan by determining movement for causing the first gripper member to engage one of a first edge or a second edge of the object structure, for causing the second gripper member to engage another one of the first edge or second edge of the object structure, and for causing the third gripper member to engage the corner associated with the second camera pose or to engage another corner of the object structure.

Embodiment 13 includes the computing system of any one of embodiments 1-12, wherein the at least one processing circuit is configured, when the first estimate of the object structure describes a plurality of corners, to select the corner from among the plurality of corners, wherein the selection is based on at least one of: (i) respective amounts of occlusion experienced by the plurality of corners, or (ii) respective levels of accessibility by the end effector apparatus to the plurality of corners.

Embodiment 14 includes the computing system of any one of embodiments 1-13, wherein the at least one processing circuit is configured to perform the following when the object is a first object in a stack of multiple objects, and the motion plan is a first motion plan for removing the first object from the stack: determining an estimate of a stack structure based on the first image information or the second image information, wherein the estimate of the stack structure is for representing the stack before removal of the first object; determining an updated estimate of the stack structure based on the second estimate of the object structure, wherein the updated estimate of the stack structure is for representing the stack after removal of the first object; and generating a second motion plan based on the updated estimate of the stack structure, wherein the second motion plan is for causing robot interaction with a second object of the stack.

Embodiment 15 includes the computing system of embodiment 14, wherein the at least one processing circuit is configured to generate the second motion plan by: determining, based on the updated estimate of the stack structure, a new corner of the stack structure exposed by removal of the first object, wherein the new corner is associated with the second object, determining an additional camera pose in which the camera is pointed at the new corner; and receiving additional image information that is generated by the camera while the camera has the additional camera pose, wherein the second motion plan is generated based on the additional image information.

Embodiment 16 includes the computing system of embodiment 15, wherein the estimate for the stack structure includes a point cloud for describing locations on the stack, and wherein the at least one processing circuit is configured to determine the updated estimate of the stack structure by updating the point cloud to remove locations on the stack which also belong to the object structure, wherein the locations on the stack that also belong to the object structure are identified by the second estimate of the object structure.

It will be apparent to one of ordinary skill in the relevant arts that other suitable modifications and adaptations to the methods and applications described herein can be made without departing from the scope of any of the embodiments. The embodiments described above are illustrative examples and it should not be construed that the present invention is limited to these particular embodiments. It should be understood that various embodiments disclosed herein may be combined in different combinations than the combinations specifically presented in the description and accompanying drawings. It should also be understood that, depending on the example, certain acts or events of any of the processes or methods described herein may be performed in a different sequence, may be added, merged, or left out altogether (e.g., all described acts or events may not be necessary to carry out the methods or processes). In addition, while certain features of embodiments hereof are described as being performed by a single component, module, or unit for purposes of clarity, it should be understood that the features and functions described herein may be performed by any combination of components, units, or modules. Thus, various changes and modifications may be affected by one skilled in the art without departing from the spirit or scope of the invention as defined in the appended claims.

The invention claimed is:

1. A computing system comprising:
   a communication interface configured to communicate with: (i) a robot having an end effector apparatus having a mounting structure, a first gripper member movable along a first side of the mounting structure, and a second gripper member movable along a second side of the mounting structure, and (ii) a camera mounted on the end effector apparatus and having a camera field of view;
   at least one processing circuit configured, when an object is or has been in the camera field of view, to:
      determine a first estimate of an object structure associated with the object;
      identify, based on the first estimate of the object structure, a corner of the object structure;
      determine a camera pose which, when adopted by the camera, causes the camera to be pointed at the corner of the object structure such that the camera field of view encompasses the corner and at least a portion of a first side and a second side of an outer surface of the object structure;
      receive image information for representing the object structure, wherein the image information is generated by the camera while the camera is in the camera pose;
      determine a second estimate of the object structure based on the image information;
      generate a motion plan based on at least the second estimate of the object structure, wherein the motion plan is for causing robot interaction between the robot and the object, including orienting the end effector apparatus such that the first side of the mounting structure aligns with the first side of the outer surface of the object structure, and the second side of the mounting structure aligns with the second side of the outer surface of the object structure; and
      output one or more object interaction movement commands for causing the robot interaction, including:
         control movement of the first gripper member along the first side of the mounting structure towards a first determined position adjacent the first side of the object structure; and
         control movement of the second gripper member along the second side of the mounting structure towards a second determined position adjacent the second side of the object structure.

2. The computing system of claim 1, wherein the first estimate for the object structure includes at least an estimated value for a first object dimension of the object structure and an estimated value for a second object dimension of the object structure, and
   wherein the second estimate for the object structure includes at least an estimated value for a third object dimension of the object structure.

3. The computing system of claim 2, wherein the first gripper member includes a first gripper member sensor, and the second gripper member includes a second gripper member sensor, the first gripper member sensor and the second gripper member sensor configured to measure a relative position of the first gripper member and the second gripper member with respect to the object structure.

4. The computing system of claim 2, wherein the second estimate for the object structure includes an updated estimated value for the first object dimension and an updated estimated value for the second object dimension.

5. The computing system of claim 1, wherein the first side of the mounting structure has a different length than the second side of the mounting structure, and the first side of the object structure has a different length than the second side of the object structure, and wherein orienting the end effector apparatus includes aligning the first side of the mounting structure with the first side of the object structure, and aligning the second side of the mounting structure with the second side of the object structure.

6. The computing system of claim 1, wherein the first estimate for the object structure includes a point cloud which identifies locations on the first side of the outer surface of the object structure without identifying locations on the second side of the outer surface of the object structure, and wherein the second estimate for the object structure includes an updated point cloud which identifies locations on the first side of the outer surface and locations on the second side of the outer surface of the object structure.

7. The computing system of claim 1, wherein the at least one processing circuit is configured to determine the second estimate of the object structure by:
determining, based on the image information, an object type corresponding to the object;
determining a defined object structure description associated with the object type, wherein the defined object structure description describes structure associated with the object type; and
determining the second estimate of the object structure based on the defined object structure description.

8. The computing system of claim 7, wherein the at least one processing circuit is configured to determine the object type by comparing the image information to one or more templates that include one or more respective object structure descriptions.

9. The computing system of claim 1, wherein the end effector apparatus further includes a third gripper member fixed to the mounting structure.

10. The computing system of claim 9, wherein the one or more object interaction movement commands further includes engaging a corner of the object structure with the third gripper member.

11. The computing system of claim 1, wherein the first gripper member is movable along a first axis of a first rail, and the second gripper member is movable along a second axis of a second rail.

12. The computing system of claim 11, wherein the first rail has a same size as the second rail.

13. The computing system of claim 11, wherein the first rail has a different length than the second rail.

14. The computing system of claim 11, wherein a grip size of the end effector apparatus is determined by a first dimension that is defined by a distance between the first gripper member and an intersection point where the first axis intersects with the second axis, and by a second dimension that is defined by a distance between the second gripper member and the intersection point.

15. The computing system of claim 14, wherein a first maximum distance between the first gripper member and the intersection point is based on a size of the first rail, and a second maximum distance between the second gripper member and the intersection point is based on a size of the second rail.

16. The computing system of claim 1, wherein the first side of the object structure is perpendicular to the second side of the object structure.

17. A non-transitory computer-readable medium having instructions that, when executed by at least one processing circuit of a computing system, wherein the computing system is configured to communicate with: (i) a robot having an end effector apparatus having a mounting structure, a first gripper member movable along a first side of the mounting structure, and a second gripper member movable along a second side of the mounting structure, and (ii) a camera mounted on the end effector apparatus and having a camera field of view, causes the at least one processing circuit to:
determine a first estimate of an object structure associated with an object that is or has been in the camera field of view;
identify, based on the first estimate of the object structure, a corner of the object structure;
determine a camera pose which, when adopted by the camera, causes the camera to be pointed at the corner of the object structure such that the camera field of view encompasses the corner and at least a portion of a first side and a second side of an outer surface of the object structure;
receive image information for representing the object structure, wherein the image information is generated by the camera while the camera is in the camera pose;
determine a second estimate of the object structure based on the image information;
generate a motion plan based on at least the second estimate of the object structure, wherein the motion plan is for causing robot interaction between the robot and the object, including orienting the end effector apparatus such that the first side of the mounting structure aligns with the first side of the outer surface of the object structure, and the second side of the mounting structure aligns with the second side of the outer surface of the object structure; and
output one or more object interaction movement commands for causing the robot interaction, including:
control movement of the first gripper member along the first side of the mounting structure towards a first determined position adjacent the first side of the object structure; and
control movement of the second gripper member along the second side of the mounting structure towards a second determined position adjacent the second side of the object structure.

18. The non-transitory computer-readable medium of claim 17, wherein the first gripper member is movable along a first axis of a first rail, and the second gripper member is movable along a second axis of a second rail.

19. A method performed by a computing system, wherein the computing system is configured to communicate with: (i) a robot having an end effector apparatus having a mounting structure, a first gripper member movable along a first side of the mounting structure, and a second gripper member movable along a second side of the mounting structure, and (ii) a camera mounted on the end effector apparatus and having a camera field of view, the method comprising:
determining a first estimate of an object structure associated with an object that is or has been in the camera field of view;
identifying, based on the first estimate of the object structure, a corner of the object structure;
determining a camera pose which, when adopted by the camera, causes the camera to be pointed at the corner of the object structure such that the camera field of view encompasses the corner and at least a portion of a first side and a second side of an outer surface of the object structure;
receiving image information for representing the object structure, wherein the image information is generated by the camera while the camera is in the camera pose;
determining a second estimate of the object structure based on the image information;
generating a motion plan based on at least the second estimate of the object structure, wherein the motion plan is for causing robot interaction between the robot and the object, including orienting the end effector apparatus such that the first side of the mounting structure aligns with the first side of the outer surface of the object structure, and the second side of the mounting structure aligns with the second side of the outer surface of the object structure; and
outputting one or more object interaction movement commands for causing the robot interaction, including:

controlling movement of the first gripper member along the first side of the mounting structure towards a first determined position adjacent the first side of the object structure; and controlling movement of the second gripper member along the second side of the mounting structure towards a second determined position adjacent the second side of the object structure.

20. The method of claim 19, further including moving the first gripper member along a first axis of a first rail, and moving the second gripper member along a second axis of a second rail.

* * * * *